United States Patent
Wakabayashi et al.

(10) Patent No.: US 9,051,501 B2
(45) Date of Patent: Jun. 9, 2015

(54) CURABLE COMPOSITION AND CATALYST COMPOSITION

(75) Inventors: Katsuyu Wakabayashi, Settsu (JP); Noriko Matsushita, Takasago (JP); Katsuya Ouchi, Settsu (JP); Taisuke Sasaki, Takasago (JP)

(73) Assignee: KANEKA CORPORATION, Osaka (JP)

( * ) Notice: Subject to any disclaimer, the term of this patent is extended or adjusted under 35 U.S.C. 154(b) by 0 days.

(21) Appl. No.: 12/514,417

(22) PCT Filed: Nov. 22, 2007

(86) PCT No.: PCT/JP2007/072647
§ 371 (c)(1),
(2), (4) Date: May 11, 2009

(87) PCT Pub. No.: WO2008/062866
PCT Pub. Date: May 29, 2008

(65) Prior Publication Data
US 2010/0041810 A1 Feb. 18, 2010

(30) Foreign Application Priority Data

Nov. 22, 2006 (JP) ................. 2006-315824
Nov. 22, 2006 (JP) ................. 2006-315825
May 10, 2007 (JP) ................. 2007-125793
May 14, 2007 (JP) ................. 2007-128102
May 25, 2007 (JP) ................. 2007-138768
Jul. 31, 2007 (JP) ................. 2007-199806

(51) Int. Cl.
*C08K 3/26* (2006.01)
*C09D 17/00* (2006.01)
*C09K 3/10* (2006.01)
*C08K 3/16* (2006.01)
*C08K 3/36* (2006.01)
*C08K 5/16* (2006.01)
*C08L 83/00* (2006.01)
*C08L 83/04* (2006.01)
*C08G 77/08* (2006.01)
*C08L 21/00* (2006.01)
*C08L 101/10* (2006.01)

(52) U.S. Cl.
CPC . *C09K 3/10* (2013.01); *C08G 77/08* (2013.01); *C08K 3/16* (2013.01); *C08K 3/26* (2013.01); *C08K 3/36* (2013.01); *C08K 5/16* (2013.01); *C08L 21/00* (2013.01); *C08L 101/10* (2013.01)

(58) Field of Classification Search
USPC ............ 524/425, 588; 528/14, 15, 18, 19, 21, 528/35, 10, 17, 34, 36, 37, 39, 43; 526/279; 522/33; 525/135, 100, 474, 25, 26, 525/478, 403, 408, 479, 374; 502/150, 167, 502/170, 200, 352
See application file for complete search history.

(56) References Cited

U.S. PATENT DOCUMENTS

| | | | |
|---|---|---|---|
| 3,318,971 A | 5/1967 | Chloupek et al. | |
| 4,652,610 A | 3/1987 | Dowbenko et al. | |
| 4,904,732 A | 2/1990 | Iwahara et al. | |
| 5,670,597 A | 9/1997 | Stepp et al. | |
| 6,486,289 B1 * | 11/2002 | Yamaguchi et al. | ............ 528/18 |
| 6,777,485 B1 * | 8/2004 | Ito et al. | ........................ 524/588 |
| 7,625,990 B2 * | 12/2009 | Wakabayashi et al. | ......... 528/10 |
| 2010/0041810 A1 | 2/2010 | Wakabayashi et al. | |

FOREIGN PATENT DOCUMENTS

| | | | | |
|---|---|---|---|---|
| EP | 0 231 514 A2 | 8/1987 | | |
| EP | 0 538 881 A2 | 4/1993 | | |
| JP | 52-073998 A | 6/1977 | | |
| JP | 55-43119 A | 3/1980 | | |
| JP | 62-169861 A | 7/1987 | | |
| JP | 63-006041 A | 1/1988 | | |
| JP | 64-029450 A | 1/1989 | | |
| JP | 04-100865 A | 4/1992 | | |
| JP | 05-117519 A | 5/1993 | | |
| JP | 2001-207070 | * | 7/2001 | ............ C08L 101/02 |
| JP | 2001-207070 A | 7/2001 | | |
| JP | 2008-7586 A | 1/2008 | | |
| JP | 5258575 B2 | 5/2013 | | |

OTHER PUBLICATIONS

International Preliminary Report on Patentability and Written Opinion in PCT/JP2007/072647 dated Jun. 4, 2009.

\* cited by examiner

*Primary Examiner* — Bijan Ahvazi
(74) *Attorney, Agent, or Firm* — Sughrue Mion, PLLC

(57) ABSTRACT

An object of the present invention is to provide a curable composition made mainly of an organic polymer having a reactive silicon group, exhibits a good curability without using any organic tin compound substantially, and gives a cured product having a sufficient strength; and to provide a catalyst composition. The object is solved by a curable composition, comprising a polymer (A) having a silicon-containing group which can be crosslinked by forming a siloxane bond, and a fluoride salt compound (B).

20 Claims, No Drawings

CURABLE COMPOSITION AND CATALYST COMPOSITION

TECHNICAL FIELD

The present invention relates to a catalyst composition used to cure a curable composition comprising a polymer which has a hydroxyl group or a hydrolyzable group bonded to a silicon atom and has a reactive silicon that can be crosslinked through formation of a siloxane bond (also referred to as a "reactive silicon group" hereinafter), and a curable composition comprising thereof.

BACKGROUND ART

It is known that a polymer having at least one reactive silicon group in its molecule has a nature that the polymer is crosslinked through formation of siloxane bonds, which follows hydrolysis reaction or the like of the reactive silicon group due to moisture or the like, even at room temperature, so as to give a rubbery cured product.

Out of such polymers having a reactive silicon group, polymers having a main chain skeleton made of polyoxyalkylene based polymer or polyisobutylene based polymer are disclosed in JP-A-52-73998, JP-A-63-6041 and the like, and have already been industrially produced and have widely been used for sealants, adhesives, paints and the like.

Curable compositions containing a polymer having a main chain skeleton made of polysiloxane, in particular, diorganopolysiloxane have also been reported in many documents such as JP-A-55-43119.

Curable compositions used for sealants, adhesives, paints and the like, and rubbery cured products obtained by curing the compositions are required to have various properties such as curability, adhesiveness, and mechanical properties.

A curable catalyst has been used for curing a curable composition containing a polymer having a reactive silicon group. Usually, an organotin catalyst having a carbon-tin bond, such as dibutyltin bis(acetylacetonate) has widely been used. In recent years, however, about organotin compounds, the toxicity thereof has been pointed out. Thus, organotin-free catalysts have been desired to be developed.

Many researches have been made on metal carboxylates, metal alkoxides, and the like as organotin-free catalysts. Among them, carboxylic acids or amine compounds are catalysts containing no metal, and are expected to give only relatively small effects onto the environment. JP-A-05-117519 discloses that use of a combination of a carboxylic acid with an amine gives a curable composition having a good curability. However, in curable compositions which are cured by a silanol condensation catalyst in which an amine compound and a carboxylic acid are used in combination, there remains room for improvement to gain a sufficient adhesiveness suitable for applications such as sealants, adhesives and the like. Moreover, as stated in JP-A-05-117519, sufficient curability is not easily obtained by use of an amine compound alone.

JP-A-2001-207070 discloses that a curable composition wherein a compound having a fluorine anion is used as a catalyst has an excellent curability and the cured product obtained therefrom has an excellent adhesive property.

In many cases, a filler is added to a curable composition used for sealants, adhesives, paints or the like, or a rubbery cured product obtained by curing the composition in order to improve the strength, improve the workability, give designability, or attain some other purpose; however, in the case of using a fluoride salt compound as a curing catalyst for an organic polymer having a reactive silicon group, the addition of a filler causes a problem that the curability of the curable composition is deteriorated.

In the meantime, JP-A-2001-207070 illustrates, as a compound having a fluorine anion, a quaternary ammonium fluoride salt, a fluoride salt of an alkali metal, or some other compound.

However, the quaternary ammonium fluoride salt is instable in the state that the fluoride salt is isolated; thus, the fluoride salt is supplied in a solution state that the fluoride salt is dissolved in water or an organic solvent. When an aqueous solution of the quaternary ammonium fluoride salt is used as a catalyst, a curable composition good in storage stability is not easily obtained by effect of water. When the solution of the quaternary ammonium fluoride salt dissolved in an organic solvent is used as a catalyst, a large amount of a volatile component remains easily in the resultant sealants or adhesives by effect of the organic solvent. Thus, a problem is caused against the purpose of putting it into industrially practical use. Additionally, the quaternary ammonium fluoride salt is expensive; from this viewpoint also, a problem remains against the industrially practical use. Furthermore, a fluoride salt of an alkali metal is not generally good in compatibility with any organic compound. Thus, when the fluoride salt is used as a catalyst, there is caused a problem that the fluoride salt does not easily gain curing performance.

As described above, there has not yet been obtained any curable composition wherein a compound having a fluorine anion, which can be put into industrially practical use, is used as a catalyst. Thus, such a composition has been desired to be developed under the present circumstances.

DISCLOSURE OF THE INVENTION

Problems to be Solved by the Invention

The present invention has been made to solve the above-mentioned problems, and an object thereof is to provide a curable composition made mainly of an organic polymer having a reactive silicon group, exhibits a good curability without using any organic tin compound substantially, and gives a cured product having a sufficient strength; and a catalyst composition.

Means for Solving the Problems

In light of the above-mentioned situation, the inventors have made eager investigations to find out that the object can be attained by using a fluoride salt compound as a curing catalyst for an organic polymer having a reactive silicon group and further adding specified filler thereto. Thus, the present invention has been made. The inventors have also found out that good curability and workability can be made compatible with each other by using a fluoride salt compound and a protonic acid as curing catalysts for an organic polymer having a reactive silicon group. The inventors have also found out that while the good workability is maintained, the curability of the curable composition is made better by adding a compound having a sulfonyl group further thereto. The inventors have also found out that the curability of the curable composition is made even better by using an ammonium fluoride salt or a substituted ammonium fluoride salt having a heterocyclic structure as the above-mentioned fluoride salt compound or using an amine compound together therewith. Accordingly, the present invention is as follows:

(1) A curable composition, comprising a polymer (A) having a silicon-containing group which can be crosslinked by forming a siloxane bond, and a fluoride salt compound (B).
(2) The curable composition according to (1), further comprising a filler (C), wherein the filler (C) is at least one selected from the group consisting of precipitated calcium carbonate surface-treated with a substance other than any aliphatic acid, precipitated calcium carbonate surface-treated with an aliphatic acid (provided that the ratio by weight between fluorine atoms contained in the fluoride salt compound (B) and the precipitated calcium carbonate surface-treated with the aliphatic acid is 0.0015 or more), ground calcium carbonate, and silica.
(3) The curable composition according to (1) or (2), wherein the fluoride salt compound (B) is an ammonium fluoride salt.
(4) The curable composition according to any one of (1) to (3), further comprising a protonic acid (D).
(5) The curable composition according to (4), wherein the protonic acid (D) is an aliphatic acid.
(6) The curable composition according to (4), wherein the protonic acid (D) is a sulfonic acid.
(7) The curable composition according to any one of (4) to (6), wherein the ratio between the mole number of $H^+$ ions that the protonic acid (D) can supply and the mole number of fluorine atoms in the fluoride salt compound (B) is 0.1 or more.
(8) The curable composition according to any one of (1) to (7), further comprising a compound (E) having a sulfonyl group other than any sulfonic acid.
(9) The curable composition according to (8), wherein the ratio between the mole number of the compound (E) having a sulfonyl group and the mole number of fluorine atoms in the fluoride salt compound (B) is 0.5 or more.
(10) The curable composition according to any one of (1) to (9), wherein the fluoride salt compound (B) is comprised in an amount of 0.001 to 30 parts by weight for 100 parts by weight of the polymer (A).
(11) The curable composition according to any one of (2) to (10), wherein the filler (C) is comprised in an amount of 5 to 500 parts by weight for 100 parts by weight of the polymer (A).
(12) The curable composition according to (1), wherein the fluoride salt compound (B) is the following fluoride salt compound (B1):
a fluoride salt compound (B1): a substituted ammonium fluoride salt or an unsubstituted ammonium fluoride salt, and
in a case of the substituted ammonium fluoride salt wherein its substituent is a hydrocarbon group or the unsubstituted ammonium fluoride salt, the fluoride salt compound (B) is a fluoride salt compound represented by the following general formula (1):

$$R_{4-m}NH_mF(HF)_n$$ 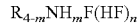

(wherein R(s) is/are a substituted or an unsubstituted hydrocarbon group, $0 \leq m \leq 4$, and n represents 0 or a positive number, provided that m and n are not 0 at the same time).
(13) The curable composition according to (12), wherein the fluoride salt compound (B1) is an ammonium hydrofluoride compound (B2).
(14) The curable composition according to (12) or (13), wherein the fluoride salt compound (B1) is a primary, secondary or tertiary substituted ammonium fluoride salt compound (B3).
(15) The curable composition according to (12), wherein the fluoride salt compound (B1) is an unsubstituted ammonium fluoride salt and/or an unsubstituted ammonium hydrofluoride salt, the curable composition further comprising an amine compound (F).
(16) The curable composition according to (15), wherein the maximum particle diameter of the fluoride salt compound (B) is 150 μm or less.
(17) The curable composition according to any one of (12) to (14), wherein the fluoride salt compound is an ammonium hydrofluoride compound, the composition further comprising an amine compound (F).
(18) The curable composition according to (17), wherein the fluoride salt compound (B) is represented by the following general formula (2):

[Formula 1]

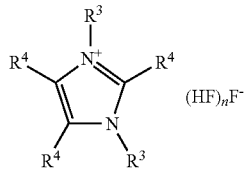

(wherein two $R^3$s are each independently a hydrocarbon group having 1 to 4 carbon atom(s), three $R^4$s are each independently a hydrogen atom or a hydrocarbon group having 1 to 4 carbon atom(s), and n represents 0 or a positive number).
(19) The curable composition according to any one of (15) to (18), wherein the amine compound (F) is an amidine compound.
(20) The curable composition according to any one of (15) to (18), wherein the amine compound (F) is a tertiary amine compound having an amino group.
(21) The curable composition according to any one of (15) to (20), wherein the ratio of the total mole number of the amine compound (F) to the total mole number of the fluoride salt compound (B) is from 0.1 to 10.
(22) The curable composition according to any one of (12) to (21), further comprising an acid compound (G).
(23) The curable composition according to (22), wherein the acid compound (G) is a carboxylic acid.
(24) The curable composition according to (23), wherein the ratio of the total mole number of the acid compound (G) to the total mole number of the amine compound (F) is from 0.5 to 2.
(25) The curable composition according to (22), wherein the acid compound (G) is a carboxylic anhydride.
(26) The curable composition according to (25), wherein the mole number of carboxylic anhydride groups in the acid compound (G) to the mole number of the amine compound (F) is from 0.1 to 1.
(27) The curable composition according to any one of (1) to (26), wherein the polymer (A) is a polymer having one or more silicon-containing groups which can be crosslinked by forming a siloxane bond, the number of the silicon-containing group(s) being one or more, on average, per molecule.
(28) The curable composition according to any one of (1) to (27), wherein the silicon-containing group that the polymer (A) has, which can be crosslinked by forming a siloxane bond, is represented by the following general formula (3):

$$-SiR^1_{3-a}X_a \qquad 3)$$ 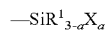

(wherein $R^1$(s), the number of which is (3-a), is/are (each independently) a hydrocarbon group having 1 to 20 carbon atom(s), or a siloxy group represented by $R^2_3SiO-$ (wherein three $R^2$s are each independently a hydrocarbon group having 1 to 20 carbon atom(s)), X(s), the number of which is a, is/are (each independently) a group selected from the group consisting of a hydroxyl group, alkoxy groups, alkenyloxy groups, acyloxy groups, and phenoxy groups, and a is 1, 2 or 3).

(29) The curable composition according to (28), wherein "a" described in the general formula (3) is 2.

(30) The curable composition according to (28) or (29), wherein X(s) described in the general formula (3) is/are an alkoxy group.

(31) The curable composition according to any one of (1) to (30), wherein the number-average molecular weight of the polymer (A) is from 3,000 to 100,000.

(32) The curable composition according to any one of (1) to (31), wherein the polymer (A) is a polymer having at least one main chain skeleton selected from the group consisting of a polyoxyalkylene polymer, a saturated hydrocarbon polymer, and a (meth)acrylate polymer.

(33) A sealant wherein a curable composition as recited in any one of (1) to (32) is used.

(34) An adhesive wherein a curable composition as recited in any one of (1) to (32) is used.

(35) A catalyst composition which comprises a fluoride salt compound (B) and an amine compound (F), and is used to cure a polymer (A) having a silicon-containing group which can be crosslinked by forming a siloxane bond.

(36) The catalyst composition according to (35), further comprising the acid compound (G).

(37) The catalyst composition according to (35) or (36), further comprising a dispersing agent (H).

(38) A curable composition, comprising a polymer (A) having a silicon-containing group which can be crosslinked by forming a siloxane bond, and a catalyst composition as recited in any one of (35) to (37).

Effect of the Invention

The curable composition of the present invention has good curability and workability and gives a cured product having sufficient strength without using any organic tin catalyst.

BEST MODE FOR CARRYING OUT THE INVENTION

The present invention will be described in detail hereinafter.

<Polymer (A) Having a Silicon-Containing Group which can be Crosslinked by Forming a Siloxane Bond>

The main chain skeleton of the polymer used in the present invention is not particularly limited. A polymer having various types of main chain skeletons, preferably such an organic polymer, may be used.

Specific examples thereof include polyoxyalkylene polymers such as polyoxyethylene, polyoxypropylene, polyoxybutylene, polyoxytetramethylene, polyoxyethylene-polyoxypropylene copolymer, polyoxypropylene-polyoxybutylene copolymer and the like; hydrocarbon copolymers such as ethylene-propylene copolymer, polyisobutylene, copolymer made from isobutylene, and isoprene or the like, polychloroprene, polyisoprene, copolymer made from isoprene or butadiene, acrylonitrile, and/or styrene or the like, polybutadiene, copolymer made from isoprene or butadiene, acrylonitrile, and styrene or the like, hydrogenated polyolefin polymers obtained by hydrogenating these polyolefin polymers and the like; polyester polymer obtained by condensing a bibasic acid such as adipic acid, and glycol, ring-opening-polymerizing a lactone and the like; (meth)acrylate polymer obtained by radical-polymerizing ethyl(meth)acrylate, butyl (meth)acrylate or some other monomer; vinyl polymer obtained by polymerizing a (meth)acrylate monomer, vinyl acetate, acrylonitrile, styrene or some other monomer; graft polymer obtained by polymerizing a vinyl monomer in any one of the above-mentioned organic polymers; polysulfide polymer; polyamide polymers, such as nylon 6, which is obtained by ring-opening-polymerizing ε-caprolactam, nylon 6,6, which is obtained by polycondensing hexamethylenediamine and adipic acid, nylon 6,10, which is obtained by polycondensing hexamethylenediamine and sebacic acid, nylon 11, which is obtained by polycondensing ε-aminoundecanoic acid, nylon 12, which is obtained by ring-opening-polymerizing ε-aminolaurolactam, and a copolymeric nylon containing two or more out of these nylons; polycarbonate polymer produced by polycondensing, for example, bisphenol A and carbonyl chloride; and diallyl phthalate polymer. Moreover, a polysiloxane polymer such as polydiorganosiloxane may be used.

Among them, more preferred are saturated hydrocarbon polymers such as polyisobutylene, hydrogenated polyisoprene and hydrogenated polybutadiene, the polyoxyalkylene polymers, the (meth)acrylate polymers, and the polysiloxane polymers since they have a relatively low glass transition temperature and give a cured product excellent in cold resistance when being used as a curable composition.

The glass transition temperature of the organic polymer(s) (A) is not particularly limited, and is preferably 20° C. or lower, more preferably 0° C. or lower, in particular preferably −20° C. or lower. If the glass transition temperature is higher than 20° C. the viscosity becomes high in winter or in cold districts so that the workability may deteriorate. Moreover, the flexibility of the cured product falls so that the elongation may lower. The glass transition temperature can be obtained by DSC measurement.

Polyoxyalkylene polymer and (meth)acrylate polymer are in particular preferred since they are high in moisture permeability, are excellent in depth curability when they are each made into a one-part-type composition, and are further excellent in adhesive property. Polyoxyalkylene polymer is most preferred.

About a polymer containing ester bonds, such as acrylic resin or polyester resin, the ester bonds may be cleaved by a silanol condensing catalyst or the like, such as the fluoride salt compound (B) related to the present invention, so that various physical properties of the curable composition or cured product therefrom may change. However, about polyoxyalkylene polymer and hydrocarbon polymer, the main chain skeleton thereof is not denatured by a side reaction such as transesterification reaction even in the presence of a curing catalyst. Thus, the polymers are preferred.

The reactive silicon group contained in the organic polymer (A) is a group which has one or more hydroxyl groups or hydrolyzable groups bonded to a silicon atom, and which can be crosslinked by forming a siloxane bond by reaction accelerated by a silanol condensing catalyst. The reactive silicon group may be a group represented by the following general formula (3):

(wherein $R^1$(s), the number of which is (3-a), is/are (each independently) a hydrocarbon group having 1 to 20 carbon atom(s), or a siloxy group represented by $R^2{}_3SiO$— wherein three $R^2$s are each independently a hydrocarbon group having 1 to 20 carbon atom(s), X(s), the number of which is a, is/are (each independently) a group selected from the group consisting of hydroxyl, alkoxy, alkenyloxy, acyloxy, and phenoxy groups, and a is 1, 2 or 3).

The hydrolyzable group is not particularly limited, and may be a hydrolyzable group known in the prior art. Specific examples thereof include a hydrogen atom, halogen atoms, and alkoxy groups, acyloxy groups, ketoximate groups, amino groups, amide groups, acid amide groups, aminooxy groups, mercapto groups, alkenyloxy groups and the like. Among them, a hydrogen atom, and alkoxy groups, acyloxy groups, ketoximate groups, amino groups, amide groups, aminooxy groups, mercapto groups and alkenyloxy groups are preferred. The alkoxy groups are particularly preferred since the groups have mild hydrolyzability and good handleability.

To each silicon atom, the hydrolyzable group(s) or hydroxyl group(s) can be bonded in the range of 1 to 3. When the groups the number of which is two or more are bonded in each silicon group, the groups may be the same or different.

Specific examples of $R^1$ include alkyl groups such as a methyl group, ethyl group and the like; cycloalkyl groups such as a cyclohexyl group and the like; aryl groups such as a phenyl group and the like; aralkyl groups such as a benzyl group and the like; and triorganosiloxy groups represented by $(R^2)_3SiO$— wherein $R^2$s are each a methyl group, phenyl group, or the like. Among them, a methyl group is particularly preferred.

More specific examples of the reactive silicon group include trimethoxysilyl group, triethoxysilyl group, triisopropoxysilyl group, dimethoxymethylsilyl group, diethoxymethylsilyl group, diisopropoxymethylsilyl group, methoxydimethylsilyl group and ethoxydimethylsilyl group. More preferred are the trimethoxysilyl, triethoxysilyl and dimethoxymethylsilyl group, and particularly preferred is the trimethoxysilyl group since they have a high activity to give a good curability. From the viewpoint of storage stability, the dimethoxymethylsilyl group is particularly preferred. The triethoxysilyl group is particularly preferred since an alcohol generated in company with the hydrolysis reaction of the reactive silicon group is ethanol so that a higher safety is exhibited.

Organic polymers having a reactive silicon group having three hydrolyzable groups on a silicon atom are preferred since they tend to give a high curability and further supply a curable composition having good recovery property, durability, and creep resistance.

The reactive silicon group may be introduced by a known method. Specifically, the following methods can be exemplified:

(A) An organic polymer having in the molecule thereof a functional group such as a hydroxyl group is caused to react with an organic compound having an active group reactive with this functional group and an unsaturated group to yield an organic polymer having the unsaturated group. Alternatively, the polymer is copolymerized with an unsaturated-group-containing epoxy compound, thereby yielding an unsaturated-group-containing organic polymer. Next, the resultant reaction product is caused to act on a hydrosilane having a reactive silicon group, thereby hydrosilylating the product.

(B) An unsaturated-group-containing organic polymer obtained in the same manner as in the method (A) is caused to react with a compound having a mercapto group and a reactive silicon group.

(C) An organic polymer having in the molecule thereof a functional group such as a hydroxyl group, epoxy group or isocyanate group is caused to react with a compound having a functional group reactive with this functional group and a reactive silicon group.

Out of the above-mentioned methods, the method (A) and the method of causing an organic polymer having a hydroxyl group at its terminal to react with a compound having an isocyanate group and a reactive silicon group among variations of the method (C) are preferred since a high conversion ratio can be obtained in a relatively short reaction time. The method (A) is particularly preferred since the reactive-silicon-group-containing organic polymer obtained by the method (A) becomes a curable composition having a lower viscosity and a better workability than the organic polymer obtained by the method (C) and the organic polymer obtained by the method (B) generates a strong odor based on mercaptosilane.

Specific examples of the hydrosilane used in the above method (A) include halogenated silanes such as trichlorosilane, methyldichlorosilane, dimethylchlorosilane, and phenyldichlorosilane; alkoxysilanes such as trimethoxysilane, triethoxysilane, methyldiethoxysilane, methyldimethoxysilane, and phenyldimethoxysilane; acyloxysilanes such as methyldiacetoxysilane, and phenyldiacetoxysilane; and ketoximatesilane such as bis(dimethylketoximate)methylsilane, bis(cyclohexylketoximate)methylsilane and the like. However, the hydrosilane is not limited thereto. Among them, halogenated silanes, and alkoxysilanes are preferred, and alkoxysilanes are most preferred since they give a curable composition having a mild hydrolyzability and good handleability. Out of the alkoxysilanes, methyldimethoxysilane is particularly preferred since it is easily available and a curable composition containing the organic polymer obtained therefrom has high curability, storage stability, elongation property and tensile strength.

Out of the above-mentioned hydrosilanes, a hydrosilane represented by the following general formula (4) is preferred since a curable composition made of the organic polymer obtained by addition reaction of the hydrosilane compound has very good curability:

$$H-SiX_3 \qquad (4)$$

(wherein X has the same meaning as described above general formula (3)). Out of hydrosilane compounds represented by the general formula (4), more preferred are trialkoxysilanes such as trimethoxysilane, triethoxysilane, triisopropoxysilane and the like.

Out of the trialkoxysilanes, a trialkoxysilane having an alkoxy group having one carbon atom (a methoxy group), such as trimethoxysilane and the like, may cause speedy advance of disproportionation reaction. When the disproportionation reaction advances, dangerous compounds such as dimethoxysilane are generated. Therefore, from the viewpoint of safe handling, it is preferred to use a trialkoxysilane having an alkoxy group having 2 or more carbon atoms and represented by the following general formula (5):

$$H-Si(OR^5)_3 \qquad (5)$$

(wherein $R^5$s, the number of which is three, are each independently an organic group having 2 to 20 carbon atoms). Triethoxysilane is most preferred from the viewpoint of availability and safe handling.

The synthesis method (B) may be, for example, a method of introducing a compound having a mercapto group and a reactive silicon group into an unsaturated bond moiety of the organic polymer by radical addition reaction in the presence of a radical initiator and/or a radical-generating source. However, the method (B) is not particularly limited. Specific examples of the compound having a mercapto group and a reactive silicon group include γ-mercaptopropyltrimethoxysilane, γ-mercaptopropylmethyldimethoxysilane, γ-mercaptopropyltriethoxysilane, γ-mercaptopropylmethyldiethoxysilane, mercaptomethyltriethoxysilane and the like. However, the compound is not limited thereto.

Out of variations of the synthesis method (C), the method of causing an organic polymer having a hydroxyl group at its terminal to react with a compound having an isocyanate group and a reactive silicon group may be, for example, a method disclosed in JP-A-3-47825. However, the method is not particularly limited. Specific examples of the compound having an isocyanate group and a reactive silicon group include γ-isocyanatopropyltrimethoxysilane, γ-isocyanatopropyldimethoxymethylsilane, γ-isocyanatopropyltriethoxysilane, γ-isocyanatopropyldiethoxymethylsilane, isocyanatomethyltrimethoxysilane, isocyanatomethyltriethoxysilane, isocyanatomethyldimethoxymethylsilane, and isocyanatomethyldiethoxymethylsilane.

As described above, a silane compound wherein three hydrolyzable groups are bonded to a single silicon atom, such as trimethoxysilane, may cause advance of disproportionation reaction. When the disproportionation reaction advances, a considerably dangerous compound such as dimethoxysilane is generated. However, such disproportionation reaction does not advance about γ-mercaptopropyltrimethoxysilane or γ-isocyanate propyltrimethoxysilane. Therefore, in the case of using a group wherein three hydrolyzable groups are bonded to a single silicon atom, such as a trimethoxy group, as the silicon-containing group, it is preferred to use the synthesis method (B) or (C).

The organic polymer (A) having a reactive silicon group may be linear or may have a branch, and the number-average molecular weight thereof is preferably from about 3,000 to 100,000, more preferably from 4,000 to 50,000, in particular preferably from 5,000 to 30,000 in terms of polystyrene by GPC. If the number-average molecular weight is less than 3,000, an inconvenience tends to be generated in the elongation property of the cured product. If the number-average molecular weight is more than 100,000, the composition becomes highly viscous so that an inconvenience tends to be generated in workability. However, it is allowable to use organic polymers (A) having a low molecular weight of 500 to 3,000, more practically 1,000 to 3,000, even more practically 2,000 to 3,000 alone or in a mixture form, if desired.

In order to obtain a rubbery cured product exhibiting a high strength, a high elongation and a low elasticity, the number of reactive silicon groups contained in the organic polymer or each of the polymers is, on average, at least one, preferably from 1.1 to 5 per molecule of the polymer. If the number of the reactive silicon groups contained per molecule is less than one on average, the curability becomes insufficient so that a good rubbery elasticity behavior is not easily expressed. The reactive silicon groups may be present on a terminal of the main chain of the molecule chain of the organic polymer(s) or a terminal of a side chain thereof, or may be present on both of the terminals. In particular, when the reactive silicon groups are present only on a terminal of the main chain of the molecular chain, a rubbery cured product exhibiting a high strength, a high elongation and a low elasticity is easily obtained since the effective network length of the polymer component(s) contained in the cured product, which is finally formed, becomes long.

Here, the above-mentioned polyoxyalkylene polymers are each a polymer which essentially has a repeating unit represented by the following general formula (6):

$$—R^6—O—\qquad(6)$$

(wherein $R^6$ is a linear or branched alkylene group having 1 to 14 carbon atoms). $R^6$ in the general formula (6) is a linear or branched alkylene group having 2 to 4 carbon atoms. Specific examples of the repeating unit represented by the general formula (6) include:

[Formula 2]

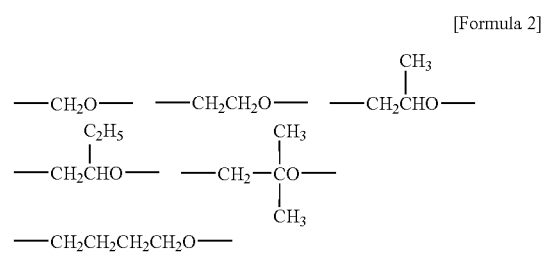

The main chain skeleton of the polyoxyalkylene polymer may be made of only one kind of repeating unit, or may be made of two or more kinds of repeating units. In the case that the composition is used, in particular, for a sealant, a material made of a polymer made mainly of a propylene oxide polymer is preferred since the material is amorphous and has a relatively low viscosity.

Examples of the method for synthesizing the polyoxyalkylene polymer include a polymerization method based on an alkali catalyst such as KOH, a polymerization method based on a transition metal compound/porphyrin complex catalyst obtained by reaction between an organic aluminum compound and porphyrin, as described in JP-A-61-215623, a polymerization method based on a double metal cyanide complex catalyst, as described in JP-B-46-27250, JP-B-59-15336, and U.S. Pat. Nos. 3,278,457, 3,278,458, 3,278,459, 3,427,256, 3,427,334, 3,427,335, and other publications; a polymerization method using a catalyst made of a polyphosphazene salt, as exemplified in JP-A-10-273512; and a polymerization method using a catalyst made of a phosphazene compound, as exemplified in JP-A-11-060722. However, the method is not limited thereto.

Examples of the method for producing the polyoxyalkylene polymer having a reactive silicon group include methods suggested in JP-B-45-36319 and 46-12154, JP-A-50-156599, 54-6096, 55-13767, 55-13468 and 57-164123, JP-B-3-2450, and U.S. Pat. Nos. 3,632,557, 4,345,053, 4,366,307, 4,960,844, and other publications; and polyoxyalkylene polymers having a number-average molecular weight of 6,000 or more and a Mw/Mn of 1.6 or less, which has a high molecular weight and a narrow molecular weight distribution, as suggested in JP-A-61-197631, 61-215622, 61-215623, 61-218632, 3-72527, 3-47825, and 8-231707. However, the method is not particularly limited thereto.

The above-mentioned polyoxyalkylene polymers having a reactive silicon group may be used alone or in combination of two or more thereof.

The saturated hydrocarbon polymers are each a polymer which does not substantially contain any carbon-carbon unsaturated bond other than those in an aromatic ring. The polymer which constitutes the skeleton thereof can be obtained by a method (1) of polymerizing, as a main monomer, an olefin compound having 2 to 6 carbon atoms, such as ethylene, propylene, 1-butene or isobutylene, a method (2) of homo-polymerizing a diene compound such as butadiene or isoprene, or copolymerizing the diene compound and one or more out of the above-mentioned olefin compounds, and then hydrogenating the homopolymer or copolymer, or some other methods. Isobutylene polymers or hydrogenated polybutadiene polymers are preferred since one or more functional groups can easily be introduced into a terminal thereof, the molecular weight thereof is easily controlled and further the number of the terminal functional groups can be made large. The isobutylene polymers are particularly preferred.

The organic polymer (A) having a main chain skeleton made of a saturated hydrocarbon polymer has a very good characteristic in heat resistance, weather resistance, durability, and moisture blocking property.

The isobutylene polymers may each be a polymer wherein all of their monomer units are isobutylene units, or a copolymer made from isobutylene units and a different monomer. From the viewpoint of rubbery characteristics, the repeating units originating from isobutylene are contained preferably in an amount of 50% or more by weight, more preferably in an amount of 80% or more by weight, in particular preferably in an amount of 90 to 99%.

As the method for synthesizing the saturated hydrocarbon polymer, hitherto various polymerization methods have been reported. In recent years, in particular, a large number of, what is called, living polymerizations have been developed. In the case of a saturated hydrocarbon polymer, in particular, an isobutylene polymer, the following are known: the polymer can easily be produced by using inifer polymerization found out by Kennedy et al. (J. P. Kennedy et al., J. Polymer Sci., Polymer Chem. Ed. 1997, vol. 15, 2843); the polymer can be produced by polymerization, so as to have a molecular weight of about 500 to 100,000 and a molecular weight distribution of 1.5 or less; and various functional groups can be introduced into a terminal of the molecule.

The method for synthesizing the saturated hydrocarbon polymer having a reactive silicon group is described in, for example, JP-B-4-69659 and 7-108928, JP-A-63-254149, 64-22904 and 1-197509, Japanese Patent Official Gazette Nos. 2539445 and 2873395, JP-A-7-53882, and other publications. However, the method is not particularly limited thereto.

The above-mentioned saturated hydrocarbon polymers having a reactive silicon group may be used alone or in combination of two or more thereof.

The (meth)acrylate monomer which constitutes the main chain of the above-mentioned (meth)acrylate polymers is not particularly limited, and various monomers can be used. Examples thereof include (meth)acrylic acid based monomers such as (meth)acrylic acid, methyl(meth)acrylate, ethyl (meth)acrylate, n-propyl(meth)acrylate, isopropyl(meth) acrylate, n-butyl(meth)acrylate, isobutyl(meth)acrylate, tert-butyl(meth)acrylate, n-pentyl(meth)acrylate, n-hexyl(meth) acrylate, cyclohexyl(meth)acrylate, n-heptyl(meth)acrylate, n-octyl(meth)acrylate, 2-ethylhexyl(meth)acrylate, nonyl (meth)acrylate, decyl(meth)acrylate, dodecyl(meth)acrylate, phenyl(meth)acrylate, tolyl(meth)acrylate, benzyl(meth) acrylate, 2-methoxyethyl(meth)acrylate, 3-methoxybutyl (meth)acrylate, 2-hydroxyethyl(meth)acrylate, 2-hydroxypropyl(meth)acrylate, stearyl(meth)acrylate, glycidyl (meth)acrylate, 2-aminoethyl (meth)acrylate, γ-(methacryloyloxypropyl)trimethoxysilane, γ-(methacryloyloxypropyl)dimethoxymethylsilane, methacryloyloxymethyltrimethoxysilane, methacryloyloxymethyltriethoxysilane, methacryloyloxymethyldimethoxymethylsilane, methacryloyloxymethyldiethoxymethylsilane, an ethylene oxide adduct of (meth)acrylic acid, trifluoromethylmethyl(meth) acrylate, 2-trifluoromethylethyl(meth)acrylate, 2-perfluoroethylethyl(meth)acrylate, 2-perfluoroethyl-2-perfluorobutylethyl(meth)acrylate, perfluoroethyl(meth)acrylate, trifluoromethyl(meth)acrylate, bis(trifluoromethylmethyl) (meth)acrylate, 2-trifluoromethyl-2-perfluoroethylethyl (meth)acrylate, 2-perfluorohexylethyl(meth)acrylate, 2-perfluorodecylethyl(meth)acrylate, 2-perfluorohexadecylethyl (meth)acrylate and the like.

In the (meth)acrylate polymers, any (meth)acrylate monomer may be copolymerized with a vinyl monomer, which will be described hereinafter. Examples of the vinyl monomer include styrene monomers such as styrene, vinyltoluene, α-methylstyrene, chlorostyrene, styrenesulfonic acid and salts thereof, and the like; fluorine-containing vinyl monomers such as perfluoroethylene, perfluoropropylene, fluorinated vinylidene and the like; silicon-containing vinyl monomers such as vinyltrimethoxysilane, vinyltriethoxysilane and the like; maleic anhydride, maleic acid, and monoalkyl esters and dialkyl esters of maleic acid; fumaric acid, monoalkyl ester and dialkyl ester of fumaric acid; maleimide monomers such as maleimide, methylmaleimide, ethylmaleimide, propylmaleimide, butylmaleimide, hexylmaleimide, octylmaleimide, dodecylmaleimide, stearylmaleimide, phenylmaleimide, cyclohexylmaleimide and the like; nitrile-group-containing vinyl monomers such as acrylonitrile, methacrylonitrile and the like; amide-group-containing vinyl monomers such as acrylamide, methacrylamide and the like; vinyl esters such as vinyl acetate, vinyl propionate, vinyl pivalate, vinyl benzoate, vinyl cinnamate and the like; alkenes such as ethylene, propylene and the like; conjugated dienes such as butadiene, isoprene and the like; and vinyl chloride, vinylidene chloride, allyl chloride, allyl alcohol and the like.

These may be used alone, or plural ones thereof may be copolymerized. Among them, a polymer made from a styrene monomer and a (meth)acrylic acid based monomer is preferred from the viewpoint of physical properties of the product, and others. More preferred is a (meth) acrylic polymer made from an acrylic acid ester monomer and a methacrylic acid ester monomer. Particularly preferred is an acrylic polymer made from an acrylic acid ester monomer. In articles for general buildings, a butyl acrylate based monomer is further preferred since the composition is required to have a low viscosity and the curd product is required to have a low modulus, a high elongation, weather resistance, heat resistance and other physical properties. On the other hand, in articles required to have oil resistance and others, for cars, a copolymer made mainly of ethyl acrylate is further preferred. This polymer made mainly of ethyl acrylate is excellent in oil resistance, but tends to be somewhat poor in low-temperature property (cold resistance); therefore, in order to improve the low-temperature property, ethyl acrylate is partially substituted with butyl acrylate. However, a good oil resistance is gradually damaged with an increase in the ratio of butyl acrylate. In articles required to have oil resistance, the ratio is preferably 40% or less, more preferably 30% or less. It is also preferred to use 2-methoxyethyl acrylate or 2-ethoxyethyl acrylate, wherein oxygen is introduced into an alkyl group of a side chain, in order to improve the low-temperature property and others without damaging the oil resistance. However, when the alkoxy group, which has an ether bond, is introduced to the side chain, a poor heat resistance tends to be exhibited; thus, when heat resistance is required, the ratio thereof is preferably 40% or less. The ratio is varied, considering oil resistance, heat resistance, low-temperature property and other physical properties necessary in accordance with usages or a requested purpose. In this way, an appropriate polymer can be obtained. An unrestricted example excellent in physical balances between oil resistance, heat resistance, low-temperature property and others is a copolymer of ethyl acrylate/butyl acrylate/2-methoxyethyl acrylate (ratio by weight: 40 to 50/20 to 30/30 to 20). In the present invention, a monomer out of these preferred monomers may be copolymerized with a different monomer, or may be block-copolymerized therewith. At this time, the preferred monomer is contained preferably at a ratio by weight of 40% or more. In the above-mentioned expressions, for example, (meth) acrylic acid represents acrylic acid and/or methacrylic acid.

The method for synthesizing such a (meth)acrylate polymer is not particularly limited, and may be a known method. However, the polymer obtained by an ordinary free-radical polymerization method using an azo compound, a peroxide or the like as a polymerization initiator has a problem that the value of the molecular weight distribution is generally as large as 2 or more, and the viscosity becomes high. Accordingly, it is preferred to use a living radical polymerization method in order to yield a (meth)acrylate polymer having a narrow molecular weight distribution and a low viscosity and containing, at a terminal of the molecule chain thereof, a crosslinkable functional group at a high content by percentage.

Out of variations of the "living radical polymerization method", the "atom transfer radical polymerization method" of polymerizing the (meth)acrylate monomer, using an organic halide, halogenated sulfonyl compounds or the like as an initiator and a transition metal complex as a catalyst, is more preferred as a method for producing a (meth)acrylate polymer having a specific functional group since the terminal has a halogen or the like, which is relatively advantageous for functional-group-converting reaction, and the flexibility in design of the initiator or the catalyst is large as well as the characteristics of the above-mentioned "living polymerization method" are exhibited. This atom transfer radical polymerization method is described in, for example, Matyjaszewski et al., J. Am. Chem. Soc., 1995, vol. 117, 5614.

As the method for producing the (meth)acrylate polymer having a reactive silicon group, a production process using a free radical polymerization method using a chain transfer agent is disclosed in, for example, JP-B-3-14068 and 4-55444, and JP-A-6-211922. JP-A-9-272714 and others disclose a production process using an atom transfer radical polymerization method. However, the method is not particularly limited thereto.

The above-mentioned (meth)acrylate polymers having a reactive silicon group may be used alone or in combination of two or more thereof.

The organic polymer (A) having a reactive silicon group may be any one of the above-mentioned organic polymers having various main chain skeletons, or a mixture of two or more thereof. Specifically, the following may be used as the organic polymer (A): an organic polymer obtained by blending two or more selected from the group consisting of polyoxyalkylene polymer having a reactive silicon group, saturated hydrocarbon polymer having a reactive silicon group, and (meth)acrylate polymer having a reactive silicon group.

The method for producing an organic polymer wherein a polyoxyalkylene polymer having a reactive silicon group is blended with a (meth)acrylate polymer having a reactive silicon group is suggested in JP-A-59-122541, 63-112642, 6-172631 and 11-116763, and other publications. However, the method is not particularly limited thereto. A preferred specific example thereof is a method of blending a polyoxyalkylene polymer having a reactive silicon group with a copolymer which has a reactive silicon group and has a molecular chain composed substantially of (meth)acrylate monomer units each having 1 to 8 carbon atoms and represented by the following general formula (7)

$$—CH_2—C(R^7)(COOR^8)—\qquad(7)$$

(wherein $R^7$ represents a hydrogen atom or a methyl group, and $R^8$ represents an alkyl group having 1 to 8 carbon atoms), and (meth)acrylate monomer units each having an alkyl group having 10 or more carbon atoms and represented by the following general formula (8):

$$—CH_2—C(R^7)(COOR^9)—\qquad(8)$$

(wherein $R^7$ has the same meaning as described above, and $R^9$ represents an alkyl group having 10 or more carbon atoms).

Examples of $R^8$ in the general formula (7) include alkyl groups having 1 to 8 carbon atoms, preferably 1 to 4 carbon atoms, more preferably 1 to 2 carbon atoms, such as a methyl, ethyl, propyl, n-butyl, t-butyl, and 2-ethylhexyl group. The alkyl groups as $R^8$ may be used alone or in the form of a mixture of two or more thereof.

Examples of $R^9$ in the general formula (8) include long-chain alkyl groups having 10 or more carbon atoms, usually 10 to 30 carbon atoms, preferably 10 to 20 carbon atoms, such as lauryl, tridecyl, cetyl, stearyl, and behenyl groups. The alkyl groups as $R^9$ may be used alone or in the form of a mixture of two or more thereof.

The molecular chain of the (meth)acrylate copolymer is composed substantially of the monomer units of the formulae (7) and (8). The word "substantially" referred to herein means that the total amount of the monomer units of the formulae (7) and (8) present in the copolymer is over 50% by weight. The total amount of the monomer units of the formulae (7) and (8) is preferably 70% or more by weight. The presence ratio by weight of the monomer units of the formula (7) to the monomer units of the formula (8) is preferably from 95/5 to 40/60, more preferably from 90/10 to 60/40.

Examples of a monomer unit which is different from the monomer units of the formulae (7) and (8) and may be contained in the copolymer include acrylic acids such as acrylic acid, methacrylic acid and the like; monomers containing an amide group, such as acrylamide, methacrylamide, N-methylolacrylamide, N-methylolmethacrylamide and the like, those containing an epoxy group, such as glycidyl acrylate, glycidyl methacrylate and the like, and those containing a nitrogen-containing group, such as diethylaminoethyl acrylate, diethylaminoethyl methacrylate, aminoethylvinylether and the like; and other monomer units originating from acrylonitrile, styrene, α-methylstyrene, alkyl vinyl ether, vinyl chloride, vinyl acetate, vinyl propionate, ethylene, or the like.

An organic polymer wherein a saturated hydrocarbon polymer having a reactive silicon group is blended with a (meth)acrylate copolymer having a reactive silicon group is suggested in JP-A-1-168764 and 2000-186176, and other publications. However, the polymer is not limited thereto.

A different example of the method for producing an organic polymer containing, as a blend component, a (meth)acrylate copolymer having a reactive silicon functional group is a method of polymerizing a (meth)acrylate monomer in the presence of an organic polymer having a reactive silicon group. This production method is specifically disclosed in JP-A-59-78223, 59-168014, 60-228516 and 60-228517, and other publications. However, the method is not limited thereto.

On the other hand, the main chain skeleton of the organic polymer(s) may contain a different component such as a urethane bond component as long as the advantageous effects of the present invention are not largely damaged.

The urethane bond component is not particularly limited, and an example thereof is a group generated by reaction between an isocyanate group and an active hydrogen group (and the group may be referred to as an amide segment hereinafter).

The amide segment is represented by the following general formula (9):

$$-NR^{10}-C(=O)- \tag{9}$$

(wherein $R^{10}$ represents a hydrogen atom or a substituted or unsubstituted organic group).

Specific examples of the amide segment include a urethane group generated by reaction between an isocyanate group and a hydroxyl group; a urea group generated by reaction between an isocyanate group and an amino group; and a thiourethane group generated by reaction between an isocyanate group and a mercapto group, and the group. In the present invention, groups generated by causing the active hydrogen occurring in the urethane group, the urea group and the thiourethane group to react further with an isocyanate group are also contained in the category of the group of the formula (9).

An example of the method for producing an organic polymer having an amide segment and a reactive silicon group with industrial ease is a method of causing an organic polymer having an active-hydrogen-containing group as its terminal to react with an excessive amount of a polyisocyanate compound to prepare a polymer having an isocyanate group at its polyurethane main chain terminal, and subsequently or simultaneously causing a part or the whole of individuals of the isocyanate group to react with a U group of a silicon compound represented by the following general formula (10):

$$W-R^{11}-SiR^{1}{}_{3-a}X_{a} \tag{10}$$

(wherein $R^1$, X and a have the same meanings as the above general formula (3), and $R^{11}$ is a bivalent organic group, more preferably a substituted or unsubstituted bivalent hydrocarbon group having 1 to 20 carbon atoms; and W is an active-hydrogen-containing group selected from hydroxyl, carboxyl, mercapto, and mono-substituted or unsubstituted amino groups), thereby producing the polymer. Examples of known organic polymer-producing methods related to this production method include methods disclosed in JP-B-46-12154 (U.S. Pat. No. 3,632,557), JP-A-58-109529 (U.S. Pat. No. 4,374,237), JP-A-62-13430 (U.S. Pat. No. 4,645,816), JP-A-8-53528 (EP 0676403), JP-A-10-204144 (EP 0831108), JP-A-2003-508561 as Japanese Patent Application National Publication (U.S. Pat. No. 6,197,912), JP-A-6-211879 (U.S. Pat. No. 5,364,955), JP-A-10-53637 (U.S. Pat. No. 5,756,751), JP-A-11-100427, 2000-169544, 2000-169545 and 2002-212415, Japanese Patent No. 3313360, U.S. Pat. Nos. 4,067,844 and 3,711,445, and JP-A-2001-323040, and other publications.

Another example of the above-mentioned method is a method of causing a polymer having an active-hydrogen-containing group at its terminal to react with a reactive-silicon-group-containing isocyanate compound represented by the following general formula (11):

$$O=C=N-R^{11}-SiR^{1}{}_{3-a}X_{a} \tag{11}$$

(wherein $R^1$, $R^{11}$, X and a have the same meanings as the above general formulae (3) and (10)), thereby producing the polymer. Examples of known organic polymer-producing methods related to this production method include methods disclosed in JP-A-11-279249 (U.S. Pat. No. 5,990,257), JP-A-2000-119365 (U.S. Pat. No. 6,046,270), JP-A-58-29818 (U.S. Pat. No. 4,345,053), JP-A-3-47825 (U.S. Pat. No. 5,068,304), JP-A-11-60724, 2002-155145 and 2002-249538, WO 03/018658, WO 03/059981 and other publications.

Examples of the organic polymer having an active-hydrogen-containing group at its terminal include oxyalkylene polymer having a hydroxyl group at its terminal (polyetherpolyol), polyacrylpolyol, polyesterpolyol, saturated hydrocarbon polymer having a hydroxyl group at its terminal (polyolefinpolyol), polythiol compounds, polyamine compounds, polyalkyleneimine, polysiloxane and the like. Among them, polyetherpolyol, polyacrylpolyol, polyolefinpolyol, and polysiloxane are preferred since the resultant organic polymer has a relatively low glass transition temperature and the resultant cured product has very good cold resistance. The polyetherpolyol is particularly preferred since the resultant organic polymer has a low viscosity to exhibit a good workability and the depth curability thereof is good. The polyacrylpolyol and the saturated hydrocarbon polymers are more preferred since the cured product of the resultant organic polymer has good weather resistance and heat resistance.

As the polyetherpolyol, polyetherpolyol that is produced by any method can be used. Preferred is polyetherpolyol having, at its terminal, a hydroxyl group the number of individuals of which is at least 0.7 per molecular terminal on the average of all the molecules. Specific examples thereof include oxyalkylene polymer produced by use of a conventional alkali metal catalyst; and oxyalkylene polymer produced by causing an initiator such as a polyhydroxy compound, which has at least two hydroxyl groups, to react with an alkylene oxide in the presence of a double metal cyanide complex or cesium.

Out of the above-mentioned polymerization methods, the polymerization method using a double metal cyanide complex is preferred since the method makes it possible to yield oxyalkylene polymer having a lower unsaturated degree, a narrow Mw/Mn, a lower viscosity, a high acid resistance and a high weather resistance.

The polyacrylpolyol may be a polyol having a skeleton of an alkyl(meth)acrylate (co)polymer and having in the molecule thereof a hydroxyl group. The method for synthesizing the polymer is preferably a living radical polymerization method since a polymer having a narrow molecular weight distribution and a low viscosity can be obtained. An atom transfer radical polymerization method is more preferred. It is also preferred to use a polymer based on the so-called SGO process, which is obtained by subjecting an alkyl acrylate ester monomer described in JP-A-2001-207157 to continuous bulk polymerization at high temperature and high pressure. A specific example thereof is a "UH-2000" manufactured by Toagosei Co., Ltd or the like.

Specific examples of the above-mentioned polyisocyanate compound include aromatic polyisocyanates such as toluene (tolylene)diisocyanate, diphenylmethane diisocyanate, xylylene diisocyanate and the like; and aliphatic polyisocyanates such as isophoronediisocyanate, and hexamethylenediisocyanate and the like.

The silicon compound of the above general formula (10) is not particularly limited, and specific examples thereof include amino-group-containing silanes such as γ-aminopropyltrimethoxysilane, N-(β-aminoethyl)-γ-aminopropyltrimethoxysilane, γ-(N-phenyl)aminopropyltrimethoxysilane, N-ethylaminoisobutyltrimethoxysilane, N-cyclohexylaminomethyltriethoxysilane, N-cyclohexylaminomethyldiethoxymethylsilane, N-phenylaminomethyltrimethoxysilane and the like; hydroxy-group-containing silanes such as γ-hydroxypropyltrimethoxysilane and the like; and mercapto-group-containing silanes such as γ-mercaptopropyltrimethoxysilane and the like, and the like. As described in JP-A-6-211879 (U.S. Pat. No. 5,364,955), JP-A-10-53637 (U.S. Pat. No. 5,756,751), JP-A-10-204144 (EP 0831108), and JP-A-2000-169544 and 2000-169545, the following can also be used as the silicon compound of the general formula (10): Michael addition reactants made from a variety of α,β-unsaturated carbonyl compounds and an amino-group-containing silane; and Michael addition reactants made from a variety of (meth)acryloyl-group-containing silanes and an amino-group-containing compound.

The reactive-silicon-group-containing isocyanate compound of the above general formula (11) is not particularly limited, and specific examples thereof include γ-trimethoxysilylpropylisocyanate, γ-triethoxysilylpropylisocyanate, γ-methyldimethoxysilylpropylisocyanate, γ-methyldiethoxysilylpropylisocyanate, trimethoxysilylmethylisocyanate, diethoxymethylsilylmethylisocyante, dimethoxymethylsilylmethylisocyante, diethoxymethylsilylmethylisocyante and the like. As described in JP-A-2000-119365 (U.S. Pat. No. 6,046,270), a compound obtained by causing a silicon compound of the general formula (10) to react with an excessive amount of the above-mentioned polyisocyanate compound can also be used as the reactive-silicon-group-containing isocyanate compound of the general formula (11).

When the amount of the amide segment in the organic polymer(s) (A) in the present invention is large, the viscosity of the organic polymer tends to be high. After the storage of the polymer(s), the viscosity may also rise so that the workability of the resultant composition may lower. Accordingly, in order to obtain a composition having very good storage stability and workability, it is preferred that the amide segment is not substantially contained therein. On the other hand, the amide segment in the main chain skeleton of the organic polymer (A) tends to cause an improvement in the curability of the composition of the present invention. Accordingly, when the main chain skeleton of the organic polymer (A) contains an amide segment, the number of individuals of the amide segment is preferably from 1 to 10, more preferably from 1.5 to 7, in particular preferably from 2 to 5 per molecule on the average. If the number is less than 1, the curability may be sufficient. If the number is more than 10, the organic polymer (A) becomes highly viscous so that a composition poor in workability may be obtained.

Out of the organic polymers produced by use of the compound of the general formula (10) or (11) by any one of the above-mentioned methods, an organic polymer made of a compound wherein $R^{11}$ is —$CH_2$— tends to have a particularly good curability.

<Fluoride Salt Compound (B)>

The curable composition of the present invention contains a fluoride salt compound (B) as a curing catalyst for the organic polymer (A) having a reactive silicon group. The fluoride salt compound referred to herein is a compound capable of acting as a fluorine anion.

Specific examples of the fluoride salt compound (B) include ammonium fluoride salt compounds such as ammonium fluoride, tetramethylammonium fluoride, tetraethylammonium fluoride, tetrapropylammonium fluoride, tetrabutylammonium fluoride, tetraoctylammonium fluoride, and benzyltrimethylammonium fluoride; metal fluorides such as LiF, NaF, $Na_3AlF_6$, KF, RbF, CsF, $BeF_2$, $MgF_2$, $CaF_2$, $Ca_{10}(PO_4)_6F_2$, $SrF_2$, $BaF_2$, $AlF_3$, $GaF_3$, $InF_3$, $TiF_4$, $CuF_2$, AgF, $AgF_2$, $ZnF_2$, $SnF_2$, $SnF_4$, $PdF_3$, $SbF_3$, $CrF_3$, $YF_3$, $LaF_3$, $CeF_3$, $PrF_3$, $NdF_3$, $SmF_3$, $EuF_3$, $GdF_3$, $TbF_3$, $DyF_3$, $HoF_3$, and $ErF_3$, hydrates of metal fluorides; hydrogenammonium fluoride, salts each made from hydrogen fluoride and an amine that may be of various types, such as hydrogentriethylammonium fluoride and hydrogenpyridium fluoride, hydrogenammonium difluorides such as hydrogentetrabutylammonium difluorides, hexakis(dimethylamino)phosphazenium fluoride, $Na_2SiF_6$, $K_2SiF_6$, and $(NH_4)_2SiF_6$. However, the fluoride salt compound (B) is not limited thereto. The fluoride salt compound may be in the form that the compound is carried on silica gel alumina.

Of these examples, ammonium fluoride salt compounds are preferred and tetrabutylammonium fluoride is particularly preferred from the viewpoint of the height of curing catalyst activity.

In the meanwhile, in the case of a tertiary substituted ammonium fluoride having, as a substituent, a hydrocarbon group, such as tetrabutylammonium fluoride, the fluoride salt is instable in the state that the salt is isolated. For this reason, the salt is supplied in a solvent state that the salt is dissolved in water or an organic solvent. Thus, there is caused a problem that when the salt is used as a catalyst, a curable composition good in storage stability is not easily obtained by effect of water, or a large amount of a volatile component remains easily in the resultant sealants or adhesives by effect of the organic solvent. Additionally, the salt is generally expensive to give a problem about industrially practical utility.

In light of such problems, the following will describe preferred ammonium fluoride compounds. The following definitions of the preferred ammonium fluoride compounds are independent of each other, and doubly-defined compounds will also be described.

First, from the viewpoint of height in industrially practical utility, as the fluoride salt compound (B), the following is preferably used: a fluoride salt compound (B1) which is a substituted ammonium fluoride or an unsubstituted ammonium fluoride and is represented by the following general formula (1) in a case where the fluoride salt compound (B) is the substituted ammonium fluoride wherein its substituent is a hydrocarbon group or in a case where the fluoride salt compound (B) is the unsubstituted ammonium fluoride:

$R_{4-m}NH_mF(HF)_n$ (wherein R(s) is/are a substituted or unsubstituted hydrocarbon group, 0≤m≤4, and n represent 0 or a positive number, provided that m and n are not 0 at the same time).

Among fluoride salt compounds (B1), which are preferred from the viewpoint that the industrially practical utility is high, an ammonium hydrofluoride compound (B2) is preferred since the compound is high in practical utility and the curability easily becomes high. The ammonium hydrofluoride compound (B2) denotes an ionically bonded compound composed of an ammonium cation and a hydrofluoride anion, and may be called an ammonium fluorohydrogenate compound.

The ammonium cation constituting the ammonium hydrofluoride compound (B2) is not particularly limited, and may have a structure known in the prior art. Examples thereof include ammonium ($NH_4^-$), primary ammonium cations, such as methylammonium, ethylammonium, n-propylammonium, allyammonium, isopropylammonium, n-butylammonium, amylammonium, n-octylammonium, 2-ethylhexylammonium, nonylammonium, decylammonium, laurylammonium, pentadecylammonium, cetylammonium, stearylammonium, oleylammonium, cyclohexylammonium, benzylammonium, phenylammonium, laurylphenylammonium, and stearylphenylammonium; secondary ammonium cations, such as dimethylammonium, diethylammonium, di n-propylammonium, diallylammonium, diisopropylammonium, di n-butylammonium, diamylammonium, di n-hexylammonium, di n-octylammonium, b is 2-ethylhexylammonium, didecylammonium, dilaurylammonium, dicetylammonium, distearylammonium, dioleylammonium, dicyclohexylammonium, dibenzylammonium, diphenylammonium, methylstearylammonium, ethylstearylammonium, butylstearylammonium, pyrrolidinium, and piperidinium; tertiary ammonium cations, such as trimethylammonium, triethylammonium, tri n-propylammonium, triisopropylammonium, triallylammonium, tri n-butylammonium, triamylammonium, tri n-hexylammonium, tri n-octylammonium, tri 2-ethylhexylammonium, trilaurylammonium, tristearylammonium, trioleylammonium, tribenzylammonium, triphenylammonium, diethylisopropylammonium, dimethylbenzylammonium, and pyridinium; and quaternary ammonium cations, such as tetraalkylammonium cations such as tetramethylammonium, tetraethylammonium, tetra n-propylammonium, tetraisopropylammonium, tetra n-butylammonium, n-propyltrimethylammonium, methyltri n-octylammonium and benzyltrimethylammonium, an alkylimidazolium cation represented by the following general formula (12):

[Formula 3]

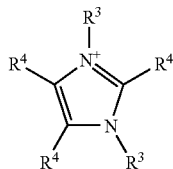

(12)

(wherein two $R^3$s are each independently a hydrocarbon group having 1 to 20 carbon atom(s), and three $R^4$s are each independently a hydrogen atom or a hydrocarbon group having 1 to 4 carbon atom (s)), alkylpyrrolidinium cations such as 1,1-dimethylpyrrolidinium, 1-methyl-1-ethylpyrrolidinium, and 1-methyl-1-butylpyrrolidinium, alkyl piperidinium cations such as 1,1-dimethylpiperidinium and 1-methyl-1-n-propylpiperidinium, alkylpyridinium cations such as 1-ethylpyridinium, 1-n-butylpyridinium, 1-n-hexylpyridinium, 1-n-butyl-3-methylpyridinium and 1-n-butyl-$_{4-m}$ethylpyridinium, and alkylimidazolium cations such as 3-n-butyl-$_{4-m}$ethylimidazolium and 3-n-butyl-5-methylimidazolium.

Other examples thereof include ammonium cations in each of which a proton is added to an amine, such as monoethanolamine, diethanolamine, triethanolamine, 3-hydroxypropylamine, diethylenetriamine, triethylenetetramine, 3-methoxypropylamine, 3-lauryloxypropylamine, 3-dimethylaminopropylamine, 3-diethylaminopropylamine, xylilenediamine, ethylenediamine, hexamethylenediamine, triethylenediamine, imidazole, thiazole, oxazole, guanidine, phenylaguanidine, diphenylguanidine, butylbiguanide, o-tolylbiguanide, 2,4,6-tris(dimethylaminomethyl)phenol, morpholine, N-methylmorpholine, 2-ethyl-$_{4-m}$ethylimidazole, 1,8-diazabicyclo[5,4,0]undecene-7 (DBU), 6-(dibutylamino)-1,8-diazabicyclo[5,4,0]undecene-7 (DBA-DBU), 1,5-diazabicyclo[4,3,0]nonene-5 (DBN), or 1,4-diazabicyclo[2,2,2]octane (DABCO).

Of these ammonium cations, quaternary substituted ammonium cations are preferred since the ammonium hydrofluoride compounds (B2) are chemically stable, are easy to handle and do not easily release HF gas, which is high in toxicity, so as to become high in safety easily, and other advantages are produced. Furthermore, substituted ammonium cations having a heterocyclic structure are preferred since the ammonium hydrofluoride compounds (B2) are in a liquid form so as to be easily handled, and are high in industrially practical utility. An example of the substituted ammonium cations having a heterocyclic structure is an alkylimidazolium cation represented by the following general formula (12):

[Formula 4]

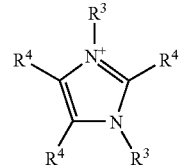

(12)

(wherein two $R^3$s are each independently a hydrocarbon group having to 20 carbon atom(s), and three $R^4$s are each independently a hydrogen atom or a hydrocarbon group having 1 to 4 carbon atom(s)).

In the general formula (12), any one of $R^3$s is not particularly limited as far as the radical is a hydrocarbon group having 1 to 20 carbon atom(s). Examples thereof include a methyl group, ethyl group, n-propyl group, isopropyl group, n-butyl group, n-octyl group, lauryl group, and stearyl group.

Of these examples, preferred are hydrocarbon groups having 1 to 4 carbon atom(s), such as a methyl group, ethyl group, n-propyl group, isopropyl group, and n-butyl group, and more preferred are methyl group and ethyl group since the ammonium hydrofluoride compounds (B2) are low in viscosity so as to be excellent in handleability.

Two $R^3$s are preferably different from each other since the ammonium hydrofluoride compounds (B2) easily become low in viscosity.

In the general formula (12), any one of $R^4$s is not particularly limited as far as the radical is a hydrogen atom or a hydrocarbon group having 1 to 4 carbon atom(s). Examples thereof include a hydrogen atom, and a methyl group, ethyl group, n-propyl group, isopropyl group and n-butyl group. Of these examples, preferred are a hydrogen atom and a methyl group, and more preferred is a hydrogen atom since the corresponding compounds are easily available and are high in practical utility.

Specific examples of the alkylimidazolium cation represented by the following general formula (12) include 1,3-dimethylimidazolium, 1-ethyl-3-methylimidazolium, 1-butyl-3-methylimidazolium, 1-octyl-3-methylimidazolium, 1-stearyl-3-methylimidazolium, and 1-ethyl-2,3-dimethylimidazolium. Of these examples, 1-ethyl-3-methylimidazolium is preferred as described above.

The hydrofluoride anion which constitutes the ammonium hydrofluoride compound (B2) has a structure represented by the following general formula (13):

$(HF)_nF^-$  (13)

(wherein n represents 0 or a positive number).

Here, n does not necessarily need to be an integer, and can be obtained as the average value by elementary analysis. n is 4.0 or less, more preferably 2.5 or less, even more preferably 2.3 or less since the ammonium hydrofluoride compound (B2) does not easily release HF gas, which is high in toxicity, so that the safety is apt to become high. On the other hand, n is preferably 2 or more, more preferably 2.3 or more since the catalytic activity of the ammonium hydrofluoride compound is apt to become high.

About the ammonium hydrofluoride compound (B2) in the present invention, the representation style thereof is indifferent as far as the compound is an ionically bonded compound composed substantially of an ammonium cation and a hydrofluoride anion. For example, the compound represented as triethylamine.3HF is substantially identical with triethylammonium.$(HF)_2F$, and is a kind of ammonium hydrofluoride compound.

Different examples of the above-mentioned fluoride salt compound (B1), which is preferred from the viewpoint of height in industrially practical utility, include primary, secondary and tertiary substituted ammonium fluoride salt compounds (B3) The primary, secondary and tertiary substituted ammonium fluoride salt compounds (B3) can each be prepared with ease by causing an amine and HF to react with each other, and are preferred since they are high in industrially practical utility.

The primary, secondary and tertiary substituted ammonium fluoride salt compounds (B3) are not particularly limited, and may be compounds known in the prior art. Examples thereof include primary ammonium fluorides, such as methylammonium fluoride, ethylammonium fluoride, n-propylammonium fluoride, allyammonium fluoride, isopropylammonium fluoride, n-butylammonium fluoride, amylammonium fluoride, n-octylammonium fluoride, 2-ethylhexylammonium fluoride, nonylammonium fluoride, decylammonium fluoride, laurylammonium fluoride, pentadecylammonium fluoride, cetylammonium fluoride, stearylammonium fluoride, oleylammonium fluoride, cyclohexylammonium fluoride, benzylammonium fluoride, phenylammonium fluoride, laurylphenylammonium fluoride, and stearylphenylammonium fluoride; secondary ammonium fluorides, such as dimethylammonium fluoride, diethylammonium fluoride, di n-propylammonium fluoride, diallylammonium fluoride, diisopropylammonium fluoride, di n-butylammonium fluoride, diamylammonium fluoride, di n-hexylammonium fluoride, di n-octylammonium fluoride, b is 2-ethylhexylammonium fluoride, didecylammonium fluoride, dilaurylammonium fluoride, dicetylammonium fluoride, distearylammonium fluoride, dioleylammonium fluoride, dicyclohexylammonium fluoride, dibenzylammonium fluoride, diphenylammonium fluoride, methylstearylammonium fluoride, ethylstearylammonium fluoride, butylstearylammonium fluoride, pyrrolidinium fluoride, and piperidinium fluoride; tertiary ammonium fluorides, such as trimethylammonium fluoride, triethylammonium fluoride, tri n-propylammonium fluoride, triisopropylammonium fluoride, triallylammonium fluoride, tri n-butylammonium fluoride, triamylammonium fluoride, tri n-hexylammonium fluoride, tri n-octylammonium fluoride, tris 2-ethylhexylammonium fluoride, trilaurylammonium fluoride, tristearylammonium fluoride, trioleylammonium fluoride, tribenzylammonium fluoride, triphenylammonium fluoride, diethylisopropylammonium fluoride, dimethylbenzylammonium fluoride, and pyridinium fluoride.

Other examples thereof include fluorides of an ammonium obtained by adding a proton to an amine, such as monoethanolamine, diethanolamine, triethanolamine, 3-hydroxypropylamine, diethylenetriamine, triethylenetetramine, 3-methoxypropylamine, 3-lauryloxypropylamine, 3-dimethylaminopropylamine, 3-diethylaminopropylamine, xylilenediamine, ethylenediamine, hexamethylenediamine, triethylenediamine, imidazole, thiazole, oxazole, guanidine, 1-phenylaguanidine, diphenylguanidine, butylbiguanide, o-tolylbiguanide, 2,4,6-tris(dimethylaminomethyl)phenol, morpholine, N-methylmorpholine, 2-ethyl-$_{4-m}$ethylimidazole, 1,8-diazabicyclo[5,4,0]undecene-7 (DBU), 6-(dibutylamino)-1,8-diazabicyclo[5,4,0]undecene-7 (DBA-DBU), 1,5-diazabicyclo[4,3,0]nonene-5 (DBN), or 1,4-diazabicyclo[2,2,2]octane (DABCO).

As the above-mentioned fluoride salt compound (B1), which is preferred from the viewpoint of height in industrially practical utility, the following is/are more preferred since the compound(s) is/are industrially versatile, and is/are easily available at low costs: unsubstituted ammonium fluoride ($NH_4F$) and/or unsubstituted hydrogenammonium fluoride ($NH_4F(HF)$), which may be called ammonium monohydrodifluoride, ammonium bifluoride, acidic ammonium fluoride or the like.

The above-mentioned fluoride salt compounds are preferably in a liquid form at normal temperature since the compounds are high in solubility and easily give a high catalytic activity. However, the compounds may be in a solid form when used. In this case, the compounds may be in a form which may be of various kinds, such as a powdery form or flake form, when used. The compounds are preferably powdery compounds, and are more preferably powdery compounds having a particle diameter of 150 μm or less since the reactivity easily becomes higher.

Fluoride salt compounds (B) as described above may be used alone or it may be added in combination of two or more thereof.

The use amount of the fluoride salt compound (B) is preferably from 0.001 to 30 parts by mass, more preferably from 0.01 to 10 parts by mass, even more preferably from 0.1 to 10 parts by mass, in particular preferably from 0.1 to 5 parts by mass for 100 parts by mass of the organic polymer (A). If the blend amount of the fluoride salt compound (B) is below this range, the curing rate may become small and further the catalytic activity may lower after the composition is stored. On the other hand, if the blend amount of the fluoride salt compound (B) is over the range, working life becomes too short so that the workability may deteriorate.

The fluoride salt compound (B) may be used alone, or may be used in the state that the compound is diluted with a solvent or the like. For example, in a case where the compatibility between the polymer (A) having a reactive silicon group and the fluoride salt compound (B) is insufficient, a uniform cured product may not be easily obtained when the fluoride salt compound (B) is used alone. However, when the solvent or the like is used, a uniform cured product can be obtained.

<Filler (C)>

The curable composition of the present invention may contain a filler (C) selected from at least one of the group consisting of precipitated calcium carbonate surface-treated with a substance other than any aliphatic acid, precipitated calcium carbonate surface-treated with an aliphatic acid (provided that the ratio by weight between fluorine atoms contained in the fluoride salt compound (B) and the precipitated calcium carbonate surface-treated with the aliphatic acid is 0.0015 or more), ground calcium carbonate, and silica.

The use of the filler in the curable composition of the present invention causes the adjustment of the workability of the curable composition, an improvement in the strength of the cured product and the adjustment of the strength, an improvement in the adhesive property thereof, the supply of chemical resistance thereto, and improvements in other various physical properties. In general, for these purposes, calcium carbonate is widely used as a filler. Calcium carbonate is classified into ground calcium carbonate, which is obtained by pulverizing a natural material and then classifying the resultant particles, and precipitated calcium carbonate, which is chemically produced (fine calcium carbonate). In general, precipitated calcium carbonate is smaller in the size of primary particles. In many cases, precipitated calcium carbonate is surface-treated with an organic substance such as an aliphatic acid. Of precipitated calcium carbonate, which having a particle diameter of 0.1 μm or less is called colloidal calcium carbonate. As the value of the specific surface area of calcium carbonate is larger (the particle diameter is smaller), the effect of improving the strength at break, the elongation at break, and the adhesive property of the cured product generally becomes larger. The use of calcium carbonate having a small particle diameter as the filler is advantageous for obtaining a cured product having a high strength. Thus, the use of colloidal calcium carbonate is more preferred. On the other hand, in order to obtain a cured product large in breaking elongation, the use of ground calcium carbonate is preferred.

However, when the fluoride salt compound (B) is used as a curing catalyst, the use of precipitated calcium carbonate surface-treated with an aliphatic acid tends to cause a remarkable fall in curing activity.

For this reason, in order to yield a composition having a good curability in the present invention, it is allowable to use, as the filler (C), a filler (C) selected from at least one of the group consisting of precipitated calcium carbonate surface-treated with a substance other than any aliphatic acid, precipitated calcium carbonate surface-treated with an aliphatic acid (provided that the ratio by weight between fluorine atoms contained in the fluoride salt compound (B) and the precipitated calcium carbonate surface-treated with the aliphatic acid is 0.0015 or more), ground calcium carbonate, and silica.

When precipitated calcium carbonate surface-treated with an aliphatic acid is used in the present invention, it is preferred that the ratio between the Ratio of mass of F (fluorine atoms) contained in the fluoride salt compound (B) and the mass of precipitated calcium carbonate surface-treated with the aliphatic acid (the Ratio of mass of F (fluorine atoms) contained in the fluoride salt compound (B)/the mass of precipitated calcium carbonate surface-treated with the aliphatic acid) is 0.0015 or more. If the ratio is less than this value, a practical curability tends not to be easily obtained.

Specific examples of the aliphatic acid, which is a surface treating agent for aliphatic-acid-surface-treated precipitated calcium carbonate, include caproic acid, caprylic acid, pelargonic acid, capric acid, undecanoic acid, lauric acid, myristic acid, palmitic acid, stearic acid, behenic acid, and oleic acid. Aliphatic acid soaps of these acids are also included in examples of the surface-treating agent for the aliphatic-acid-surface-treated precipitated calcium carbonate.

In the present invention, the following may be used as the filler (C): a filler selected from precipitated calcium carbonate surface-treated with a substance other than any aliphatic acid, ground calcium carbonate, and silica. A curable composition that has a good curability and can give a cured product having a sufficient strength is obtained.

Examples of the surface-treating agent other than any aliphatic acid include an ester of an aliphatic acid such as caproic acid, caprylic acid, pelargonic acid, capric acid, undecanoic acid, lauric acid, myristic acid, palmitic acid, stearic acid, behenic acid or oleic acid; sulfate type anionic surfactants such as polyoxyethylene alkyl ether sulfate and long-chain alcohol sulfate, and sodium and potassium salts thereof; and sulfonic acid type anionic surfactants such as alkylbenzenesulfonic acid, alkylnaphthalenesulfonic acid, paraffin sulfonic acid, α-olefinsulfonic acid and alkylsulfosuccinic acid, and sodium and potassium salts thereof.

As silica that can be used as the filler (C), various types may be used, examples thereof including fumed silica, precipitated silica, crystalline silica, and fused silica. Silica is preferred since the addition of a small amount thereof makes it possible to give a cured product high in strength. Silica is preferably used in order to yield a cured product high in transparency. As described in JP-A-2000-38560, a composition high in transparency can be yielded by using, as the filler, hydrophobic silica, which is silicon dioxide fine powder having a surface to which hydrophobic groups are bonded. The surface of the silicon dioxide fine powder is generally made of silanol groups (—SiOH). When an organic silicon halogen compound, an alcohol or the like is caused to react with the silanol groups, "—SiO-(hydrophobic groups)" are produced. The product substance is hydrophobic silica. Specifically, hydrophobic silica is a substance obtained by causing silanol groups present in the surface of silicon dioxide fine powder to react with dimethylsiloxane, hexamethylsilazane, dimethyldichlorosilane, trimethoxyoctylsilane, trimethylsilane or the like. For reference, silicon dioxide fine powder having a surface made of silanol groups (—SiOH) is called hydrophilic silica fine powder.

The use amount of the filler (C) is preferably from 5 to 500 parts by mass, more preferably from 10 to 200 parts by mass for 100 parts by mass of the organic polymer (A). About the filler (C), only one type thereof may be used, or two or more types thereof may be used in a mixture form.

In the curable composition of the present invention, a filler other than the filler (C) may be used together with the filler (C). Specific examples thereof include reinforcing fillers such as dolomite, silicic anhydride, hydrated silicic acid, and carbon black; magnesium carbonate, diatomaceous earth, calcined clay, clay, talc, titanium oxide, bentonite, organic bentonite, ferric oxide, aluminum fine powder, flint powder, zinc oxide, activated zinc flower, shirasu (volcanic soil) balloons, glass micro-balloons, organic micro-balloons made of phenol resin or vinylidene chloride resin, resin powders such as PVC powder and PMMA powder, and similar fillers; and fibrous fillers such as asbestos and glass fiber. When these fillers are each used, the use amount thereof is such an amount that the total amount of the filler plus the filler (C) is turned preferably into the range 5 to 500 parts by mass, more preferably into the range of 10 to 200 parts by mass for 100 parts by mass of the organic polymer (A).

<Other Filler>

When the workability (such as cutting property) of the composition or making the surface of the resultant cured product mat is required, the filler to be added may be an organic balloon or inorganic balloon. These filler may be subjected to surface treatment. Only one species thereof may be used, or two or more species thereof may be used in a mixture form. To improve the workability (such as anti-sagging), the particle diameter of the balloons is preferably 0.1 mm or less. To make the cured product surface mat, the diameter is preferably from 5 to 300 μm.

The curable composition of the present invention is preferably used as a sealant for siding boards made of a ceramic or the like, for joints of outer walls of houses, or for sealants of outer wall tiles, an adhesive, or the like.

When the curable composition is used for such an application, the resultant cured product is present on outer faces, such as joint portions; thus, it is desired to match a design of outer walls with a design of the cured product. In particular, in recent years, outer walls giving a high-grade impression, such as sputtering-coated walls, and walls to which a colored aggregate or the like is added, have been used; thus, importance of the design of the cured product has been increasing.

In order to obtain a design giving a high-grade impression, a scaly or granular filler is added to the curable composition of the present invention. Here, the addition of a granular filler gives a sandy particle surface in a sand-scattered tone or in a sandstone tone, or the addition of a scaly filler gives an irregular surface resulting from the scaly form. The resultant cured product matches with outer walls giving a high-grade impression, and is further excellent in chemical resistance. Thus, the cured product has a characteristic that its appearance giving a high-grade impression is kept for a long term.

The scaly or granular filler is not particularly limited to, and include, for example, a substance disclosed in JP-A-09-53063. The diameter thereof, which is appropriately selected in accordance with a material, a pattern or the like of the outer walls, is preferably 0.1 mm or more, more preferably from 0.1 to 5.0 mm. In the case of the scaly filler, the thickness is preferably 1/10 to 1/5 of the diameter (0.01 to 1.0 mm).

The addition amount of the scaly or granular filler is appropriately selected in accordance with the size of the scaly or granular filler, and the material, the pattern or the like of the outer walls, and is preferably from 1 to 200 parts by weight based on 100 parts by weight of the curable composition.

A material of the scaly or granular filler is not particularly limited to, and examples thereof include natural materials such as silica sand and mica, synthetic rubber, synthetic resin, and inorganic materials such as alumina. They may be appropriately colored in accordance with the material, the pattern or the like of the outer walls in order that when they are filled into the joints or the like, the design is made better. A preferred finishing method therefor, and the like are disclosed in JP-A-09-53063 and the like.

The scaly or granular substance may be incorporated into the curable composition in advance, or the substance may be incorporated into the curable composition when it is used.

For a similar purpose, balloons (preferably, those having an average particle diameter of 0.1 mm or more) may also be added to a curable composition. The resultant cured product can have a sandy surface in a sand-scattered tone or in a sandstone tone and can be made light. The balloon is filler in the form of a sphere having a hollow inside.

The balloons are not particularly limited to, and include, for example, substances disclosed in JP-A-10-251618, JP-A-02-129262, JP-A-04-8788, JP-A-04-173867, JP-A-05-1225, JP-A-07-113073, JP-A-09-53063, JP-A-2000-154368, JP-A-2001-164237, WO 97/05201 and the like.

Examples of the materials of the balloons include inorganic materials such as glass, volcanic soil, silica and the like; and organic materials such as phenol resin, urea resin, polystyrene, saran, composite materials made of an inorganic material and an organic material; and laminated materials composed of a plurality of layers are included. They may be used alone, or may be added in combination of a plurality of kinds.

The balloons may be those having coated surfaces, and those treated with various surface-treating agents. Specific examples thereof include a product wherein organic balloons are coated with calcium carbonate, talc, titanium oxide or the like, and a product wherein inorganic balloons are subjected to surface-treatment with an adhesion-imparting agent.

The particle diameter of the balloons is preferably 0.1 mm or more, more preferably from 0.2 to 5.0 mm, and particularly preferably from 0.5 to 5.0 mm. If the particle diameter is less than 0.1 mm, only the viscosity of the composition increases but the resultant cured product may not exhibit a sandy impression even if the balloons are added in a large amount.

When the balloons are added, the addition amount thereof may be appropriately selected in accordance with a design of interest. The balloons which have a particle diameter of 0.1 mm or more are added to the curable composition so as to give preferably a volume concentration of 5 to 25% by volume, and more preferably a volume concentration of 8 to 22% by volume. If the volume concentration of the balloons is less than 5% by volume, the sandy impression tends to be lost. If it is more than 25% by volume, the viscosity of the curable composition becomes high so that the workability tends to deteriorate. Additionally, the modulus of the resultant cured product also becomes high so that basic performances for a sealant or an adhesive tend to be damaged.

When the balloons are added, a slip inhibitor as disclosed in JP-A-2000-154368; an amine compound for giving irregularities to the surface of the resultant cured product to make the surface mat, as disclosed in JP-A-2001-164237; or the like can be added in combination. The amine compound is preferably a primary amine and/or a secondary amine which has/have a melting point of 35° C. or higher.

The balloons may also be thermally-expansive hollow fine particles as disclosed in JP-A-2004-51701, JP-A-2004-66749, or the like. The thermally-expansive hollow fine particles are plastic spheres wherein a low boiling point compound, such as a hydrocarbon having 1 to 5 carbon atoms, is encapsulated into a spherical form with a polymeric shell material (vinylidene chloride based copolymer, acrylonitrile based copolymer, or vinylidene chloride-acrylonitrile copolymer). When the thermally-expansive hollow fine particles are added to the curable composition of the present invention, an adhesive composition, which can be peeled from an adherend without breaking the adherend only by heating the composition when the composition becomes unnecessary and which can be further peeled by heating using no organic solvent, can be obtained. This is based on a mechanism that when portions of the adhesive are heated, a gas pressure inside the shells of the thermally-expansive hollow fine particles increases so that the polymeric shell material softens, thereby expanding dramatically to cause the adhesive surfaces to be peeled from each other.

When the curable composition of the present invention contains sealant cured particles, irregularities are formed on the surface of the resultant cured product, as well, and as a result, the design of the product can be made better. Preferred diameter, blend amount, material and the like of the sealant cured particles are disclosed in JP-A-2001-115142. The diameter is preferably from 0.1 to 1 mm, and more preferably from 0.2 to 0.5 mm. The blend amount is preferably from 5 to 100 parts by weight, and more preferably from 20 to 50 parts by weight based on 100 parts by weight of the curable composition.

The material thereof is not particularly limited as far as the material is a material used for sealants. Examples thereof include urethane resin, silicone, modified silicone, and polysulfide rubber. In particular, sealants cured product particles of a modified silicone type are preferred.

<Protonic Acid (D)>

In the present invention, a protonic acid (D) is used to produce an advantageous effect of improving the workability when the curable composition is handled.

The protonic acid referred to herein is a compound capable of supplying $H^+$ ions. More specifically, the acid is a compound having one or more functional groups each capable of supplying $H^+$ ions. Examples of the functional group(s) capable of supplying $H^+$ ions include a carboxylic acid (or carboxylate) group, a sulfonic acid (or sulfonate) group, and a phosphoric acid (or phosphate) group. In the present invention, the aliphatic acid(s) used for the surface-treatment of calcium carbonate is/are not included in the category of the protonic acid (D).

Specific examples of the compound having a carboxylic acid group include linear saturated aliphatic acids such as acetic acid, propionic acid, butyric acid, valeric acid, caproic acid, enanthic acid, caprylic acid, 2-ethylhexanoic acid, pelargonic acid, capric acid, undecanoic acid, lauric acid, tridecylic acid, myristic acid, pentadecylic acid, palmitic acid, heptadecylic acid, stearic acid, nonadecanoic acid, arachic acid, behenic acid, lignoceric acid, cerotic acid, montanoic acid, melissic acid, and lacceric acid; monoene unsaturated aliphatic acids such as undecylenic acid, linderic acid, tsuzuic acid, physeteric acid, myristoleic acid, 2-hexadecenoic acid, 6-hexadecenoic aid, 7-hexadecenoic acid, palmitoleic acid, petroselic acid, oleic acid, elaidic acid, asclepinic acid, vaccenic acid, gadoleic acid, gondoic acid, cetoleic acid, erucic acid, brassidic acid, selacholeic acid, ximenic acid, lumequeic acid, acrylic acid, methacrylic acid, angelic acid, crotonic acid, isocrotonic acid, and 10-undecenoic acid; polyene unsaturated aliphatic acids such as linoelaidic acid, linoleic acid, 10,12-octadecadienoic acid, hiragoic acid, α-eleostearic acid, β-eleostearic acid, punicic acid, linolenic acid, 8,11,14-eicosatrienoic acid, 7,10,13-docosatrienoic acid, 4,8,11,14-hexadecatetraenoiic acid, moroctic acid, stearidonic acid, arachidonic acid, 8,12,16,19-docasatetraenoic acid, 4,8,12,15,18-eicosapentaenoic acid, clupanodonic acid, nisinic acid, and docosahexaenoic acid; branched aliphatic acids such as 1-methylbutyric acid, isobutyric acid, 2-ethylbutyric acid, isovaleric acid, tuberculostearic acid, pivalic acid, 2,2-dimethylbutyric acid, 2-ethyl-2-methylbutyric acid, 2,2-diethylbutyric acid, 2,2-dimethylvaleric acid, 2-ethyl-2-methylvaleric acid, 2,2-diethylvaleric acid, 2,2-dimethylhexanoic acid, 2,2-diethylhexanoic acid, 2,2-dimethyloctanoic acid, 2-ethyl-2,5-dimethylhexanoic acid, neodecanoic acid, versatic acid; aliphatic acids having a triplet bond, such as propiolic acid, tariric acid, stearolic acid, crepenynic acid, ximenynic acid, and 7-hexadecynoic acid; alicyclic carboxylic acids such as naphthenic acid, malvalic acid, sterculic acid, hydronocarpic acid, chaulmoogric acid, gorlic acid, 1-methylcyclopentanecarboxylic acid, 1-methylcyclohexanecarboxylic acid, 2-methylbicyclo[2.2.1]-5-heptane-2-carboxylic acid, 1-adamantanecarboxylic acid, bicycle[2.2.1]heptane-1-carboxylic acid, and bicycle[2.2.2]octane-1-carboxylic acid; oxygen-containing aliphatic acids such as acetoacetic acid, ethoxyacetic acid, glyoxylic acid, glycolic acid, gluconic acid, sabinic acid, 2-hydroxytetradecanoic acid, ipurolic acid, 2,2-dimethyl-3-hydroxypropionic acid, 2-hydroxyhexadecanoic acid, jalapinolic acid, juniperic acid, ambretolic acid, aleuritic acid, 2-hydroxyoctadecanoic acid, 12-hydroxyoctadecanoic acid, 18-hydroxyoctadecanoic acid, 9,10-dihydroxyoctadecanoic acid, ricinoleic acid, kamlolenic acid, licanic acid, ferronic acid, cerebronic acid, and 2-methyl-7-oxabicyclo[2.2.1]-5-heptene-2-carboxylic acid; and halogen-substituted monocarboxylic acids such as chloroacetic acid, 2-chloroacrylic acid, and chlorobenzoic acid.

Examples of the aliphatic dicarboxylic acid include saturated dicarboxylic acids such as adipic acid, azelaic acid, pimelic acid, suberic acid, sebacic acid, ethylmalonic acid, glutaric acid, oxalic acid, malonic acid, succinic acid, oxydiacetic acid, dimethylmalonic acid, ethylmethylmalonic acid, diethylmalonic acid, 2,2-dimethylsuccinic acid, 2,2-diethylsuccinic acid, 2,2-dimethylglutaric acid, and 1,2,2-trimethyl-1,3-cyclopentanedicarboxylic acid; and unsaturated dicarboxylic acids such as maleic acid, fumaric acid, acetylenedicarboxylic acid, and itaconic acid. Examples of the polycarboxylic acid include aconitic acid, 4,4-dimethylaconitic acid, citric acid, isocitric acid, and 3-methylisocitric acid.

Examples of the aromatic carboxylic acid include aromatic monocarboxylic acids such as benzoic acid, 9-anthracenecarboxylic acid, atrolactinic acid, anisic acid, isopropylbenzoic acid, salicylic acid, and toluic acid; and aromatic polycarboxylic acids such as phthalic acid, isophthalic acid, terephthalic acid, carboxyphenylacetic acid, and pyromellitic acid.

Examples of the compound having a sulfonic acid group include linear alkylbenzenesulfonic acid such as nonylbenzenesulfonic acid, decylbenzenesulfonic acid, undecylbenzenesulfonic acid, dedecylbenzenesulofnic acid, tridecylbenzenesulfonic acid and tetradecylbenzenesulfonic acid; alkylnaphthalenesulfonic acids such as isopropylnaphthalenesulfonic acid, butylnaphthalenesulfonic acid, isobutylnaphthalenesulfonic acid and naphthalenesulfonic acid; and melaminesulfonic acid, di(2-ethylhexyl) sulfosuccinate, lauryl sulfosuccinate, polyoxyethylene laurylsulfosulfonic acid, dodecylsulfoacetic acid, N-acyl-N-methyltaurin, dimethyl-5-sulfoisophthalate, 5-amino-2-chlorobenzenesulfonic acid, 1-amino-2-napththol-4-sulfonic acid, aminobenzenesulfonic acid, 3-aminobenzenesulfonic acid, p-aminobenzenesulfonic acid (sulfanilic acid), aminomethanesulfonic acid, oxymethanesulfonic acid, o-cresolsulfonic acid, 4-chloroaniline-3-sulfonic acid, chlorosulfonic acid, 4-chlorobenzenesulfonic acid, trifluoromethanesulfonic acid, p-toluenesulfonic acid, p-toluenesulfonic acid monohydrate, m-nitrobenzenesulfonic acid, N,N-bis(2-hydroxyethyl)-2-aminoethanesulfonic acid, 2-hydroxyethanesulfonic acid, 2-[4-(2-hydroxyethyl)-1-piperazinyl]ethanesulfonic acid, 8-hydroxyquinoline-5-sulfonic acid monohydrate, hydroxylamine-o-sulfonic acid, 3-pyridinesulfonic acid, phenylhydrazine-4-sulfonic acid n-hydrate, p-phenolsulfonic acid, ferron(7-iodo-8-hydroxyquinoline-5-sulfonic acid), fluorosulfonic acid, methylsulfonic acid, ethylsulfonic acid, perfluorooctanesulfonic acid, and benzenesulfonic acid monohydrate.

Examples of the compound having a phosphoric acid group include phosphoric acid, ammonium dihydrogenphosphate, diammonium hydrogenphosphate, sodium dihydrogenphosphate, disodium hydrogenphosphate, potassium dihydrogenphosphate, dipotassium hydrogenphosphate, phosphorous acid, hypophosphorous acid, sodium hypophosphite, potassium hypophosphite, ammonium hypophosphite, acidic sodium pyrophosphate, acidic ammonium pyrophosphate, acidic potassium pyrophosphate, acidic sodium metaphosphate, acidic ammonium metaphosphate, acidic potassium metaphosphate, (1-aminoethyl)phosphonic acid, (aminomethyl)phosphonic acid, (3-bromopropyl)phosphonic acid, monoethyl 3,5-di-tert-butyl-4-hydroxybenzylphosphate, N,N,N',N'-ethylenediaminetetra(methyl phosphate), glycine-N,N-bis(methylenephosphonic acid), methylenediphosphonic acid, nitrotris(methylenephosphonic acid), and vinylphosphonic acid.

Other examples thereof include inorganic acids such as hydrochloric acid, sulfuric acid, sulfurous acid, nitric acid, nitrous acid, thiocyanic acid, hydrogen fluoride, and boric acid.

These protonic acids may be used alone or it may be added in combination of two or more thereof.

The use amount of the protonic acid (D) is preferably an amount permitting the ratio between the mole number of $H^+$ ions that the protonic acid (D) can supply and the mole number of fluorine atoms in the fluoride salt compound (B) to be set to 0.1 or more, more preferably an amount permitting the ratio to be set to 0.3 or more, even more preferably an amount permitting the ratio to be set to 0.4 or more. If the ratio between the mole number of the $H^+$ ions, which the protonic acid (D) can supply, and the mole number of the fluorine atoms in the fluoride salt compound (B) is small, a sufficiently good workability may not be obtained with ease.

<Compound (E) Having a Sulfonyl Group>

The following will describe an compound (E) having a sulfonyl group, which is used together with a curing catalyst in order to improve the curability. The compound (E) having a sulfonyl group is a compound having in the molecule thereof a functional group represented by —S(═O)$_2$—.

The compound (E) having a sulfonyl group is not particularly limited, and examples thereof include benzenesulfonamide, N-methylbenzenesulfonamide, N-ethylbenzenesulfonamide, N-propylbenzenesulfonamide, N-n-butylbenzenesulfonamide, N-t-butylbenzenesulfonamide, N-pentylbenzenesulfonamide, N-hexylbenzenesulfonamide, N-heptylbenzenesulfonamide, N-octylbenzenesulfonamide, N-decylbenzenesulfonamide, N-dodecylbenzenesulfonamide, N-phenylbenzenesulfonamide, aminobenzenesulfonamide, p-ethylbenzenesulfonamide, p-propylbenzenesulfonamide, p-butylbenzenesulfonamide, 2-aminobenzenesulfonamide, p-chlorobenzenesulfonamide, p-acetoaminobenzenesulfonamide, p-acetoaminomethylbenzenesulfonamide, 1-chlorobenzene-2,4-disulfonamide, phenylhydrazinesulfonamide, N,N'-bis(phenylsulfonyl)diphenyl ether bissulfonamide, N,N'-bis(phenylsulfonyl)diphenylbissulfonamide, 5-amino-2-methyl-N-(hydroxyethyl)-1-benzenesulfonamide, 2-aminobenzoic acid-5-sulfonamide, 2-aminobenzoic acid-5-N-methylsulfonamide, 4-(2-aminoethyl)benzenesulfonamide, 4-(2-ethylhexyloxy)benzenesulfonamide, 2-toluenesulfonamide, 4-toluenesulfonamide, 4-aminobenzenesulfonamide, N-cyclohexyl-p-toluenesulfonamide, N-methyltoluenesulfonamide, N-ethyltoluenesulfonamide, N-propyltoluenesulfonamide, N-n-butyltoluenesulfonamide, N-t-butyltoluenesulfonamide, N-pentyltoluenesulfonamide, N-hexyltoluenesulfonamide, N-heptyltoluenesulfonamide, N-octyltoluenesulfonamide, N-decyltoluenesulfonamide, N-decyltoluenesulfonamide, N-phenyltoluenesulfonamide, 2-toluenesulfonamide, dimethylsulfone, dimethylsulfoxide, bis(2-hydroxyethyl)sulfone, bis(vinylsulfonylmethyl)ether, 4,4'-dichlorodiphenylsulfone, 2-amino-$_{4-m}$ethylsulfonylphenyl, aminophenyl-p-hydroxyethylsulfone, diphenylsulfone, bis($_{4-m}$ethylphenyl)sulfone, 4,4'-dichlorodiphenylsulfone, bis(3-aminophenyl)sulfone, 2-aminodiphenylsulfone, bis(4-hydroxyphenyl)sulfone, bis{4-(3'-aminophenoxy)phenyl}sulfone, α,α,α-tribromomethylphenylsulfone, methyl-p-tolylsulfone, (vinylsulfonyl)benzene, tetramethylenesulfone, 2-(methylsulfonyl)ethyl chloroformate, thiamphenicol, 2-(methylsulfonyl)ethyl alcohol, 2-aminophenol-4-ethylsulfone, 4,4'-oxybis(benzenesulfonylhydrazide), 2-amino-1-($_{4-m}$ethylsulfonylphenyl)-1,3-propanediol, benzenesulfonic acid, 4-aminobenzenesulfonic acid, and tetrahydrothiophene-1,1-dioxide. These compounds, which each have a sulfonyl group, may be used alone or it may be added in combination of two or more thereof.

The compound (E) having a sulfonyl group is preferably a compound in a liquid state, which is good in compatibility with the fluoride salt compound (B) and the protonic acid (D). More specifically, a compound having a melting point of 50° C. or lower is preferred, and a compound having a melting point of 30° C. or lower is more preferred. Moreover, a compound having a boiling point of 200° C. or higher at 760 mmHg is preferred since the compound does not volatilize easily. If the boiling point is lower than 200° C., the compound volatizes when the present curable composition is used indoors or the like. As a result, the working environment is deteriorated and further a bad effect may be produced on human bodies.

Furthermore, a compound having a structure wherein hydrogen in a sulfonamide group is substituted with an alkyl group is more preferred since the melting point is lower and further the boiling point is higher. Examples of a compound having such a structure include N-ethyltoluenesulfonamide, which has a boiling point of 340° C. at 760 mmHg, and N-n-butylbenzenesulfonamide, which has a boiling point of 314° C. at 760 mmHg. These do not volatilize easily so that these do not each become a VOC generating source; thus, these are preferred.

These compounds are industrially sold from Fuji Amide Chemical Co., Ltd., Toray Fine Chemicals Co., Ltd., Proviron Co. in Belgium, and others, and are also easily available.

Tetrahydrothiophene-1,1-dioxide is preferred since the dioxide is a compound wherein an amidine compound, which will be described later, is easily dissolved, and has a high boiling point of 285° C. at 760 mmHg. Dehydrated tetrahydrothiophene-1,1-dioxide is preferred since the dioxide can express a good storage stability when the dioxide is added to a one-part-type curable composition.

Tetrahydrothiophene-1,1-dioxide is also called tetramethylenesulfone or sulfolane, is industrially sold from Sumitomo Seika Chemicals Co., Ltd., Toray Fine Chemicals Co., Ltd., New Japan Chemical Co., Ltd., Shell, and others, and is also easily available.

The blend amount of the compound (E) having a sulfonyl group is an amount permitting the ratio between the mole number of the compound (E) having a sulfonyl group and the mole number of fluorine atoms in the fluoride salt compound (B) to be set preferably to 0.5 or more, more preferably to 1.0 or more, even more preferably to 1.2 or more. If the ratio between the mole number of the compound (E) having a sulfonyl group and the mole number of fluorine atoms in the fluoride salt compound (B) is smaller, the effect of improving the curability may not be obtained.

<Amine Compound (F)>

In a case where the fluoride salt compound (B) is an unsubstituted ammonium chloride and/or an unsubstituted ammonium hydrogenfluoride, or an ammonium hydrofluoride compound, it is preferred that an amine compound (F) is further contained.

The catalyst composition of the present invention contains, as essential components, the fluoride salt compound (B) and the amine compound (F).

The amine compound (F) is used together with the fluoride salt compound, and takes charge of functioning as a curing catalyst for the polymer (A) having a reactive silicon group. Nitrogen-containing cyclic compounds such as pyridine are contained in the category of the amine compound (F).

Specific examples of the amine compound (F) include aliphatic primary amines such as methylamine, ethylamine, propylamine, isopropylamine, butylamine, amylamine, hexylamine, octylamine, 2-ethylhexylamine, nonylamine, decylamine, laurylamine, pentadecylamine, cetylamine, stearylamine, and cyclohexylamine; aliphatic secondary amines such as dimethylamine, diethylamine, dipropylamine, diisopropylamine, dibutylamine, diamylamine, dihexylamine, dioctylamine, di(2-ethylhexyl)amine, didecylamine, dilaurylamine, dicetylamine, distearylamine, methylstearylamine, ethylstearylamine, and butylstearylamine; aliphatic tertiary amines such as triamylamine, trihexylamine, and trioctylamine; aliphatic unsaturated amines such as triallylamine, and oleylamine; aromatic amines such as aniline, laurylaniline, stearylaniline, and triphenylamine; heterocyclic compounds such as pyridine, 2-aminopyridine, 2-(dimethylamino)pyridine, 4-(dimethylaminopyridine), 2-hydroxypyridine, morpholine, N-methylmorpholine, piperidine, 2-piperidinemethanol, 2-(2-pyperidino)ethanol, piperidone, 1,2-dimethyl-1,4,5,6-tetrahydropyrimidine, 1,4-diazabicyclo[2,2,2]octane (DABCO), and aziridine; and other amines such as monoethanolamine, diethanolamine, triethanolamine, 3-hydroxypropylamine, ethylenediamine, propylenediamine, hexamethylenediamine, N-methyl-1,3-propanediamine, diethylenetriamine, triethylenetetramine, 2-(2-aminoethylamino)ethanol, benzylamine, 3-methoxypropylamine, 3-lauryloxypropylamine, 3-dimethylaminopropylamine, 3-diethylaminopropylamine, 3-dibutylaminopropylamine, 2-dimethylaminoethylamine, 2-diethylaminoethylamine, 2-dibutylaminoethylamine, 3-morpholinopropylamine, 2-(1-piperazinyl)ethylamine, xylilenediamine, 2,4,6-tris(dimethylaminoethyl)phenol, and amidine compounds.

Amidine compounds are each a compound represented by the following general formula (14):

(14)

(wherein $R^{12}$, $R^{13}$ and two $R^{14}$s are each independently a hydrogen atom or an organic group). Specific examples thereof include guanidine compounds such as guanidine, 1,1,3,3-tetramethylguanidine, 1-butylguanidine, 1-phenylguanidine, 1-o-tolylguanidine, and 1,3-diphenylguanidine; biguanide compounds such as butylbiguanide, 1-o-tolylbiguanide, and 1-phenylbiguanide; imidazole compound such as imidazole, and 2-ethyl-$_{4-m}$ethylimidazole; imidazoline compounds such as 2-methylimidazoline, 2-undecylimidazoline, 2-phenylimidazoline, and 4,4-dimethyl-2-imidazoline; and other compounds such as 1,8-diazabicyclo[5,4,0]-7-undecene (DBU), 6-(dibutylamino)-1,8-diazabicyclo[5,4,0]-7-undecene (DBA-DBU), 1,5-diazabicyclo[4,3,0]-5-nonene (DBN), 1,3,4,6,7,8-hexahydro-2H-pyrimidopyridine, 1,4,5,6-tetrahydropyrimidine, and 1,2-dimethyltetrahydropyrimidine.

The amine compound (F) is preferably an amidine compound since the activity of the resultant catalyst composition becomes high easily.

Of the amidine compounds, preferred are aryl-substituted guanidines or aryl-substituted biguanide compounds such as phenylguanidine, 1-o-tolylbiguanide, and 1-phenylbiguanide for the following reasons: when the compounds are each used as a catalyst for the polymer (A), the curability of the surface tends to become high; the adhesive property of the resultant cured product tends to become good; and other advantages are obtained.

As the amine compound (F), a tertiary amine compound having an amino group is also preferred since the activity of the resultant catalyst composition easily becomes high. The amino group referred to herein is an unsubstituted amino group (—$NH_2$).

Specific examples of the tertiary amine compound having an amino group include 2-aminopyridine, 3-dimethylaminopropylamine, 3-diethylaminopropylamine, 3-dibutylaminopropylamine, 3-morpholinopropylamine, 2-(1-piperazinyl)ethylamine, 3-morpholinopropylamine, 2-(1-piperazinyl)ethylamine, 2-dimethylaminoethylamine, 2-diethylaminoethylamine, and 2-dibutylaminoethylamine.

Amine compounds exhibit basicity; an amine compound wherein the pKa value of the conjugate acid thereof is 11 or more is preferred since the compound is high in catalytic activity to the polymer (A). In particular, DBU or DBN is more preferred since the pKa value of the conjugate acid is 12 or more so that the amine compound exhibits a high catalytic activity.

In the present invention, it is allowable to use, as the amine compound (F), a silane coupling agent having an amino group (hereinafter referred to as an aminosilane). The aminosilane is a compound having a hydrolyzable silicon group and a substituted or unsubstituted amino group.

Examples of the substituent in the substituted amino group include alkyl, aralkyl and aryl groups. Examples of the hydrolyzable silicon group include groups represented by the general formula (3) wherein X(s) is/are a hydrolyzable group. Examples of the hydrolyzable group include the already-exemplified groups. Of these groups, a methoxy group, an ethoxy group and other groups are preferred since the groups are mild in hydrolyzability and are easily handled.

The number of the hydrolyzable group(s) bonded to the silicon atom in the aminosilane is preferably 2 or more, in particular preferably 3 or more.

The aminosilane is not particularly limited, and examples thereof include γ-aminopropyltrimethoxysilane, γ-aminopropyltriethoxysilane, γ-aminopropyltriisopropoxysilane, γ-aminopropylmethyldimethoxysilane, γ-aminopropylmethyldiethoxysilane, γ-(2-aminoethyl)aminopropyltrimethoxysilane, γ-(2-aminoethyl)aminopropylmethyldimethoxysilane, γ-(2-aminoethyl)aminopropyltriethoxysilane, γ-(2-aminoethyl)aminopropylmethyldiethoxysilane, γ-(2-aminoethyl)aminopropyltriisopropoxysilane, γ-[2-(2-aminoethyl)aminoethyl]aminopropyltrimethoxysilane, γ-(6-aminohexyl)aminopropyltrimethoxysilane, 3-(N-ethylamino)-2-methylpropyltrimethoxysilane, γ-ureidopropyltrimethoxysilane, γ-ureidopropyltriethoxysilane, N-phenyl-γ-aminopropyltrimethoxysilane, N-benzyl-γ-aminopropyltrimethoxysilane, N-vinylbenzyl-γ-aminopropyltriethoxysilane, N-cyclohexylaminomethyltriethoxysilane, N-cyclohexylaminomethyldiethoxymethylsilane, N-phenylaminomethyltrimethoxysilane, (2-aminoethyl)aminomethyltrimethoxysilane, and N,N'-bis[3-(trimethoxysilyl)propyl]ethylenediamine.

Of these aminosilanes, aminosilanes having an amino group (—$NH_2$) are preferred since the curability is good. From the viewpoint of easy availability, preferred are γ-aminopropyltrimethoxysilane, γ-aminopropyltriethoxysilane, γ-aminopropylmethyldimethoxysilane, and γ-(2-aminoethyl)aminopropyltrimethoxysilane.

As the amine compound (F), a ketimine as is hydrolyzed to produce the above-mentioned amine compound may also be used.

About the amine compound (F), only one type thereof may be used, or two or more types thereof may be used in combination.

The use amount of the amine compound (F) is not particularly limited, and is an amount permitting the mole number of the amine compound (F) to be set preferably into the range of 0.1 to 10 moles per mole as the total of the mole number of the used ammonium fluoride, more preferably into the range of 0.1 to 3 moles, even more preferably into the range of 0.1 to 2 moles. When the use amount of the amine compound (F) is in the range of 0.1 to 10 moles, a catalyst composition having a particularly good curability is easily prepared.

<Acid Compound (G)>

In the curable composition of the present invention, an acid compound (G) may be used together with the fluoride salt compound (B).

The catalyst composition of the present invention may contain, as curing catalysts, an acid compound (G) together with the fluoride salt compound (B) and the amine compound (F).

The acid compound (G) is used together with the fluoride salt compound (B), preferably with the fluoride salt compound (B) and the amine compound (F). The acid compound (G) takes charge of functioning as a curing catalyst for the polymer (A) having a reactive silicon group. The use of the acid compound (G) together therewith may give a high curability, or produces an effect of adjusting the liquid property of the curable composition or the catalyst composition to restrain the volatilization of a volatile amine compound such as ammonium.

The acid compound (G) includes, in the category thereof, not only protonic acids and Lewis acids but also acid equivalents such as acid anhydrides and acid chlorides. A carboxylic acid compound or a carboxylic anhydride compound is preferred since the activity of the resultant catalyst composition and the compatibility with the (A) component easily become high.

Specific examples of the carboxylic acid compound include acetic acid, propionic acid, butyric acid, 2-ethylhexanoic acid, lauric acid, stearic acid, oleic acid, linoleic acid, pivalic acid, 2,2-dimethylbutyric acid, 2,2-diethylbutyric acid, 2,2-dimethylhexanoic acid, 2,2-diethylhexanoic acid, 2,2-dimethyloctanoic acid, 2-ethyl-2,5-dimethylhexanoic acid, neodecanoic acid, and versatic acid.

Specific examples of the carboxylic anhydride include anhydrides of the above-mentioned carboxylic acid compounds, and also include maleic anhydride, succinic anhydride, citraconic anhydride, phthalic anhydride, tetrahydrophthalic anhydride, hexahydrophthalic anhydride, methyltetrahydrophthalic anhydride, methylhexahydrophthalic anhydride, pyromellitic anhydride, trimellitic anhydride and ester derivatives thereof, diphenyl ether tetracarboxylic anhydride, diphenylmethanetetracarboxylic anhydride, benzophenonetetracarboxylic anhydride, diphenylsulfonetetracarboxylic anhydride, 2,2-diphenylpropanetetracarboxylic anhydride, and 1,1,1,3,3,3-hexafluoro-2,2-dipheyltetracarboxylic anhydride, and the following:

[Formula 5]

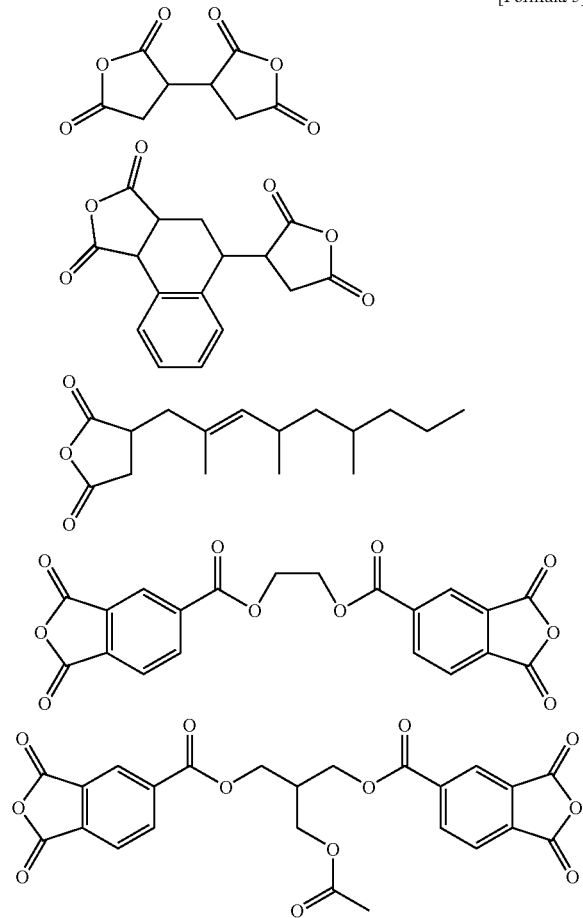

About the acid compound (G), only one type thereof may be used, or two or more types thereof may be used in combination.

The use amount of the acid compound (G) is not particularly limited, and is an amount permitting the mole number of the acid compound (G) to be set preferably into the range of 0.1 to 10 moles per mole as the total of the mole number of the used amine compound (F), more preferably into the range of 0.5 to 2 moles, even more preferably into the range of 0.8 to 1.2 moles. However, in a case where the acid compound (G) is a carboxylic anhydride compound, the mole number of carboxylic anhydride groups in the acid compound (G) is preferably from 0.1 to 10 moles, more preferably from 0.1 to 1 mole, even more preferably from 0.3 to 1 mole per mole as the total of the mole number of the used amine compound (F). When the use amount of the acid compound (G) ranges from 0.1 to 10 moles, a catalyst composition having a particularly good curability is easily prepared. If the amount of the acid compound (E) used relatively to the amine compound (F) is small, ammonia gas is generated so that a problem about safety or handleability may be caused. If the amount of the acid compound (G) used relatively to the amine compound (F) is large, hydrogen fluoride gas is generated so that a problem about safety or handleability may be caused.

<Dispersing Agent (H)>

A dispersing agent (H) may be used in the catalyst composition of the present invention. The dispersing agent (H) is used to cause the catalyst composition to be easily dispersed in the polymer (A) and gain a good curability. In order to gain a better curability, the use of the dispersing agent (H) is preferred.

The dispersing agent (H) is not particularly limited, and one selected from various agents may be used. The agent (H) is preferably a compound having an active hydrogen radical since the fluoride salt compound (B) is more easily dispersed. The active hydrogen radical referred to herein is a general term for representing a hydrogen atom that can be released as $H^+$. Specific examples thereof include a hydrogen atom bonded to an oxygen atom, sulfur atom or halogen atom; and a hydrogen atom bonded to a carbon atom adjacent to a carbonyl group or sulfonyl group.

Specific examples of the dispersing agent (H) include hydroxyl-group-containing compounds such as methanol, ethanol, 1-propanol, 2-propanol, 1-butanol, 2-butanol, 2-methyl-2-propanol, octyl alcohol, lauryl alcohol, stearyl alcohol, oleyl alcohol and 2-ethylhexyl alcohol; ethylene glycol, diethylene glycol and triethylene glycol, and monomethyl ethers thereof, monoethyl ethers and monobutyl ethers thereof; polyethylene glycol and polypropylene glycol each having a hydroxyl group or hydroxyl groups at a single terminal thereof or both terminals thereof; and phenolic compounds such as phenol, 2-t-butylphenol, 4-t-butylphenol and nonyl phenol. Other examples thereof include sulfonyl-group-containing compounds such as benzenesulfonamide, N-methylbenzenesulfonamide, N-ethylbenzenesulfonamide, N-propylbenzenesulfonamide, N-n-butylbenzenesulfonamide, N-t-butylbenzenesulfonamide, N-pentylbenzenesulfonamide, N-hexylbenzenesulfonamide, N-heptylbenzenesulfonamide, N-octylbenzenesulfonamide, N-decylbenzenesulfonamide, N-dodecylbenzenesulfonamide, N-phenylbenzenesulfonamide, aminobenzenesulfonamide, p-ethylbenzenesulfonamide, p-propylbenzenesulfonamide, p-butylbenzenesulfonamide, 2-aminophenolsulfonamide, p-chlorobenzenesulfonamide, p-acetoaminobenzenesulfonamide, p-acetoaminomethylbenzenesulfonamide, 1-chlorobenzene-2,4-disulfonamide, phenylhydrazinesulfonamide, N,N'-bis(phenylsulfonyl)diphenyl ether bissulfonamide, N,N'-bis(phenylsulfonyl)diphenylbissulfonamide, 5-amino-2-methyl-N-(hydroxyethyl)-1-benzenesulfonamide, 2-aminobenzoic acid-5-sulfonamide, 2-aminobenzoic acid-5-N-methylsulfonamide, 4-(2-aminoethyl)benzenesulfonamide, 4-(2-ethylhexyloxy)

benzenesulfonamide, 2-toluenesulfonamide, 4-toluenesulfonamide, 4-aminobenzenesulfonamide, N-cyclohexyl-p-toluenesulfonamide, N-methyltoluenesulfonamide, N-ethyltoluenesulfonamide, N-propyltoluenesulfonamide, N-n-butyltoluenesulfonamide, N-t-butyltoluenesulfonamide, N-pentyltoluenesulfonamide, N-hexyltoluenesulfonamide, N-heptyltoluenesulfonamide, N-octyltoluenesulfonamide, N-decyltoluenesulfonamide, N-dodecyltoluenesulfonamide, N-phenyltoluenesulfonamide, 2-toluenesulfonamide, dimethylsulfone, dimethylsulfoxide, bis-(2-hydroxyethyl)sulfone, bis(vinylsulfonylmethyl)ether, 4,4'-dichlorodiphenylsulfone, 2-amino-$_{4-m}$ethylsulfonylphenol, aminophenyl-β-hydroxyethylsulfone, diphenylsulfone, bis($_{4-m}$ethylphenyl)sulfone, 4,4'-dichlorodiphenylsulfone, bis(3-aminophenyl)sulfone, 2-aminodiphenylsulfone, bis(4-hydroxyphenyl)sulfone, bis{4-(3'-aminophenoxy)phenyl}sulfone, α,α,α-tribromomethylphenylsulfone, methyl-p-tolylsulfone, (vinylsulfonyl)benzene, tetramethylenesulfone, 2-(methylsulfonyl)ethyl chloroformate, thianephenicol, 2-(methylsulfonyl)ethyl alcohol, 2-aminophenol-4-ethylsulfone, 4,4'-oxybis(benzenesulfonylhydrazide), 2-amino-1-($_{4-m}$ethylsulfonylphenyl)-1,3-propanediol, benzenesulfonic acid, 4-aminobenzenesulfonic acid, and tetrahydrothiophene-1,1-dioxide; phthalic acid esters such as dimethyl phthalate, diethyl phthalate, dibutyl phthalate, di-2-ethylhexyl phthalate, di-n-octyl phthalate, dinonyl phthalate, diisononylphthalate, diisodecylphthalate, and butyl benzyl phthalate; non-aromatic bibasic acid esters such as dioctyl adipate, dioctyl sebacate, dibutyl sebacate, and isodecyl succinate; aliphatic esters such as butyl oleate, and methyl acetylricilinoleate; phosphates such as tricresyl phosphate and tributyl phosphate; trimellitic acid esters; chlorinated paraffin; hydrocarbon oils such as alkyldiphenyl and partially hydrogenated terphenyl; process oil; and epoxidized plasticizers such as epoxidized soybean oil, and benzyl epoxystearate. These dispersing agents (H) may be used alone or it may be added in combination of two or more thereof.

The dispersing agent (H) is preferably an agent having a melting point of 50° C. or lower, more preferably an agent having a melting point of 30° C. or lower, even more preferably an agent in a liquid state at room temperature in order to disperse the resultant catalyst composition more satisfactorily in the polymer (A). Moreover, the dispersing agent (H) is preferably an agent having a boiling point of 200° C. or higher at 760 mmHg in order that the agent is not easily volatilized. If the boiling point is lower than 200° C., the agent volatilizes when the present curable composition is used indoors or the like. Thus, the working environment is deteriorated and further a bad effect may be produced onto human bodies.

The use amount of the dispersing agent (H) is not particularly limited, and is preferably from 10 to 500 parts by weight, more preferably from 10 to 100 parts by weight for the total amount of the fluoride salt compound (B), the amine compound (F) and the acid compound (G). If the use amount of the dispersing agent (H) is less than 10 parts by weight, a sufficient dispersibility may not be obtained. If the use amount is more than 500 parts by weight, the dripping property of the curable composition to which the catalyst composition is incorporated is declined so that the workability may become bad.

In the catalyst composition of the present invention, essential components are ammonium fluoride and the amine compound (F); preferably, the acid compound (G) is also rendered an essential component, and more preferably the dispersing agent (H) is also rendered an essential component. It is not necessarily necessary that these essential components are each present as a simple substance in the catalyst composition. Thus, the essential components may each be present as a reactant generated by mixing the essential component(s) and some optional component. In the present invention, the essential components each mean that a compound originating from the component is contained.

The catalyst composition may be obtained merely by mixing the fluoride salt compound (B), the amine compound (F), and the acid compound (G) with each other, and preferably mixing the dispersing agent (H) and other components therewith. Furthermore, in order to enhance the state of the mixing, these components may be kneaded by means of a mixer that may be of various types, a three-roll machine, or the like. The temperature for the mixing may also be set to various temperatures. For example, the components may be mixed while the viscosity of the components is made low at high temperature. After the mixing, volatile components such as water may be removed at will. For this purpose, the volatile components may be removed under reduced pressure. Moreover, the mixture may be subjected to adsorption, extraction, distillation, recrystallization, crystallization, and/or some other treatment.

A different component may be incorporated into the present catalyst composition, if desired. The different component may be a component capable of restraining the volatilization of ammonia. An example thereof is an ammonia absorbent or a compound capable of reacting with ammonia.

The catalyst composition may be in any form, such as a solid form, a liquid form or a paste form. The catalyst composition is preferably in a liquid or paste form since the composition is more easily dispersed in the polymer (A).

<Other Components>

An adhesive property supplier may be added to the curable composition of the present invention, if desired. An example of the adhesive property supplier is a silane coupling agent.

The silane coupling agent referred to herein is a compound having in the molecule thereof a hydrolyzable silicon group and a functional group other than the silicon group. There is known an agent for making a remarkable improvement in the adhesive property between an adherend that may be of various kinds and the resultant cured product under non-primer conditions or primer-treated conditions, an example of the adherend being a substrate made of glass, aluminum, stainless steel, zinc, copper, mortar or the like, or an organic substrate made of polyvinyl chloride, acrylic resin, polyester, polyethylene, polypropylene, or polycarbonate.

In particular, when the silane coupling agent is used under non-primer conditions, the effect of improving the adhesive property of the cured product onto various adherends is particularly remarkable. The silane coupling agent is a compound which can not only produce the advantageous effect but also function as a physical property adjustor, a dispersibility improver for an inorganic filler or the like, or some other agent. In the present invention, the silane coupling agent may also exhibit a function as a compound having a reactive silicon group.

The hydrolyzable silicon group in the silane coupling agent may be a group represented by the general formula (3) wherein X(s) is/are a hydrolyzable group. Specific examples thereof include the groups already-described as the hydrolyzable group about the embodiment of the polymer (A) having a reactive silicon group. Of these groups, preferred are methoxy, ethoxy groups and so on since the groups are mild in hydrolyzability and are easily handled. The number of the hydrolyzable group(s) bonded to the silicon atom is preferably 2 or more, more preferably 3 or more.

The functional group other than the hydrolyzable silicon group is not particularly limited, and examples thereof include substituted or unsubstituted amino, mercapto, epoxy, carboxyl, vinyl and isocyanato groups, isocyanurate, and halogen. Of these, preferred are substituted or unsubstituted amino groups, epoxy groups and isocyanato groups, isocyanurate groups, and so on since the advantageous effect of improving the adhesive property of the resultant cured product is high. Amino groups are more preferred.

As already described about the embodiment of the amine compound (F), a silane coupling agent having both of a hydrolyzable silicon group and an amino group is generally called an aminosilane, and also has a function as a curing catalyst in the present invention. When an aminosilane is added to the curable composition, it is preferred to add the aminosilane in an amount more than required as a curing catalyst in a case where it is desired that the aminosilane is caused to exhibit a function further as an adhesive property supplier.

The silane coupling agent other than any aminosilane is not particularly limited, and examples thereof include isocyanatosilanes such as γ-isocyanatopropyltrimethoxysilane, γ-isocyanatopropyltriethoxysilane, γ-isocyanatopropylmethyldiethoxysilane, γ-isocyanatopropylmethyldimethoxysilane, (isocyanatomethyl)trimethoxysilane, (isocyanatomethyl)dimethoxymethylsilane; ketimine type silanes such as N-(1,3-dimethylbutylidene)-3-(triethoxysilyl)-1-propaneamine; mercaptosilanes such as γ-mercaptopropyltrimethoxysilane, γ-mercaptopropyltriethoxysilane, γ-mercaptopropylmethyldimethoxysilane, γ-mercaptopropylmethyldiethoxysilane, and mercaptomethyltriethoxysilane; epoxysilanes such as γ-glycidoxypropyltrimethoxysilane, γ-glycidoxypropyltriethoxysilane, γ-glycidoxypropylmethyldimethoxysilane, β-(3,4-epoxycyclohexyl)ethyltrimethoxysilane, and β-(3,4-epoxycyclohexyl)ethyltriethoxysilane; carboxysilanes such as β-carboxyethyltriethoxysilane, β-carboxyethylphenylbis(2-methoxyethoxy)silane, and N—β-(carboxymethyl)aminoethyl-γ-aminopropyltrimethoxysilane; silanes having a vinyl type unsaturated group, such as vinyltrimethoxysilane, vinyltriethoxysilane, γ-methacryloyloxypropylmethyldimethoxysilane, and γ-acryloyloxypropyltriethoxysilane; silanes having a halogen, such as γ-chloropropyltrimethoxysilane; and isocyanurate silanes such as tris(3-trimethoxysilylpropyl)isocyanurate.

Additional examples of the silane coupling agent include a reactant of an aminosilane, which has been described above, and an epoxysilane, a reactant of an aminosilane and an isocyanatosilane, and a reactant of an aminosilane and a silane having a (meth)acryloyloxy group; a condensation product obtained by condensing a silane, which has been described above, partially; and modified derivatives of these reactants, such as amino-modified silylpolymer, silanized aminopolymer, unsaturated aminosilane complexes, phenylamino long-chain alkylsilane, aminosilanized silicone, and silanized polyester.

The silane coupling agents may be added alone or it may be added in combination of two or more thereof.

When the silane coupling agent is added, the addition amount is preferably from 0.01 to 20 parts by weight, more preferably from 0.1 to 10 parts by weight, in particular preferably from 1 to 7 parts by weight for 100 parts by weight of the polymer (A) having a reactive silicon group. If the addition amount is less than 0.1 part by weight, the adhesive property of the resultant cured product tends not to be sufficiently obtained. On the other hand, if the amount is more than 200 parts by weight, the curable composition tends not to gain a practical curing rate. Additionally, the curing reaction tends not to advance sufficiently with ease.

If necessary, an adhesive property supplier other than the above-mentioned silane coupling agent is added into the curable composition of the present invention. The adhesive property supplier other than the silane coupling agent is not particularly limited, and examples thereof include epoxy resin, phenol resin, sulfur, alkyl titanate, and aromatic polyisocyanate. The adhesive property suppliers may be added alone or it may be added in combination of two or more thereof.

If necessary, a different curing catalyst is added to the curable composition of the present invention to such an extent that the advantageous effects of the present invention are not declined.

Specific examples thereof include derivatives (esters, amides, nitriles, and acyl chlorides) of carboxylic acids, such as acetic acid, propionic acid, butyric acid, 2-ethylhexanoic acid, lauric acid, stearic acid, oleic acid, linoleic acid, pivalic acid, 2,2-dimethylbutyric acid, 2,2-diethylbutyric acid, 2,2-dimethylhexanoic acid, 2,2-diethylhexanoic acid, 2,2-dimethyloctanoic acid, 2-ethyl-2,5-dimethylhexanoic acid, neodecanoic acid, and versatic acid; carboxylic acid metal salts such as tin carboxylate, lead carboxylate, bismuth carboxylate, potassium carboxylate, calcium carboxylate, barium carboxylate, titanium carboxylate, zirconium carboxylate, hafnium carboxylate, vanadium carboxylate, manganese carboxylate, iron carboxylate, cobalt carboxylate, nickel carboxylate, and cerium carboxylate; titanium compounds such as tetrabutyl titanate, tetrapropyl titanate, titaniumtetrakis(acetylacetonate), bis(acetylacetonate)diisopropoxytitanium, and diisopropoxytitaniumbis(ethylacetoacetonate); organic tin compounds such as dibutyltin dilaurate, dibutyltin maleate, dibutyltin phthalate, dibutyltin dioctanoate, dibutyltin bis(2-ethylhexanoate), dibutyltin bis(methylmaleate), dibutyltin bis(ethylmaleate), dibutyltin bis(butylmaleate), dibutyltin bis(octylmaleate), dibutyltin bis(tridecylmaleate), dibutyltin bis(benzylmaleate), dibutyltin diacetate, dioctyltin bis(ethylmaleate), dioctyltin bis(octylmaleate), dibutyltin dimethoxide, dibutyltin bis(nonylphenoxide), dibutenyltin oxide, dibutyltin oxide, dibutyltin bis(acetylacetonate), dibutyltin bis(ethylacetoacetonate), a reactant of dibutyltin oxide and a silicate compound, and a reactant of dibutyltin oxide and a phthalic acid ester; aluminum compounds such as aluminum tris(acetylacetonate), aluminum tris(ethylacetoacetate), and diisopropoxyaluminum ethylacetoacetate; zirconium compounds such as zirconium tetrakis(acetylacetonate); various metal alkoxides such as tetrabutoxyhafnium; organic acidic phosphates; organic sulfonic acids such as trifluoromethanesulfonic acid; inorganic acids such as hydrochloric acid, phosphoric acid, and boric acid; Lewis acids, such as metal halides such as aluminum chloride, titanium chloride, zirconium chloride, zinc chloride, zinc bromide, iron chloride, copper chloride, antimony chloride and tin chloride, metal triflates such as indium triflate and tin triflate, and triflates such as trialkylsilyltriflate; and derivatives thereof.

When any one of these curing catalysts is used together, the catalyst activity becomes high and an improvement of resultant cured products is expected in depth curability, thin-layer curability, adhesiveness, and others. However, if the amount of the added carboxylic acid is large, a sufficient adhesiveness of resultant cured products may not be obtained.

As the addition amount of the organictin compound increases, there is a case that the restorability, the durability and the creep resistance of the resultant cured product deteriorate or the toxicity thereof increases. Therefore, when the organictin compound is added, the addition amount thereof is preferably 5 parts or less by weight, more preferably 0.5 parts or less by weight, even more preferably 0.05 parts or less by weight, and particularly preferably no containing based on 100 parts by weight of the polymer (A) having a reactive silicon group.

A silicate is optionally added to the curable composition of the present invention. The silicate is a substance which acts, as a crosslinking agent, onto the polymer (A) having a reactive silicon group, and has a function of improving the restorability, the durability and the creep resistance of the resultant cured product.

Moreover, the addition of the silicate causes an improvement of the adhesiveness, the waterproof adhesiveness and the adhesion durability under high temperature and high humidity of the resultant cured product. In the present invention, a silicate may exert a function as a compound having a silicon-containing group.

A silicate is not particularly limited to, but includes tetraalcoxysilane or partially hydrolyzed condensation products thereof. Specific examples of the silicate include tetraalkoxysilanes (tetraalkylsilicates) such as tetramethoxysilane, tetraethoxysilane, ethoxytrimethoxysilane, dimethoxydiethoxysilane, methoxytriethoxysilane, tetra-n-propoxysilane, tetra-1-propoxysilane, tetra-n-butoxysilane, tetra-1-butoxysilane, tetra-t-butoxysilane and the like; partially hydrolyzed condensation products thereof, or the like.

In the case of using the silicate, the use amount thereof is preferably from 0.1 to 20 parts by weight, more preferably from 0.5 to 10 parts by weight for 100 parts by weight of the polymer (A) having a reactive silicon group.

The partially hydrolyzed condensate of tetraalkoxysilane is not particularly limited to, and includes, for example, a product obtained by adding water to tetraalkoxysilane, hydrolyzing the silane partially, and condensing the resultant.

The addition of the partially hydrolyzed condensate of tetraalkoxysilane is preferred since the restorability, the durability and the creep resistance of the resultant cured product are improved larger than those of the curable composition to which tetraalkoxysilane is added.

As the partially hydrolyzed condensate of tetraalkoxysilane, for example, METHYL SILICATE 51 and ETHYL SILICATE 40 (each of which is manufactured by Colcoat Co., Ltd.) are commercially available. They may each be used as an additive.

In order to prevent a change on the surface curability of the curable composition by the storage, it is preferred to select, as a silicate, a compound wherein a hydrolyzable group bonded to a silicon atom is equivalent to the hydrolyzable group in the reactive silicon group present in the polymer (A) having a reactive silicon group. In other words, when the polymer (A) having a reactive silicon group has a methoxysilyl group, it is preferred to select a silicate having a methoxysilyl group; and when the polymer (A) having a reactive silicon group has an ethoxysilyl group, it is preferred to select a silicate having an ethoxysilyl group.

A plasticizer is added to the composition of the present invention if necessary. The addition of the plasticizer makes it possible to adjust the viscosity and the slump property of the curable composition, and the tensile strength, the elongation and other mechanical properties of the cured product obtained by curing the composition.

Examples of the plasticizer include, but are not particularly limited to, phthalic acid esters such as dibutyl phthalate, diheptyl phthalate, bis(2-ethylhexyl)phthalate, butylbenzyl phthalate and the like; non-aromatic dibasic acid esters such as dioctyl adipate, dioctyl sebacate, dibutyl sebacate, isodecyl succinate and the like; aliphatic esters such as butyl oleate, methyl acetylricinolate and the like; phosphates such as tricresyl phosphate, tributyl phosphate and the like; trimellitic acid esters; chlorinated paraffins; hydrocarbon oils such as alkyldiphenyl, partially-hydrogenated terphenyl and the like; process oils; epoxy plasticizers such as epoxidized soybean oil, benzyl epoxystearate and the like.

It is preferred to add a polymeric plasticizer, which contains a polymeric component in its molecule, for the reasons that the initial property of the resultant cured product can be maintained over a long term; when an alkyd paint is applied to the resultant cured product, the dryability (also referred to the paintability) can be improved; and the like.

Specific examples of the polymeric plasticizer include vinyl polymers, which are each obtained by polymerizing a vinyl monomer by a variety of methods; polyalkylene glycol esters such as diethylene glycol dibenzoate, triethylene glycol dibenzoate, pentaerythritol esters and the like; polyester plasticizers each made from a dibasic acid such as sebacic acid, adipic acid, azelaic acid, phthalic acid or the like, and a dihydric alcohol such as ethylene glycol, diethylene glycol, triethylene glycol, propylene glycol, dipropylene glycol or the like; polyethers, for example, polyetherpolyols such as polyethylene glycol, polypropylene glycol polytetraethylene glycol or the like, which has a molecular weight of 500 or more, preferably 1,000 or more, and derivatives obtained by changing hydroxyl groups of these polyetherpolyols to ester groups, ether groups, or the like, and the like; polystyrenes such as polystyrene, and poly-α-methylstyrene, and the like; and polybutadiene, polybutene, polyisobutylene, butadiene-acrylonitrile, and polychloroprene and the like. However, the polymeric plasticizer is not limited thereto.

Of these polymeric plasticizers, preferred are plasticizers high in compatibility with the polymer (A) having a reactive silicon group. Examples thereof include e polyethers and vinyl based polymers.

Polyethers are more preferred since the surface curability and the depth curability of the curable composition are good and no curing delay is caused after the composition is stored. Specifically, polypropylene glycol is particularly preferred.

Furthermore, vinyl based polymers are preferred since the polymers are high in compatibility with the polymer (A) having a reactive silicon group and the weather resistance and the heat resistance of the resultant cured product are good. Among the polymers, more preferred are acrylic based polymers and/or methacrylic based polymers, and particularly preferred are acrylic based polymers such as alkyl polyacrylate esters.

A method for producing alkyl polyacrylate esters is not particularly limited to, and living radical polymerization is preferred since a narrow molecular weight distribution and low viscosity can be gained. Atom transfer radical polymerization is more preferred. Particularly preferred is a method of subjecting an alkyl polyacrylate ester based compound to continuous bulk polymerization under high temperature and high pressure, the method being referred to the SGO process and disclosed in JP-A-2001-207157 and the like.

The number-average molecular weight of the polymeric plasticizer is preferably from 500 to 15,000, from 800 to 10,000, more preferably from 1,000 to 8,000, even more preferably from 1,000 to 5,000. The molecular weight is most preferably from 1,000 to 3,000. If the molecular weight of the polymeric plasticizer is too low, the plasticizer flows out from the resultant cured product with time by heat or rainfall so that the initial physical properties cannot be maintained over a long term, the plasticizer causes pollution based on adhesion of dust thereto, and the alkyd paintability tends to be inferior.

If the molecular weight is too high, the viscosity of the curable composition becomes high so that the workability deteriorates.

The molecular weight distribution of the polymeric plasticizer is not particularly limited, and a narrow distribution is preferred. The distribution is preferably less than 1.80, 1.70 or less, more preferably 1.60 or less, even more preferably 1.50 or less, in particular preferably 1.40 or less, most preferably 1.30 or less.

In the case that the plasticizer is a polyether polymer, the number-average molecular weight is measured by terminal group analysis. In the case that the plasticizer is any other polymer, the number-average molecular weight is measured by a GPC method. The molecular weight distribution (Mw/Mn) is measured by the GPC method (in terms of polystyrene).

The polymeric plasticizer may or may not have a reactive silicon group in its molecule. In the case of adding the polymeric plasticizer which has a reactive silicon group, the polymeric plasticizer is taken in the curing reaction so that the plasticizer can be prevented from being bleeded from the resultant cured product, and thus, the case is preferred.

The polymeric plasticizer which has a reactive silicon group is preferably a compound having a reactive silicon group in a number of one or less on average per molecule of the compound, and is more preferably a compound having a reactive silicon group in a number of 0.8 or less. In the case of adding the plasticizer which has a reactive silicon group, in particular, an oxyalkylene polymer having a reactive silicon group, the number-average molecular weight thereof is preferably lower than that of the polymer (A) having a reactive silicon group in order to gain a sufficient plasticizing effect.

About the plasticizer, only one kind may be added, or a plurality of kinds may be added in combination. In addition, a low molecular weight plasticizer and a polymeric plasticizer may be used added in combination. These plasticizers may be blended when the polymer (A) having a reactive silicon group is produced.

In the addition of the plasticizer, the addition amount thereof is preferably from 5 to 150 parts by weight, more preferably from 10 to 120 parts by weight, and particularly preferably from 20 to 100 parts by weight based on 100 parts by weight of the polymer (A) having a reactive silicon group. If the addition amount is less than 5 parts by weight, the effect of the plasticizer tends not to be expressed. If the amount is more than 150 parts by weight, the mechanical strength of the cured product tends to be insufficient.

A tackifier is added to the composition of the present invention if necessary. The adhesion-imparting agent of resin (tackifying resin) is not particularly limited, and may be a resin that is usually used whether the resin is in a solid form or in a liquid form at normal temperature. Specific examples thereof include styrene based block copolymer, a hydrogenated product thereof, phenol resin, modified phenol resins (such as cashew oil modified phenol resin, tall oil modified phenol resin and the like), terpene-phenol resin, xylene-phenol resin, cyclopentadiene-phenol resin, coumalin-indene resin, rosin resin, rosin ester resin, hydrogenated rosin ester resin, xylene resin, low molecular weight polystyrene resin, styrene copolymer resin, petroleum resins (such as C5 hydrocarbon resin, C9 hydrocarbon resin, C5C9 hydrocarbon copolymer resin and the like), hydrogenated petroleum resins, terpene resin, and DCPD resin petroleum resin and the like. These may be used alone or in combination of two or more thereof.

Examples of the styrene block copolymer and the hydrogenated product thereof include, but are not particularly limited to, styrene-butadiene-styrene block copolymer (SBS), styrene-isoprene-styrene block copolymer (SIS), styrene-ethylenebutylene-styrene block copolymer (SEBS), styrene-ethylenepropylene-styrene block copolymer (SEPS), styrene-isobutylene-styrene copolymer (SIBS) and the like.

When the tackifier is added, the addition amount thereof is preferably from 5 to 1,000 parts by weight, and more preferably from 10 to 100 parts by weight based on 100 parts by weight of the polymer (A) having a reactive silicon group.

A solvent or a diluting agent is optionally added into the curable composition of the present invention. The solvent and the diluting agent are not particularly limited to, and examples thereof include such as aliphatic hydrocarbons, aromatic hydrocarbons, alicyclic hydrocarbons, halogenated hydrocarbons, alcohols, esters, ketones, ethers and the like. They may be added alone or may be added in combination of a plurality of kinds.

In the case of adding the solvent or the diluting agent, the boiling point of the solvent or the diluting agent is preferably 150° C. or higher, and more preferably 200° C. or higher in order to prevent volatile components from diffusing into the air when the curable composition is used indoors.

A physical property adjuster is optionally added into the curable composition of the present invention. The physical property adjuster is an agent having a function of adjusting the tensile property and the hardness of the resultant cured product.

The physical property adjustor is not particularly limited, and examples thereof include alkylalkoxysilanes such as methyltrimethoxysilane, dimethyldimethoxysilane, trimethylmethoxysilane, n-propyltrimethoxysilane and the like; alkylisopropenoxysilanes such as dimethyldiisopropenoxysilane, methyltriisopropenoxysilane, γ-glycidoxypropylmethyldiisopropenoxysilane and the like; alkoxysilanes having a functional group, such as γ-glycidoxypropylmethyldimethoxysilane, γ-glycidoxypropyltrimethoxysilane, vinyltrimethoxysilane, vinyldimethylmethoxysilane, γ-aminopropyltrimethoxysilane, N-(β-aminoethyl)aminopropylmethyldimethoxysilane, γ-mercaptopropyltrimethoxysilane, γ-mercaptopropylmethyldimethoxysilane and the like; silicone vanish; polysiloxanes and the like. These may be used alone or in combination of two or more thereof.

Among the physical property adjusters, preferred are those which are hydrolyzed to produce a compound having a monovalent silanol group in its molecule, since the adjusters have an effect of lowering the modulus of the resultant cured product without deteriorating the tack of the surface thereof. Among these compounds, more preferred are compounds which are hydrolyzed to produce trimethylsilanol.

The compounds which are hydrolyzed to produce a compound having a monovalent silanol group in its molecule are not particularly limited to. Examples thereof include compounds disclosed in JP-A-05-117521; compounds that are derivatives of an alkylalcohol such as hexanol, octanol, decanol and the like, and are hydrolyzed to produce an organic silicon compound represented by $R^{15}_3SiOH$ (wherein $R^{15}$ is a hydrocarbon group having 1 to 20 carbon atom(s)) such as trimethylsilanol and the like; and compounds that are derivatives of a polyhydric alcohol having 3 or more hydroxyl groups in its molecule, such as trimethylolpropane, glycerin, pentaerythritol, sorbitol and the like, and are hydrolyzed to produce an organic silicon compound represented by $R^{15}_3SiOH$ such as trimethylsilanol and the like, the compounds being disclosed in JP-A-11-241029, or the like.

Furthermore, examples thereof include compounds that are derivatives of an oxypropylene polymer and are hydrolyzed to produce an organic silicon compound represented by $R^{15}{}_3SiOH$ such as trimethylsilanol and the like, the compounds being disclosed in JP-A-07-258534; and compounds having a group having hydrolyzable silicon that can be crosslinked and a silicon group capable of being hydrolyzed to produce a compound having a monovalent silanol group, the compound being disclosed in JP-A-06-279693.

When the physical property adjuster is added, the addition amount thereof is preferably from 0.1 to 20 parts by weight, and more preferably from 0.5 to 10 parts by weight based on 100 parts by weight of the polymer (A) having a reactive silicon group.

A thixotropic agent (anti-sagging agent) is optionally added into the curable composition of the present invention. The thixotropic agent is an agent having a function of preventing the curable composition from sagging to make the workability good.

The thixotropic agent is not particularly limited to, and examples thereof include such as polyamide waxes; hydrogenated castor oil derivatives; and metal soaps, such as calcium stearate, aluminum stearate, barium stearate and the like. Furthermore, examples thereof include a rubber powder, having a particle diameter of 10 to 500 µm, disclosed in JP-A-11-349916 and others; and organic fibers disclosed in JP-A-2003-155389 and the like. These thixotropic agents (anti-sagging agents) may be added alone or in combination of a plurality of kinds.

When the thixotropic agent is added, the addition amount thereof is preferably from 0.1 to 20 parts by weight based on 100 parts by weight of the polymer (A) having a reactive silicon group.

A compound having an epoxy group in its molecule may be optionally added into the curable composition of the present invention. The addition of the compound having an epoxy group makes it possible to heighten the restorability of the resultant cured product.

The compound having an epoxy group is not particularly limited to, and examples thereof include compounds such as epoxidized unsaturated oils and fats; epoxidized unsaturated aliphatic acid esters; alicyclic epoxy compounds; epichlorohydrin derivatives and the like; and mixtures thereof and the like. More specific examples thereof include such as epoxidized soybean oil, epoxidized linseed oil, bis(2-ethylhexyl)-4,5-epoxycyclohexane-1,2-dicarboxylate (E-PS), epoxyoctyl stearate, epoxybutyl stearate and the like. Among these compounds, E-PS is preferred.

When the epoxy compound is added, the addition amount thereof is preferably from 0.5 to 50 parts by weight based on 100 parts by weight of the polymer (A) having a reactive silicon group.

An optically curable material may be optionally added into the curable composition of the present invention. The optically curable material is a material which receives an effect of light to cause a chemical change in its molecular structure in short time, thereby generating a physical change, such as curing. When the optically curable material is added into the curable composition, a coating of the optically curable material is formed on the surface of the resultant cured product so that the tack or the weather resistance of the cured product is improved.

The optically curable material is not particularly limited to, and includes a known optically curable material, such as an organic monomer, an oligomer, a resin, a composition containing thereof and the like. Examples thereof include such as unsaturated acrylic based compounds, polyvinyl cinnamates, azido resins and the like.

Examples of the unsaturated acrylic based compounds include monomers and oligomers having one or a plurality of acrylic based or methacrylic based unsaturated groups in its molecule; and mixtures thereof. Specific examples thereof include a monomer such as propylene (or butylene or ethylene), glycol di(meth)acrylate and neopentyl glycol di(meth) acrylate, and oligo esters having a molecular weight of 10,000 or less. More specific examples thereof include ARONIX M-210, ARONIX M-215, ARONIX M-220, ARONIX M-233, ARONIX M-240, and ARONIX M-245, which are special (bifunctional) acrylates; (trifunctional) ARONIX M-305, ARONIX M-309, ARONIX M-310, ARONIX M-315, ARONIX M-320, and ARONIX M-325; and (polyfunctional) ARONIX M-400 (ARONIXs are each manufactured by Toagosei Co., Ltd.) m and the like. Among these examples, preferred are compounds having an acrylic functional group, and more preferred are compounds having 3 or more acrylic functional groups on average in its molecule.

The polyvinyl cinnamate is a photosensitive resin having a cinnamoyl group as a photosensitive group, and examples thereof include a compound wherein polyvinyl alcohol is esterified with cinnamic acid; and a great number of other polyvinyl cinnamate derivatives.

The azido resins are known as photosensitive resins having an azide group as a photosensitive group. An ordinary example thereof is a resin obtained by adding a diazide compound as a photosensitizer to a rubber photosensitive liquid. Besides, the azido resins are exemplified in detail in "Photosensitive Resin (published in Mar. 17, 1972, published by Insatsu Gakkai Shuppanbu Ltd., p. 93 and pages subsequent thereto, p. 106 and pages subsequent thereto, and p. 117 and pages subsequent thereto)". They may be used alone or in a mixture form, or may be used together with a sensitizer, if necessary.

When a sensitizer, such as ketones, a nitro compound and the like, or a promoter such as amines and the like, is added, there may be a case where the effect may be increased.

When the optically curable material is added, the addition amount thereof is preferably from 0.1 to 20 parts by weight, and more preferably from 0.5 to 10 parts by weight based on 100 parts by weight of the polymer (A) having a reactive silicon group.

If the amount is 0.1 parts or less by weight, the effect of heightening the weather resistance of the resultant cured product is hardly produced. If the amount is 20 parts or more by weight, the resultant cured product becomes too hard so that the product tends to be cracked.

An oxygen curable material is added into the curable composition of the present invention if necessary. The oxygen curable material is a material which reacts with oxygen in the air so as to be cured. By the addition of the oxygen curable material, a cured coating is formed in the vicinity of the surface of the resultant cured product so that the tack of the cured product surface or adhesion of dirt or dust thereto can be prevented.

The oxygen curable material is not particularly limited to as far as it is a compound having an unsaturated compound reactive with oxygen in the air. Examples thereof include drying oils such as tung oil, linseed oil and the like, various alkyd resins obtained by modifying the compounds; acrylic based polymers, epoxy based resins, and silicone based resins modified with a drying oil; liquid polymers such as polymers of 1,2-polybutadiene, 1,4-polybutadiene, C5-C8 dienes and the like, which are obtained by polymerizing or copolymerizing diene based compounds, such as butadiene, chloroprene, isoprene, 1,3-pentadiene and the like; liquid copolymers such as NBR, SBR and the like, which are obtained by copolymerizing diene based compounds with a vinyl based compound that is copolymerizable, such as acrylonitrile, styrene and the like, so as to render the diene based compound a main component; and further various modified products thereof (such as maleinate-modified products, boiled oil modified products and the like) and the like. Of these examples, tung oil and liquid diene based polymers are preferred. As for the oxygen curable material, one kind thereof may be added, or a plurality of kinds may be added in combination.

About the oxygen curable material, there may be a case where the effect may be increased by mixing with or adding to a catalyst for promoting the curing reaction, or a metallic drier. The catalyst for promoting the curing reaction, or the metallic drier is not particularly limited to, and examples thereof include metal salts such as cobalt naphthenate, lead naphthenate, zirconium naphthenate, cobalt octanoate, zirconium octanoate and the like, amine compounds and the like.

When the oxygen curable material is added, the addition amount thereof is preferably from 0.1 to 20 parts by weight, and more preferably from 0.5 to 10 parts by weight based on 100 parts by weight of the polymer (A) having a reactive silicon group.

If the addition amount is less than 0.1 parts by weight, the effect that the stain resistance of the resultant cured product is improved tends to become insufficient. If the amount is more than 20 parts by weight, the tensile property and the like of the resultant cured product tend to be damaged.

It is preferred that the oxygen curable material is mixed with or is added to an optically curable material, as disclosed in JP-A-03-160053.

An antioxidant may be optionally added into the curable composition of the present invention. The addition of the antioxidant makes it possible to improve the heat resistance of the resultant cured product.

The antioxidant is not particularly limited to, and examples thereof include hindered phenol based, monophenol based, bisphenol based, and polyphenol based antioxidants. Of these antioxidants, preferred are hindered phenol based antioxidants. Preferred are also hindered amine based light stabilizers, such as TINUVIN 622LD, TINUVIN 144, CHIMASSORB 944LD, and CHIMASSORB 119FL (each of which is manufactured by Ciba Specialty Chemicals Inc. JPN); ADEKASTAB LA-57, ADEKASTAB LA-62, ADEKASTAB LA-67, ADEKASTAB LA-63, and ADEKASTAB LA-68 (each of which is manufactured by ADEKA Corporation); SANOL LS-770, SANOL LS-765, SANOL LS-292, SANOL LS-2626, SANOL LS-1114, and SANOL LS-744 (each of which is manufactured by Sankyo LifeTech Co., Ltd.), and the like. Specific examples of the antioxidant are also disclosed in JP-A-04-283259 and JP-A-09-194731.

When the antioxidant is added, the addition amount thereof is preferably from 0.1 to 10 parts by weight, and more preferably from 0.2 to 5 parts by weight based on 100 parts by weight of the polymer (A) having a reactive silicon group.

A light stabilizer is optionally added into the curable composition of the present invention. The addition of the light stabilizer makes it possible to prevent the resultant cured product from being deteriorated due to photo oxidization.

The light stabilizer is not particularly limited to, and examples thereof include benzotriazole based compounds, hindered amine based compounds, benzoate based compounds and the like. Among these compounds, preferred are hindered amine based compounds.

When the light stabilizer is added, the addition amount thereof is preferably from 0.1 to 10 parts by weight, and more preferably from 0.2 to 5 parts by weight based on 100 parts by weight of the polymer (A) having a reactive silicon group. Specific examples thereof are also disclosed in JP-A-09-194731.

When an optically curable material such as an unsaturated acrylic based compound is added into the curable composition of the present invention, it is preferred to add a hindered amine based light stabilizer having a tertiary amine group, as disclosed in JP-A-05-70531, since the storage stability of the curable composition is improved.

The hindered amine based light stabilizer having a tertiary amine group is not particularly limited to, and examples thereof include TINUVIN 622LD, TINUVIN 144, and CHIMASSORB 119FL (each of which is manufactured by Ciba Specialty Chemicals Inc. JPN); ADEKASTAB LA-57, ADEKASTAB LA-62, ADEKASTAB LA-67, and ADEKASTAB LA-63 (each of which is manufactured by ADEKA Corporation); SANOLs LS-765, LS-292, LS-2626, LS-1114, and LS-744 (each of which is manufactured by Sankyo LifeTech Co., Ltd.) and the like.

An ultraviolet absorbent is optionally added into the curable composition of the present invention. The addition of the ultraviolet absorbent causes an improvement in the surface weather resistance of the resultant cured product.

The ultraviolet absorbent is not particularly limited to, and examples thereof include benzophenone based, benzotriazole based, salicylate based, substituted tolyl based, metal chelate based compounds and the like. Among them, benzotriazole based ultraviolet absorbents are particularly preferred.

When the ultraviolet absorbent is added, the addition amount thereof is preferably from 0.1 to 10 parts by weight, and more preferably from 0.2 to 5 parts by weight based on 100 parts by weight of the polymer (A) having a reactive silicon group.

It is preferred to add the antioxidant, the light stabilizer, and the ultraviolet absorbent in combination into the curable composition. It is preferred that, for example, a phenol based or hindered phenol based antioxidant, a hindered amine based light stabilizer, and a benzotriazole based ultraviolet absorbent are mixed to add.

An epoxy resin is optionally added into the curable composition of the present invention. According to the addition of the epoxy resin, the adhesiveness of the resultant cured product is improved. The curable composition into which the epoxy resin is added is used preferably as an adhesive, in particular, an adhesive for outer wall tiles.

The epoxy resin is not particularly limited to, and examples thereof include epichlorohydrin-bisphenol A type epoxy resins, epichlorohydrin-bisphenol F type epoxy resins, flame retardant epoxy resins such as glycidyl ether of tetrabromobisphenol A, Novolak type epoxy resins, hydrogenated bisphenol A type epoxy resins, glycidyl ether type epoxy resins of an adduct of bisphenol A propylene oxide, p-oxybenzoic acid glycidyl ether ester type epoxy resins, m-aminophenol epoxy resins, diaminodiphenylmethane based epoxy resins, urethane-modified epoxy resins, various alicyclic epoxy resins, N,N-diglycidylaniline, N,N-diglycidyl-o-toluidine, triglycidyl isocyanurate, polyalkylene glycol diglycidyl ether, glycidyl ether of a polyhydric alcohol such as glycerin, hydantoin type epoxy resins, epoxidized products of an unsaturated polymer such as petroleum resins, and the like. Among these examples, preferred are epoxy resins having at least two or more epoxy groups in its molecule, and more preferred are bisphenol A type epoxy resins and Novolak type epoxy resins and the like, since they make the reactivity of the curable composition high, the resultant cured product easily forms a three-dimensional network structure, and the like.

When the epoxy resin is added, the addition amount of the epoxy resin is varied in accordance with the use application of the curable composition, and the like. For example, in the case of improving such as the impact resistance, the flexibility, the toughness and the peeling strength and the like of the epoxy resin cured product, the polymer (A) having a reactive silicon group is added preferably in an amount of 1 to 100 parts by weight, and more preferably in an amount of 5 to 100 parts by weight based on 100 parts by weight of the epoxy resin. On the other hand, in the case of improving the strength of the cured product of the polymer (A) having a reactive silicon group, the epoxy resin is added preferably in an amount of 1 to 200 parts by weight, and more preferably in an amount of 5 to 100 parts by weight based on 100 parts by weight of the polymer.

When the epoxy resin is added into the curable composition of the present invention, it is preferred to add a curing agent for epoxy resin in combination.

The epoxy resin curing agent is not particularly limited as far as the agent has a function to cure the epoxy resin, and may be any epoxy resin curing agent that is ordinarily used. Specific examples thereof include primary and secondary amines such as triethylenetetramine, tetraethylenepentamine, diethylaminopropylamine, N-aminoethylpiperidine, m-xylylenediamine, m-phenylenediamine, diaminodiphenylmethane, diaminodiphenylsulfone, isophoronediamine, amine-terminated polyether and the like; tertiary amines such as 2,4,6-tris(dimethylaminomethyl)phenol and tripropylamine, and salts of these tertiary amines; polyamide resins; imidazoles; dicyandiamines; trifluoroboron complex compounds; carboxylic anhydrides such as phthalic anhydride, hexahydrophthalic anhydride, tetrahydrophthalic anhydride, dodecylsuccinic anhydride, pyromellitic anhydride, chlorendic anhydride and the like; alcohols; phenols; carboxylic acids; and diketone complex compounds of aluminum or zirconium, and the like. These may be added alone or in combination of two or more thereof.

When the epoxy resin curing agent is added, the addition amount thereof is preferably from 0.1 to 300 parts by weight based on 100 parts by weight of the epoxy resin.

It is preferred to use, out of the epoxy resin curing agents, a ketimine compound since a one-part-type curable composition can be obtained. The ketimine compound has a nature that the compound exists stably in the absence of water; and the compound is decomposed to a primary amine and a ketone by water, and the resultant primary amine becomes a curing agent for curing an epoxy resin at room temperature. The ketimine compound includes a compound obtained by condensing reaction between an amine compound and a carbonyl compound.

An amine compound and a carbonyl compound to be used for synthesizing the ketimine are not particularly limited to, and a known compound can be exemplified. As the amine compound, the following is used: a diamine such as ethylenediamine, propylenediamine, trimethylenediamine, tetramethylenediamine, 1,3-diaminobutane, 2,3-diaminobutane, pentamethylenediamine, 2,4-diaminopentane, hexamethylenediamine, p-phenylenediamine, p,p'-biphenylenediamine and the like; a polyhydric amine such as 1,2,3-triaminopropane, triaminobenzene, tris(2-aminoethyl)amine, tetrakis(aminomethyl)methane and the like; a polyalkylenepolyamine such as diethylenetriamine, triethylenetriamine, tetraethylenepentamine and the like; a polyoxyalkylene polyamine; an aminosilane such as γ-aminopropyltriethoxysilane, N-(β-aminoethyl)-γ-aminopropyltrimethoxysilane, N-(β-aminoethyl)-γ-aminopropylmethyldimethoxysilane and the like; and the like.

As the carbonyl compound, the following can be used: an aldehyde such as acetoaldehyde, propionaldehyde, n-butylaldehyde, isobutylaldehyde, diethylacetoaldehyde, glyoxal, benzaldehyde or the like; a cyclic ketone such as cyclopentanone, trimethylcyclopentanone, cyclohexanone, trimethylcyclohexanone or the like; an aliphatic ketone such as acetone, methyl ethyl ketone, methyl propyl ketone, methyl isopropyl ketone, methyl isobutyl ketone, diethyl ketone, dipropyl ketone, diisopropyl ketone, dibutyl ketone, diisobutyl ketone or the like; a β-dicarbonyl compound such as acetylacetone, methyl acetoacetate, ethyl acetoacetate, dimethyl malonate, diethyl malonate, methylethyl malonate, dibenzoylmethane or the like; or the like.

A ketimine compound having an imino group includes a compound synthesized by reacting an imino group with styrene oxide, a glycidyl ether such as butyl glycidyl ether allyl glycidyl ether or the like, a glycidyl ester, or the like.

These ketimines may be added alone or in combination of two or more thereof.

When a ketimine compound is added, the use amount thereof is preferably from 1 to 100 parts by weight for 100 parts by weight of the epoxy resin, and is varied in accordance with the kind of the epoxy resin and that of the ketimine.

If necessary, a flame retardant is added to the curable composition of the present invention. A flame retardant is not particularly limited to, and includes a phosphorus-containing plasticizer such as ammonium polyphosphate, tricresyl phosphate or, and the like; aluminum hydroxide, magnesium hydroxide, thermally expandable graphite and the like. These flame retardants may be used alone or in combination of two or more thereof.

When the flame retardant is added, the addition amount thereof is preferably from 5 to 200 parts by weight, and more preferably from 10 to 100 parts by weight based on 100 parts by weight of the polymer (A) having a reactive silicon group.

Various additives other than the above agents are optionally added into the curable composition of the present invention to adjust various physical properties of the curable composition or the resultant cured product. Examples of the additives include such as a curability adjuster, a radical inhibitor, a metal inactivating agent, an antiozonant, phosphorus-based peroxide decomposing agent, a lubricant, a pigment, a foaming agent, a termiticide, an antifungal agent and the like. Specific examples thereof are disclosed in publications such as JP-B-04-69659, JP-B-07-108928, JP-A-63-254149, JP-A-64-22904, JP-A-2001-72854 and the like. These additives may be added alone or in combination of a plurality of kinds.

As a method for preparing the curable composition of the present invention, any one of one-part-type preparation and two-part-type preparation may be adopted. One-part-type preparation is preferred since the workability is good. The one-part-type preparation is a preparation in which all blending components are blended with each other in advance, and then the resultant blend is air-tightly stored, and the blend is cured with moisture in the air after applying to a spot. The two-part-type preparation is a preparation in which components such as a curing catalyst, a filler, a plasticizer, water and the like are blended with each other, as a blending agent for curing, separately and then the blending agent for curing and a polymer composition are mixed with each other before applying to a spot.

In a case where the curable composition is of a one-part-type, all blending components are blended in advance; thus, if water is present in the blend, the curing may proceed during being stored. Accordingly, it is preferred to dehydrate the blending components containing water in advance and subsequently add them to the components, or dehydrate the components by a reduced pressure or the like while the components are blended and kneaded.

In a case where the curable composition is of a two-part-type, it is unnecessary to incorporate a curing catalyst into a main part containing the polymer having a reactive silicon group; thus, even if some amount of water is contained in the blend, it is hardly feared that the curing (gelatinization) proceeds. However, when the blend is required to have storage stability over a long term, it is preferred to dehydrate the blend.

When the blend is in the form of a solid such as a powder, the method for the dehydrating and drying is preferably drying by heating, or pressure-reducing dehydration. When the blend is in the form of a liquid, the method is preferably pressure-reducing dehydration, or dehydration using synthetic zeolite activating alumina, silica gel, caustic lime, magnesium oxide, or the like. Preferred is also dehydration performed by adding an alkoxysilane compound such as n-propyltrimethoxysilane, vinyltrimethoxysilane, vinylmethyldimethoxysilane, methyl silicate, ethyl silicate, γ-mercaptopropylmethyldimethoxysilane, γ-mercaptopropylmethyldiethoxysilane, γ-glycidoxypropyltrimethoxysilane and the like; an oxazolidine compound such as 3-ethyl-2-methyl-2-(3-methylbutyl)-1,3-oxazolidine; or an isocyanate compound into the curable composition so as to cause the compound to react with water contained in the blend. By adding an alkoxysilane compound, an oxazolidine compound and an isocyanate compound in such a way, the storage stability of the curable composition is improved.

When an alkoxysilane compound reactive with water, such as vinyltrimethoxysilane, is used for drying, the addition thereof is preferably from 0.1 to 20 parts by weight, and more preferably from 0.5 to 10 parts by weight based on 100 parts by weight of the polymer (A) having a reactive silicon group.

<The Method for Preparing the Curable Composition>

The method for preparing the curable composition of the present invention is not particularly limited to, and a known method may be adopted, examples of which include such as a method of preparing the above blending components, and then kneading the components under room temperature or heating by use of a mixer, a roll, a kneader or the like, or a method of using a small amount of an appropriate solvent to dissolve the blending components, and then mixing the components.

A preferred preparing method is a preparing method including the step of mixing at least a polymer (A) having a reactive silicon group and a fluoride salt compound (B) with each other in advance, and then mixing this mixture with other components including at least a filler. According to the adoption of this method, the curable composition easily gains a better curability. In the case of mixing at least the polymer (A) having a reactive silicon group and the fluoride salt compound (B) with each other in advance, only the mixing may be merely carried out. Heating may be accompanied. After the mixing, it is allowable to conduct neutralization, adsorption, removal of volatile components, extraction, distillation, recrystallization, crystallization and/or some other treatment.

Another preferred preparing method is a preparing method including the step of mixing at least a polymer (A) having a reactive silicon group and a component containing a filler in advance, and then mixing this mixture with other components including at least a fluoride salt compound (B). According to the adoption of this method, the fluoride salt compound (B), which is a catalyst, can be added after the filler, which is a blending material that easily contains water, is dehydrated in advance. For this reason, the storage stability tends to become good.

<Method for Preparing a Catalyst Composition>

In the catalyst composition of the present invention, essential components are a fluoride salt compound (B) and an amine compound (F); preferably, an acid compound (G) and/or a dispersing agent (H) is/are also rendered an essential component or essential components. It is not necessarily necessary that these essential components are each present as a simple substance in the catalyst composition. Thus, the essential components may each be present as a reactant generated by mixing the essential component(s) and some optional component. In the present invention, the essential components each mean that a compound originating from the component is contained.

The catalyst composition may be obtained merely by mixing a fluoride salt compound (B) and an amine compound (F) with each other, and preferably mixing an acid compound (G) and/or dispersing agent (H), and other components therewith. Furthermore, in order to enhance the state of the mixing, these components may be kneaded by means of a mixer that may be of various types, a three-roll machine, or the like. The temperature for the mixing may also be set to various temperatures. For example, the components may be mixed while the viscosity of the components is made low at high temperature. After the mixing, volatile components such as water may be removed at will. For this purpose, the volatile components may be removed under reduced pressure. Moreover, the mixture may be subjected to adsorption, extraction, distillation, recrystallization, crystallization, and/or some other treatment.

A different component may be incorporated into the present catalyst composition, if desired.

The catalyst composition may be in any form, such as a solid form, a liquid form or a paste form. The catalyst composition is preferably in a liquid or paste form since the composition is more easily dispersed in the polymer (A).

<Examples of Applications>

When the curable composition of the present invention is exposed to the atmosphere, a three-dimensional network structure is formed therein by effect of water, so that the composition is cured into a solid having rubbery elasticity.

The curable composition of the present invention is used preferably as a tackifier; a sealant for buildings, ships and boats, automobiles, roads and the like; an adhesive; a mold-making agent; a vibration proof material; a damping material; a soundproof material; a foaming material; a paint; a spraying material; or the like. Among them, the curable composition is used more preferably as a sealant or an adhesive, since the resultant cured product is excellent in flexibility and adhesiveness.

Moreover, the curable composition of the present invention may be used as various applications, for example, an electric/electronic part material, such as a solar cell rear face sealant; an electrically insulating material, such as an insulating coating material for electric wires/cables; an elastic adhesive; a contact-type adhesive; a spray type sealant; a crack repairing material; tiling adhesives; a powdery paint; a casting material; a rubber material for medical use; an adhesive for medical use; a sealant for medical device; a food wrapping material; a jointing sealant for exterior members such as a siding board; a coating material; a primer; an electroconductive material for shielding electromagnetic waves; a thermally conductive material; a hot melt material; an electrical or electronic potting material; a film; a gasket; various molding materials; a rust-preventive or waterproofing sealant for end faces (cut regions) of net-reinforced glass or laminated glass; and a liquid sealing agent used in such as car components, electric components, various mechanical components and the like, and the like.

Furthermore, the curable composition can be adhered closely to wide range of substrates such as glass, ceramics, woods, metals, resin-molded products and the like by itself or by aid of a primer. Accordingly, the curable composition may also be used as air-tightly sealing compositions and adhesive compositions of various types.

The curable composition of the present invention may also be used as an adhesive for interior panels, an adhesive for exterior panels, an adhesive for laying tiles, an adhesive for laying building stones, an adhesive for finishing ceilings, an adhesive for finishing floors, an adhesive for finishing walls, an adhesive for vehicle panels, an adhesive for assembling an electrical, electronic or precision instrument, a sealant for direct grading, a sealant for laminated glass, a sealant for the SSG method, or a sealant for working joints of buildings.

EXAMPLES

The present invention will be specifically described by way of the following examples and comparative examples. However, the present invention is not limited thereto. About the following examples and comparative examples, one or more experimental examples that should be strictly expressed as "Example" may be expressed as "Comparative Example". Such an expression is used in such a manner that the advantageous effects of the present invention recited in dependent claims can be more clearly understood. Accordingly, even when one or more of the experimental examples are expressed as "Comparative Example", attention should be paid to a matter that the Applicant does not intend to exclude the experimental example from the scope of the claims. Whether or not each of the experimental examples is included in the scope of the claims can be naturally decided by comparing the example with the individual claims.

Synthesis Example 1

A polyoxypropylenetriol having a molecular weight of about 3,000 was used as an initiator to polymerize propylene oxide in the presence of a zinc hexacyanocobaltate glyme complex catalyst, so as to yield a polypropylene oxide having hydroxyl groups at its terminals and having a number-average molecular weight (molecular weight in terms of polystyrene measured by use of an HLC-8120 GPC as a solvent delivery system, a TSK-GEL H type as a column, and THF as a solvent) of about 26,000. Subsequently, to this hydroxyl-group-terminated polypropylene oxide was added a solution of NaOMe in methanol in a 1.2-fold equivalent of the hydroxyl groups of the polypropylene oxide, and then methanol was distilled off. Furthermore, thereto was added allyl chloride to convert the hydroxyl groups at the terminals to ally groups. An unreacted fraction of allyl chloride was removed by degassing under reduced pressure. Into 100 parts by mass of the resultant crude ally-group-terminated polypropylene oxide were incorporated 300 parts by mass of n-hexane and 300 parts by mass of water, and the solution was stirred. Thereafter, water was removed therefrom by centrifugation. Into the resultant hexane solution were incorporated 300 parts by mass of water, and the solution was stirred. Again, water was removed therefrom by centrifugation, and then hexane was removed by degassing under reduced pressure. The process gave an allyl-group-terminated, trifunctional polypropylene oxide (P-1) having a number-average molecular weight of about 26,000.

At 90° C., 1.2 parts by mass of trimethoxysilane was caused to react with 100 parts by mass of the resultant allyl-group-terminated polypropylene oxide (P-1) in the presence of 150 ppm of a solution of a platinum vinylsiloxane complex in 2-propanol, the content by percentage of platinum being 3% by weight, as a catalyst for 2 hours to yield a trimethoxysilyl-group-terminated polyoxypropylene polymer (A-1). According to $^1$H-NMR (measurement in a $CDCl_3$ solvent, using a JNM-LA400 manufactured by JEOL Ltd.), the silyl group introduction ratio was measured by a method described below. From the following relative value (C=T/M) and relative value (C'=T'/M'), the silyl group introduction ratio (C'/C) was about 60%: the relative value (C=T/M) of the integrated value (T) at a peak assigned to the terminal protons of the ally groups (—O—$CH_2$—CH=$CH_2$: near 5.1 ppm) to the integrated value (M) at a peak assigned to the methyl groups (—$CH_3$: near 1.2 ppm) in the main chain of the allyl-terminated polypropylene oxide (P-1) before the hydrosilylation reaction; and the relative value (C'=T'/M') of the integrated value (T') at a peak assigned to the methylene protons bonded to the silicon atom of each of the terminal silyl groups (—O—$CH_2$—$CH_2$—$CH_2$—$Si(OCH_3)_3$: near 0.6 ppm) to the integrated value (M') at a peak assigned to the methyl groups (—$CH_3$: near 1.2 ppm) in the main chain of the silyl-terminated polypropylene oxide (A-1). From this result, it can be calculated that the number of the terminal trimethoxysilyl groups was about 1.8 per molecule on average since the polymer (A-1) was trifunctional.

Synthesis Example 2

A 1/1 (ratio by weight) mixture of a polyoxypropylenediol having a molecular weight of about 2,000 and a polyoxypropylenetriol having a molecular weight of about 3,000 was used as an initiator to polymerize propylene oxide in the presence of a zinc hexacyanocobaltate glyme complex catalyst, so as to yield a polypropylene oxide having a number-average molecular weight of about 19,000. Subsequently, to this hydroxyl-group-terminated polypropylene oxide was added a solution of NaOMe in methanol in a 1.2-fold equivalent of the hydroxyl groups of the polypropylene oxide, and then methanol was distilled off. Furthermore, thereto was added allyl chloride to convert the hydroxyl groups at the terminals to ally groups. This process gave an ally-group-terminated polypropylene oxide having a number-average molecular weight of about 19,000. Into 100 parts by mass of the resultant crude ally-group-terminated polypropylene oxide were incorporated 300 parts by mass of n-hexane and 300 parts by mass of water, and the solution was stirred. Thereafter, water was removed therefrom by centrifugation. Into the resultant hexane solution were further incorporated 300 parts by mass of water, and the solution was stirred. Again, water was removed therefrom by centrifugation, and then hexane was removed by degassing under reduced pressure to yield a purified allyl-group-terminated polypropylene oxide (P-2).

At 90° C., 1.35 parts by mass of methyldimethoxysilane was caused to react with 100 parts by mass of the resultant allyl-group-terminated polypropylene oxide (P-2) in the presence of 150 ppm of a solution of a platinum vinylsiloxane complex in 2-propanol, the content by percentage of platinum being 3% by weight, as a catalyst for 5 hours to yield a methyldimethoxysilyl-group-terminated polypropylene oxide polymer (A-2). In the same way as described above, the number of the terminal methyldimethoxysilyl groups was calculated. As a result, it was about 1.7 per molecule on average.

Synthesis Example 3

A polyoxypropylenediol having a molecular weight of about 2,000 was used as an initiator to polymerize propylene oxide in the presence of a zinc hexacyanocobaltate glyme complex catalyst, so as to yield a polypropylene oxide having hydroxyl groups at its terminals and having a number-average molecular weight (molecular weight in terms of polystyrene measured by use of an HLC-8120 GPC as a solvent delivery system, a TSK-GEL H type as a column, and THF as a solvent) of about 25,500. Subsequently, to this hydroxyl-group-terminated polypropylene oxide was added a solution of NaOMe in methanol in a 1.2-fold equivalent of the hydroxyl groups of the polypropylene oxide, and then methanol was distilled off. Furthermore, thereto was added allyl chloride to convert the hydroxyl groups at the terminals to ally groups. An unreacted fraction of allyl chloride was removed by degassing under reduced pressure. Into 100 parts by mass of the resultant crude ally-group-terminated polypropylene oxide were incorporated 300 parts by mass of n-hexane and 300 parts by mass of water, and the solution was stirred. Thereafter, water was removed therefrom by centrifugation. Into the resultant hexane solution were incorporated 300 parts by mass of water, and the solution was stirred. Again, water was removed therefrom by centrifugation, and then hexane was removed by degassing under reduced pressure. The process gave an allyl-group-terminated, bifunctional polypropylene oxide (P-3) having a number-average molecular weight of about 25,500.

At 90° C., 1.1 parts by mass of trimethoxysilane was caused to react with 100 parts by mass of the resultant allyl-group-terminated polypropylene oxide (P-3) in the presence of 150 ppm of a solution of a platinum vinylsiloxane complex in 2-propanol, the content by percentage of platinum being 3% by weight, as a catalyst for 2 hours to yield a trimethoxysilyl-group-terminated polyoxypropylene polymer (A-3). According to $^1$H-NMR (measurement in a $CDCl_3$ solvent, using a JNM-LA400 manufactured by JEOL Ltd.), the silyl group introduction ratio was measured by a method described below. From the following relative value (C=T/M) and relative value (C'=T'/M'), the silyl group introduction ratio (C'/C) was about 65%: the relative value (C=T/M) of the integrated value (T) at a peak assigned to the terminal protons of the ally groups (—O—$CH_2$—CH=$CH_2$: near 5.1 ppm) to the integrated value (M) at a peak assigned to the methyl groups (—$CH_3$: near 1.2 ppm) in the main chain of the allyl-terminated polypropylene oxide (P-3) before the hydrosilylation reaction; and the relative value (C'=T'/M') of the integrated value (T') at a peak assigned to the methylene protons bonded to the silicon atom of each of the terminal silyl groups (—O—$CH_2$—$CH_2$—$CH_2$—Si$(OCH_3)_3$: near 0.6 ppm) to the integrated value (M') at a peak assigned to the methyl groups (—$CH_3$: near 1.2 ppm) in the main chain of the silyl-terminated polypropylene oxide (A-1). From this result, it can be calculated that the number of the terminal trimethoxysilyl groups was about 1.3 per molecule on average since the polymer (A-3) was bifunctional.

Fillers used in examples and comparative examples described below are shown in Table 1. The contents thereof are in accordance with product catalogues of individual manufacturing makers.

TABLE 1

| Product name | Kind | Maker | Surface treating agent |
|---|---|---|---|
| Hakuenka CCR | Surface-treated colloidal calcium carbonate | Shiraishi Kogyo Kaisha, Ltd. | Aliphatic acid |
| Calfine 200M | Surface-treated colloidal calcium carbonate | Maruo Calcium Co., Ltd. | Aliphatic acid |
| Sealets 200 | Surface-treated colloidal calcium carbonate | Maruo Calcium Co., Ltd. | Especial organic substance |
| Lighton A | Surface-treated colloidal calcium carbonate | Shiraishi Calcium Kaisha, Ltd. | Aliphatic acid ester |
| Whiton SB | Untreated ground calcium carbonate | Shiraishi Calcium Kaisha, Ltd. | — |
| Softon 3200 | Untreated ground calcium carbonate | Shiraishi Calcium Kaisha, Ltd. | — |
| PO220B | Surface-treated ground calcium carbonate | Shiraishi Calcium Kaisha, Ltd. | Aliphatic acid |
| PO320B10 | Surface-treated ground calcium carbonate | Shiraishi Calcium Kaisha, Ltd. | Aliphatic acid |
| Aerosil R974 | Hydrophobic fumed silica | Nippon Aerosil Co., Ltd. | Dimethyl-dichlorosilane |

Examples 1 to 7, and Comparative Examples 1 to 3

In accordance with each formulation shown in Table 2, the organic polymer (A-1) and a filler were mixed with each other by use of a spatula, and a three-roll machine was used to disperse the dispersible components uniformly to prepare a main agent. To the main agent was added a solution of tetrabutylammonium fluoride in THF as a curing catalyst, and the spatula was used to mix the components speedily. The mixture was caused to flow into a lid of an ointment can, and then the surface was adjusted into a flat surface. This time was defined as the curing start time. The surface was touched with the spatula at intervals of 5 minutes in an initial period of 1 hour, and at intervals of 1 hour after the period. A measurement was made wherein the time when the blend came not to adhere onto the spatula was specified as the skin formation time. Furthermore, after one day, the cured product was taken out from the ointment can, and the product was stretched by hand, so as to judge the strength. The product is ranged as A when strength was required for breaking the product, and is ranged as B when the product was easily broken. The results are shown in Table 2.

TABLE 2

| | | Examples | | | | | | | Comparative Examples | | |
|---|---|---|---|---|---|---|---|---|---|---|---|
| Composition (parts by weight) | | 1 | 2 | 3 | 4 | 5 | 6 | 7 | 1 | 2 | 3 |
| Organic polymer (A) | A-1 | 100 | 100 | 100 | 100 | 100 | 100 | 100 | 100 | 100 | 100 |
| Filler (C) | Lighton A | 20 | | | | | | | | | |
| | Whiton SB | | 20 | | | | | | | | |
| | PO220B | | | 20 | | | | | | | |

TABLE 2-continued

| Composition (parts by weight) | | Examples 1 | 2 | 3 | 4 | 5 | 6 | 7 | Comparative Examples 1 | 2 | 3 |
|---|---|---|---|---|---|---|---|---|---|---|---|
| Aliphatic-acid-treated colloidal calcium carbonate | PO320B10 | | | | 20 | | | | | | |
| | Softon 3200 | | | | | 20 | | | | | |
| | Sealets 200 | | | | | | 20 | | | | |
| | Aerosil R973 | | | | | | | 10 | | | |
| | CCR | | | | | | | | 20 | | |
| | Calfine 200M | | | | | | | | | 20 | |
| Fluoride salt compound (B) | TBAF[(1)] | 1 | 1 | 1 | 1 | 1 | 1 | 1 | 1 | 1 | 1 |
| Mass of F in component (B)/ mass of precipitated calcium carbonate surface-treated with aliphatic acid | (g/g) | | | | | | | | 0.0011 | 0.0011 | |
| Curability | Skin formation time | 10 minutes | 10 minutes | 15 minutes | 10 minutes | 5 minutes | 40 minutes | 5 minutes | 3 hours or longer | 3 hours or longer | 5 minutes |
| Strength | Judgment by finger touch | A | A | A | A | A | A | A | Uncured | Uncured | B |

[(1)]1.0 M tetrabutylammonium fluoride solution in THF (manufactured by Sigma-Aldrich Japan K.K.)

In a case where colloidal calcium carbonate surface-treated with aliphatic acid was used as in Comparative Examples 1 and 2, the skin formation time was 3 hours or longer. Thus, a long time was required. In a case where ground calcium carbonate was used as in each of Examples 1 to 5, an effect of each surface-treating agent was small so that a good curability was exhibited. In a case where colloidal calcium carbonate surface-treated with a material other than any aliphatic acid was used as in Example 6, a good curability was obtained also. In a case where silica was used in Example 7, a good curability was exhibited also. The cured products of Examples 1 to 7 had a sufficient strength, and a large strength was required for breaking the products. On the other hand, the compositions of Comparative Examples 1 and 2 were insufficiently cured. The cured product of Comparative Example 3, wherein no filler was used, was easily broken.

Examples 8 to 10, and Comparative Examples 4 and 5

In accordance with each formulation shown in Table 3, the organic polymer (A-2) and a filler were mixed with each other by use of a spatula, and a three-roll machine was used to disperse the dispersible components uniformly to prepare a main agent. To the main agent was added a solution of tetrabutylammonium fluoride in THF as a curing catalyst, and the spatula was used to mix the components speedily. The mixture was caused to flow into a lid of an ointment can, and then the surface was adjusted into a flat surface. This time was defined as the curing start time. The surface was touched with the spatula at intervals of 5 minutes in an initial period of 1 hour, and at intervals of 1 hour after the period. A measurement was made wherein the time when the blend came not to adhere onto the spatula was specified as the skin formation time. The mixture was filled into a sheet-form mold frame having a thickness of 3 mm, and the surface was adjusted. The mixture was subjected to regimen treatment at 23° C. for 3 days and at 50° C. for 4 days. Thereafter, a dumbbell-shaped frame was used to punch out the resultant. In this way, a dumbbell-shaped cured product was produced. This dumbbell piece was used to make a tensile test at a tensile speed of 200 mm/minute to measure the breaking strength (MPa) and the breaking elongation (%). The results are shown in Table 3. In the table, the breaking strength is denoted as A when it was 0.5 MPa or more, and is denoted as B when it was less than 0.5 MPa. The breaking elongation is denoted as A when it was 200% or more, and is denoted as B when it was less than 200%.

TABLE 3

| Composition (parts by weight) | | Examples 8 | 9 | 10 | Comparative Examples 4 | 5 |
|---|---|---|---|---|---|---|
| Organic polymer (A) | A-2 | 100 | 100 | 100 | 100 | 100 |
| Filler (C) | Lighton A | 100 | | | | |
| | Whiton SB | | 100 | | | |
| | Aerosil R973 | | | 5 | | |
| Colloidal calcium carbonate treated with aliphatic acid | CCR | | | | 100 | |
| Thixotropic agent | DISPARLON 6500[(1)] | | | | 2 | |
| Fluoride salt compound (B) | TBAF[(2)] | 4 | 2 | 1 | 7 | 1 |
| Mass of F in component (B)/ mass of precipitated calcium carbonate surface-treated with aliphatic acid | (g/g) | | | | 0.00148 | |

TABLE 3-continued

|  |  | Examples | | | Comparative Examples | |
|---|---|---|---|---|---|---|
| Composition (parts by weight) | | 8 | 9 | 10 | 4 | 5 |
| Curability | Skin formation time | 25 minutes | 5 minutes | 5 minutes | 3 hours or longer | 5 minutes |
| Breaking strength | Judgment | A | A | A | Uncured | B |
| Breaking elongation | Judgment | A | A | A | Uncured | B |

[1] Aliphatic acid amide wax (manufactured by Kusumoto Chemicals Ltd.)
[2] 1.0 M tetrabutylammonium fluoride solution in THF (manufactured by Sigma-Aldrich Japan K.K.)

In a case where colloidal calcium carbonate surface-treated with aliphatic acid was used as in Comparative Example 4, it took a long time to cure the composition. In a case where ground calcium carbonate was used as in each of Examples 8 and 9, good curability was exhibited. In a case where silica was used as in Example 10, a good curability was exhibited also. The cured products of Examples 8 and 10 had a sufficient strength and a good elongation. On the other hand, about the cured product wherein no filler was used as in Comparative Example 5, the strength and the elongation were each insufficient.

Example 11 and Comparative Example 6

In accordance with each formulation shown in Table 4, the curability was evaluated in the same way as described above. The results are shown in Table 4.

TABLE 4

| Composition (parts by weight) | | Examples 11 | Comparative Examples 6 |
|---|---|---|---|
| Organic polymer (A) | A-2 | 100 | 100 |
| Untreated ground calcium carbonate (C) | Whiton SB | 120 | |
| Colloidal calcium carbonate treated with aliphatic acid | CCR | | 120 |
| Fluoride salt compound (B) | TBAF[1] | 1 | 1 |
| Mass of F in component (B)/mass of precipitated calcium carbonate surface-treated with aliphatic acid | (g/g) | | 0.0002 |
| Curability | Skin formation time | 20 minutes | 10 hours or longer |

[1] 1.0 M tetrabutylammonium fluoride solution in THF (manufactured by Sigma-Aldrich Japan K.K.)

In a case where ground calcium carbonate (Whiton SB) was used as the filler as in Example 11, a good curability was exhibited. In a case where colloidal calcium carbonate (CCR) surface-treated with aliphatic acid was used as in Comparative Example 6, it took a very long time to cure the composition.

Examples 12 and 13, and Comparative Example 7

In accordance with each formulation shown in Table 5, the organic polymer (A-2), a filler and various additives were mixed with each other. A three-roll machine was used to disperse the dispersible components to prepare a main agent. The curability was evaluated in the same way as described above.

The results are shown in Table 5.

TABLE 5

| Composition (parts by weight) | | Examples | | Comparative Example |
|---|---|---|---|---|
| | | 12 | 13 | 7 |
| Organic polymer (A) | A-2 | 100 | 100 | 100 |
| Untreated ground calcium carbonate (C) | Whiton SB | 120 | 120 | |
| Colloidal Calcium carbonate treated with aliphatic acid | CCR | | | 120 |

TABLE 5-continued

|  | Composition (parts by weight) | Examples 12 | Examples 13 | Comparative Example 7 |
|---|---|---|---|---|
| Plasticizer | Actcol P23[1] | 55 | 55 | 55 |
| Titanium oxide | TIPAQUE R820[2] | 20 | 20 | 20 |
| Thixotropic agent | DISPARLON 6500[3] | 2 | 2 | 2 |
| Ultraviolet absorber | TINUVIN 327[4] | 1 | 1 | 1 |
| Light stabilizer | Sanol LS-770[5] | 1 | 1 | 1 |
| Fluoride salt compound (B) | TBAF[6] | 3 | 4 | 8 |
| Mass of F in component (B)/mass of precipitated calcium carbonate surface-treated with aliphatic acid | (g/g) |  |  | 0.0014 |
| Curability | Skin formation time | 15 minutes | 5 minutes | 6 hours or longer |

[1]PRG 3000 (manufactured by Takeda Chemical Industries, Ltd.)
[2](manufactured by Ishihara Sangyo Kaisha, Ltd.)
[3]Aliphatic acid amide wax (manufactured by Kusumoto Chemicals Ltd.)
[4]2-(3,5-Di-t-butyl-2-hydroxyphenyl)-5-chlorobenzotriazole (manufactured by Ciba Specialty Chemicals Inc.)
[5]Bis(2,2,6,6-tetramethyl-4-piperidyl) sebacate (manufactured by Sankyo Co., Ltd.)
[6]1.0 M tetrabutylammonium fluoride solution in THF (manufactured by Sigma-Aldrich Japan K.K.)

In a case where colloidal calcium carbonate (CCR) surface-treated with aliphatic acid was used, it took a very long time to cure the composition (Comparative Example 7). In a case where ground calcium carbonate (Whiton SB) was used as the filler as in Examples 12 and 13, a good curability was exhibited.

Example 14 and Comparative Example 8

In accordance with each formulation shown in Table 6, the organic polymer (A-2), a filler and various additives were mixed with each other. A three-roll machine was used to disperse the dispersible components to prepare a main agent. Potassium fluoride was used as a fluoride salt compound (B) to evaluate the curability in the same way as described above. The results are shown in Table 6. Potassium fluoride was used as a 6.3% by weight solution in methanol. In the table, each amount of the potassium fluoride solution is shown.

TABLE 6

|  | Composition (parts by weight) | Examples 14 | Comparative Example 8 |
|---|---|---|---|
| Organic polymer (A) | A-2 | 100 | 100 |
| Untreated ground calcium carbonate (C) | Whiton SB | 120 |  |
| Colloidal Calcium carbonate treated with aliphatic acid | CCR |  | 120 |
| Plasticizer | Actcol P23[1] | 55 | 55 |
| Titanium oxide | TIPAQUE R820[2] | 20 | 20 |
| Thixotropic agent | DISPARLON 6500[3] | 2 | 2 |
| Ultraviolet absorber | TINUVIN 327[4] | 1 | 1 |
| Light stabilizer | Sanol LS-770[5] | 1 | 1 |
| Fluoride salt compound (B) | KF[6] | 3 | 3 |
| Mass of F in component (B)/mass of precipitated calcium carbonate surface-treated with aliphatic acid | (g/g) |  | 0.0005 |
| Curability | Skin formation time | 10 minutes | 10 hours or longer |

[1]PRG 3000 (manufactured by Takeda Chemical Industries, Ltd.)
[2]manufactured by Ishihara Sangyo Kaisha, Ltd.)
[3]Aliphatic acid amide wax (manufactured by Kusumoto Chemicals Ltd.)
[4]2-(3,5-Di-t-butyl-2-hydroxyphenyl)-5-chlorobenzotriazole (manufactured by Ciba Specialty Chemicals Inc.)
[5]Bis(2,2,6,6-tetramethyl-4-piperidyl) sebacate (manufactured by Sankyo Co., Ltd.)
[6]6.3% by mass solution of potassium fluoride (available from Wako Pure Chemical Industries, Ltd.) in methanol In a case where colloidal calcium carbonate (CCR) surface-treated with aliphatic acid was used, it took a very long time to cure the composition (Comparative Example 8). In a case where ground calcium carbonate (Whiton SB) was used as the filler as in Example 14, a good curability was exhibited.

Examples 15 to 17, and Comparative Examples 9 and 10

In accordance with each formulation shown in Table 7, the organic polymer (A-3), a filler and a thixotropic agent were mixed with each other by use of a spatula, and a three-roll machine was used to disperse the dispersible components uniformly to prepare a main agent. To the main agent was added a fluoride salt compound as a curing catalyst, and the spatula was used to mix the components sufficiently for 1 minute. While the mixture was stretched into a thin form with the spatula, bubbles were removed therefrom. The resultant mixture was filled into a lid of an ointment can, and then the surface was adjusted into a flat surface. This time was defined as the curing start time. The surface was touched with the spatula at intervals of 5 minutes in an initial period of 1 hour, and at intervals of 1 hour after the period. A measurement was made wherein the time when the blend came not to adhere onto the spatula was specified as the skin formation time. The results are shown in Table 7.

TABLE 7

| Composition (parts by weight) | | Comparative Examples | | Examples | | |
|---|---|---|---|---|---|---|
| | | 9 | 10 | 15 | 16 | 17 |
| Organic polymer (A) | A-3 | 100 | 100 | 100 | 100 | 100 |
| Calcium carbonate (C) | CCR[1] | 50 | 50 | 50 | 50 | 50 |
| Ground calcium carbonate (C) | Whiton SB[2] | 50 | 50 | 50 | 50 | 50 |
| Thixotropic agent | DISPARLON 6500[3] | 2 | 2 | 2 | 2 | 2 |
| Fluoride salt compound (B) | TBAF[4] | 2 | 3 | 4 | 5 | 3 |
| | Cesium fluoride[5] | | | | | 10 |
| Weight of F in component (B)/weight of component (C) | (g/g) | 0.0008 | 0.0013 | 0.0017 | 0.0021 | 0.0264 |
| Curability | Skin formation time | 3 hours or longer | 1 hours or longer | 10 minutes | 5 minutes | 40 minutes |

[1]Colloidal calcium carbonate surface-treated with aliphatic acid (manufactured by Shiraishi Kogyo Kaisha, Ltd.)
[2](manufactured by Shiraishi Calcium Kaisha, Ltd.)
[3]Aliphatic acid amide wax (manufactured by Kusumoto Chemicals Ltd.)
[4]1.0 M tetrabutylammonium fluoride solution in THF (manufactured by Sigma-Aldrich Japan K.K.)
[5]CsF (available from Wako Pure Chemical Industries, Ltd.)

In a case where the ratio by mass of F in the fluoride salt compound (B) to colloidal calcium carbonate (CCR) surface-treated with aliphatic acid was smaller than 0.0015 as in Comparative Examples 9 and 10, it took a long time to cure the composition. On the other hand, in a case where the ratio was larger than 0.0015 as in Examples 15 to 17, a good curability was realized.

Example 18 and Comparative Example 11

In accordance with each formulation shown in Table 8, the organic polymer (A-2), a filler and various additives were mixed with each other. A three-roll machine was used to disperse the dispersible components to prepare a main agent. The curability was evaluated in the same way as described above. The results are shown in Table 8.

TABLE 8

| Composition (parts by weight) | | Comparative Examples 11 | Examples 18 |
|---|---|---|---|
| Organic polymer (A) | A-2 | 100 | 100 |
| Calcium carbonate (C) | CCR[1] | 120 | 120 |
| Plasticizer | Actcol P23[2] | 55 | 55 |
| Titanium oxide | TIPAQUE R820[3] | 20 | 20 |
| Thixotropic agent | DISPARLON 6500[4] | 2 | 2 |
| Ultraviolet absorber | TINUVIN 327[5] | 1 | 1 |
| Light stabilizer | Sanol LS-770[6] | 1 | 1 |
| Fluoride salt compound (B) | TBAF[7] | 8 | 10 |
| Weight of F in component (B)/weight of component (C) | (g/g) | 0.0014 | 0.0018 |

TABLE 8-continued

| Composition (parts by weight) | Comparative Examples 11 | Examples 18 |
|---|---|---|
| Curability  Skin formation time | 6 hours or longer | 5 minutes |

[1]Colloidal calcium carbonate surface-treated with aliphatic acid (manufactured by Shiraishi Kogyo Kaisha, Ltd.)
[2]PRG 3000 (manufactured by Takeda Chemical Industries, Ltd.)
[3]manufactured by Ishihara Sangyo Kaisha, Ltd.)
[4]Aliphatic acid amide wax (manufactured by Kusumoto Chemicals Ltd.)
[5]2-(3,5-Di-t-butyl-2-hydroxyphenyl)-5-chlorobenzotriazole (manufactured by Ciba Specialty Chemicals Inc.)
[6]Bis(2,2,6,6-tetramethyl-4-piperidyl) sebacate (manufactured by Sankyo Co., Ltd.)
[7]1.0-M tetrabutylammonium fluoride solution in THF (manufactured by Sigma-Aldrich Japan K.K.)

In the case of using aliphatic-acid surface-treated colloidal calcium carbonate (CCR), it took a very long time to cure the composition when the ratio of the mass of F in the fluoride salt compound (B) to that of CCR was smaller than 0.0015 (Comparative Example 11). On the other hand, when this ratio by mass was larger than 0.0015, a very good curability was exhibited (Example 18).

Examples 19 to 22, and Comparative Examples 12 to 14

In accordance with each formulation as shown in Table 9, individual components were weighed and put into a metallic can at 23° C. and 50% RH, and then a spatula was used to knead the components sufficiently for 1 minute. The time when the kneading was finished was defined as the curing start time. The metallic can was allowed to stand still at 23° C. and 50% RH. The spatula was used to knead a portion of the composition to measure the period up to a time when the viscous liquid started to turn to a rubbery elastic body as the gelation period, and the curability was evaluated. The results are shown in Table 9.

TABLE 9

| Composition (parts by weight) | | Examples | | | | Comparative Examples | | |
|---|---|---|---|---|---|---|---|---|
| | | 19 | 20 | 21 | 22 | 12 | 13 | 14 |
| Polymer (A) having a reactive silicon group | Polymer (A-2) yielded in Synthesis Example 2 | 100 | 100 | 100 | 100 | 100 | 100 | 100 |

TABLE 9-continued

| Composition (parts by weight) | | Examples | | | | Comparative Examples | | |
|---|---|---|---|---|---|---|---|---|
| | | 19 | 20 | 21 | 22 | 12 | 13 | 14 |
| Ammonium hydrofluoride compound (B2) | Triethylamine•3HF | 1.0 | 1.0 | | | 1.0 | | |
| | EMIm$^+$•(HF)$_{2.3}$ F$^{-(1)}$ | | | 1.0 | 1.0 | | 1.0 | |
| Amine compound (F) | DBU$^{(2)}$ | 1.0 | | 1.0 | | | | 1.0 |
| | 1-Phenylguanidine | | 1.0 | | 1.0 | | | |
| Curability | Gelation period | 1 minute | 1 minute | 1 minute | 1 minute | >1 day | >1 day | >1 day |

$^{(1)}$1-Ethyl-3-methylimidazolium•(HF)$_{2.3}$F$^-$
$^{(2)}$1,8-Diazabicyclo[5.4.0]-7-undecene As is understood from Table 9, in a case where the ammonium hydrofluoride compound (B2) and the amine compound (F) were blended with the polymer (A) having a reactive silicon group, an excellent curability was exhibited. However, in a case where the ammonium hydrofluoride compound (B2) or the amine compound (F) was not blended therewith, an excellent curability was not obtained.

Examples 23 to 26

The following were used: 100 parts by weight of the polymer (A-2) yielded in Synthesis Example 2 as a polymer (A) having a reactive silicon group; 120 parts by weight of surface-treated colloidal calcium carbonate (trade name: Hakuenka CCR, manufactured by Shiraishi Kogyo Kaisha, Ltd.) and 20 parts by weight of titanium oxide (trade name: TIPAQUE R-820, manufactured by Ishihara Sangyo Kaisha, Ltd.) as fillers; 55 parts by weight of a plasticizer (trade name: Actcol P23, manufactured by Takeda Chemical Industries, Ltd.); 2 parts by weight of a thixotropic agent (trade name: DISPARLON #6500, manufactured by Kusumoto Chemicals Ltd.); 1 part by weight of an antioxidant (trade name: Yunox KC, manufactured by YSK, Inc.); 1 part by weight of an ultraviolet absorbent (trade name: TINUVIN 327, manufactured by Ciba Specialty Chemicals Inc.); and 1 part by weight of a light stabilizer (trade name: Sanol LS-770, manufactured by Sankyo Co., Ltd.). The components were each weighed. The weighed components were mixed with each other and sufficiently kneaded, and then a three-paint-roll machine was used to disperse the dispersible components. Thereto were added 3 parts by weight of γ-(2-aminoethyl)aminopropyltrimethoxysilane (trade name: A-1120, manufactured by Dow Corning Toray Co., Ltd.) as an adhesive property supplier, and 2 parts by weight of vinyltrimethoxysilane (trade name: A-171, manufactured by Dow Corning Toray Co., Ltd.) as a compound having a reactive silicon group. The components were then mixed and kneaded to prepare a main agent.

In accordance with each formulation as shown in Table 10, individual components were weighed and put into a metallic can at 23° C. and 50% RH, and then a spatula was used to knead the components sufficiently for 1 minute. The time when the kneading was finished was defined as the curing start time. The metallic can was allowed to stand still at 23° C. and 50% RH. The spatula was used to knead a portion of the composition to measure the period up to a time when the viscous liquid started to turn to a rubbery elastic body as the gelation period, and the curability was evaluated. The results are shown in Table 10.

TABLE 10

| Composition (parts by weight) | | Examples | | | |
|---|---|---|---|---|---|
| | | 23 | 24 | 25 | 26 |
| Polymer (A) having a reactive silicon group | Main agent (containing polymer (A-2) yielded in Synthesis Example 2) | 305 | 305 | 305 | 305 |
| Ammonium hydrofluoride compound (B2) | Triethylamine•3HF | 1.0 | 1.0 | | |
| | EMIm$^+$•(HF)$_{2.3}$ F$^{-(1)}$ | | | 1.0 | 1.0 |
| Amine compound (F) | DBU$^{(2)}$ | 1.0 | | 1.0 | |
| | 1-Phenylguanidine | | 1.0 | | 1.0 |
| Curability | Gelation period | 39 minute | 14 minute | 8 minute | 6 minute |

$^{(1)}$1-Ethyl-3-methylimidazolium•(HF)$_{2.3}$F$^-$
$^{(2)}$1,8-Diazabicyclo[5.4.0]-7-undecene As is understood from Table 10, the compositions wherein the fillers, the compound having a reactive silicon group, and so on were added to and blended with the polymer (A) having a reactive silicon group also exhibited an excellent curability when the ammonium hydrofluoride compound (B2) and the amine compound (F) were blended therewith.

Synthesis Examples 4 to 9

Some compounds out of compounds shown in Table 11 were mixed with each other in amounts represented by respective parts by weight shown in Table 11, thereby conducting reaction to yield each mixture containing a primary, secondary or tertiary substituted ammonium fluoride salt compound (B3) (each of B3-1 to B3-6).

TABLE 11

|  |  | Synthesis Examples | | | | | |
|---|---|---|---|---|---|---|---|
|  |  | 4 | 5 | 6 | 7 | 8 | 9 |
| Raw materials (parts by weight) | EMIm$^+$•(HF)$_{2.3}$ F$^{-(1)}$ | 0.50 |  | 0.50 |  | 0.50 |  |
|  | Triethylamine•3HF |  | 0.50 |  | 0.50 |  | 0.50 |
|  | DBU$^{(2)}$ | 0.99 | 0.94 |  |  |  |  |
|  | 1-Phenylguanidine |  |  | 0.88 | 0.84 |  |  |
|  | Diethylaminopropylamine |  |  |  |  | 0.85 | 0.81 |
|  | Product | B3-1 | B3-2 | B3-3 | B3-4 | B3-5 | B3-6 |
| Product composition (ratios by mole) | EMIm$^+$•F$^{-(3)}$ | 1.0 |  | 1.0 |  | 1.0 |  |
|  | Triethylammonium fluoride (B3) |  | 1.0 |  | 1.0 |  | 1.0 |
|  | Ammonium fluoride (B3) wherein protons were added to DBU | 2.3 | 2.0 |  |  |  |  |
|  | Ammonium fluoride (B3) wherein protons were added to 1-phenylguanidine |  |  | 2.3 | 2.0 |  |  |
|  | Ammonium fluoride (B3) wherein protons were added to diethylaminopropylamine |  |  |  |  | 2.3 | 2.0 |

$^{(1)}$1-Ethyl-3-methylimidazolium•(HF)$_{2.3}$F$^-$
$^{(2)}$1,8-Diazabicyclo[5.4.0]-7-undecene
$^{(3)}$1-Ethyl-3-methylimidazolium fluoride Examples 27 to 32

In accordance with each formulation as shown in Table 12, individual components were weighed and put into a metallic can at 23° C. and 50% RH, and then a spatula was used to knead the components sufficiently for 1 minute. The time when the kneading was finished was defined as the curing start time. The metallic can was allowed to stand still at 23° C. and 50% RH. The spatula was used to knead a portion of the composition to measure the period up to a time when the viscous liquid started to turn to a rubbery elastic body as the gelation period, and the curability was evaluated. The results are shown in Table 12.

TABLE 12

|  |  | Examples | | | | | |
|---|---|---|---|---|---|---|---|
| Composition (parts by weight) |  | 27 | 28 | 29 | 30 | 31 | 32 |
| Polymer (A) having a reactive silicon group | Polymer (A-2) yielded in Synthesis Example 2 | 100 | 100 | 100 | 100 | 100 | 100 |
| Primary, secondary or tertiary substituted ammonium fluoride salt compound (B3) | Product (B3-1) yielded in Synthesis Example 4 | 1.5 |  |  |  |  |  |
|  | Product (B3-2) yielded in Synthesis Example 5 |  | 1.4 |  |  |  |  |
|  | Product (B3-3) yielded in Synthesis Example 6 |  |  | 1.4 |  |  |  |
|  | Product (B3-4) yielded in Synthesis Example 7 |  |  |  | 1.3 |  |  |
|  | Product (B3-5) yielded in Synthesis Example 8 |  |  |  |  | 1.4 |  |
|  | Product (B3-6) yielded in Synthesis Example 9 |  |  |  |  |  | 1.3 |
| Curability | Gelation period | 3 minutes | 10 minutes | 26 minutes | 12 minutes | 31 minutes | 31 minutes |

As is understood from Table 12, an excellent curability was exhibited also in the case of blending the primary, secondary or tertiary substituted ammonium fluoride salt compound (B3) with the polymer (A) having a reactive silicon group.

Example 33

At 23° C. and 50% RH, 305 parts by weight of the same main agent as used in Examples 23 to 26 and 2.7 parts by weight of the product (B3-1) yielded in Synthesis Example 4 were weighed and put into a metallic can, and then a spatula was used to knead the components sufficiently for 1 minute. The time when the kneading was finished was defined as the curing start time. The metallic can was allowed to stand still at 23° C. and 50% RH. The spatula was used to knead a portion of the composition to measure the period up to a time when the viscous liquid started to turn to a rubbery elastic body as the gelation period, and the curability was evaluated. As a result, the gelation period was 1 minute.

As described above, the composition wherein the fillers, the compound having a reactive silicon group, and so on were added to the polymer (A) having a reactive silicon group also exhibited an excellent curability in the case of blending the primary, secondary or tertiary substituted ammonium fluoride salt compound (B3) therewith.

Examples 34 to 47

Ammonium fluoride or hydrogenammonium fluoride was pulverized in a mortar, and then the resultant was passed through a sieve having a mesh of 150 μm. Next, thereto were added a dispersing agent (H) and an amine compound (F) in accordance with each formulation shown in Table 13. A spatula was used to mix the components sufficiently with each other. The resultant mixture was used, as it was, as a catalyst composition. Hereinafter, the catalyst compositions of Examples 34 to 47 will be referred to as catalyst compositions 34 to 47, respectively.

TABLE 13

| Composition parts by weight | | 34 | 35 | 36 | 37 | 38 | 39 | 40 | 41 | 42 | 43 | 44 | 45 | 46 | 47 |
|---|---|---|---|---|---|---|---|---|---|---|---|---|---|---|---|
| | Ammonium fluoride | 100 | | | | | | | | | | | | | |
| | Hydrogenammonium fluoride | | 100 | 100 | 100 | 100 | 100 | 100 | 100 | 100 | 100 | 100 | 100 | 100 | 100 |
| Amine compound (F) | DBU[1] | | 267 | 267 | 89 | | | | | | | | | | |
| | 1-Phenylguanidine | | | | | 237 | | | | | | | | | |
| | 1,1,3,3-Tetramethylguanidine | | | | | | 202 | | | | | | | | |
| | 3-Diethylaminopropylamine | 351 | | | | | | 228 | 114 | 342 | 228 | 228 | 228 | | |
| | 2-Diethylaminoethylamine | | | | | | | | | | | | | 204 | |
| | Dodecylamine | | | | | | | | | | | | | | 324 |
| | Mole number of amine compound (F)/Mole number of ammonium fluoride or hydrogenammonium fluoride | 1.0 | 1.0 | 1.0 | 0.22 | 1.0 | 1.0 | 1.0 | 0.5 | 1.5 | 1.0 | 1.0 | 1.0 | 1.0 | 1.0 |
| Dispersing agent (H) | Methanol | 100 | | 100 | 100 | 100 | 100 | 100 | 100 | 100 | | | | 100 | 324 |
| | N-n-butylbenzenesulfonamide | | | | | | | | | | 200 | | | | |
| | PPG3000[2] | | | | | | | | | | | 300 | | | |
| | Diisodecyl phthalate | | | | | | | | | | | | 200 | | |

[1]1,8-Diazabicyclo[5.4.1]-7-undecene
[2]Hydroxyl-double-terminated polypropylene glycol (molecular weight: 3000)

Examples 48 to 60, and Comparative Examples 15 to 16

In accordance with each formulation as shown in Table 14 (Examples 48 to 60) and Table 15 (Comparative Examples 15 to 16), individual components were weighed and put into a metallic can at 23° C. and 50% RH, and then a spatula was used to knead the components sufficiently for 1 minute. The time when the kneading was finished was defined as the curing start time. The metallic can was allowed to stand still at 23° C. and 50% RH. The spatula was used to knead a portion of the composition to measure the period up to a time when the viscous liquid started to turn to a rubbery elastic body as the gelation period, and the curability was evaluated. The results are shown in Tables 14 and 15.

TABLE 14

| Composition (parts by weight) | | 48 | 49 | 50 | 51 | 52 | 53 | 54 | 55 | 56 | 57 | 58 | 59 | 60 |
|---|---|---|---|---|---|---|---|---|---|---|---|---|---|---|
| Polymer (A) having a reactive silicon group | Polymer (A-2) yielded in Synthesis Example 4 | 100 | 100 | 100 | 100 | 100 | 100 | 100 | 100 | 100 | 100 | 100 | 100 | 100 |

TABLE 14-continued

| Composition (parts by weight) | | 48 | 49 | 50 | 51 | 52 | 53 | 54 | 55 | 56 | 57 | 58 | 59 | 60 |
|---|---|---|---|---|---|---|---|---|---|---|---|---|---|---|
| Catalyst composition | Catalyst composition 34 | 6.0 | | | | | | | | | | | | |
| | Catalyst composition 35 | | 1.0 | | | | | | | | | | | |
| | Catalyst composition 36 | | | 1.0 | | | | | | | | | | |
| | Catalyst composition 38 | | | | 1.5 | | | | | | | | | |
| | Catalyst composition 39 | | | | | 1.4 | | | | | | | | |
| | Catalyst composition 40 | | | | | | 1.4 | | | | | | | |
| | Catalyst composition 41 | | | | | | | 1.6 | | | | | | |
| | Catalyst composition 42 | | | | | | | | 1.4 | | | | | |
| | Catalyst composition 43 | | | | | | | | | 1.6 | | | | |
| | Catalyst composition 44 | | | | | | | | | | 2.0 | | | |
| | Catalyst composition 45 | | | | | | | | | | | 1.6 | | |
| | Catalyst composition 46 | | | | | | | | | | | | 1.4 | |
| | Catalyst composition 47 | | | | | | | | | | | | | 8.7 |
| Curability | Gelation period | 8 minutes | <1 minutes | <1 minute | 18 minutes | 8 minutes | 12 minutes | 11 minutes | 13 minutes | 11 minutes | 15 minutes | 20 minutes | 17 minutes | 70 minutes |

TABLE 15

| | | Comparative Examples | |
|---|---|---|---|
| Composition (parts by weight) | | 15 | 16 |
| Polymer (A) having a reactive silicon group | Polymer (A-2) yielded in Synthesis Example 2 | 100 | 100 |
| Amine compound (F) | DBU | | 1.0 |
| | 3-Diethylaminopropylamine | 1.0 | |
| Curability | Gelation period | >6 hours | >6 hours |

As is understood from Tables 14 and 15, about the curable compositions using the catalyst composition of the present invention, the gelation period was short, and an excellent curability was exhibited.

Examples 61 to 76

The following were used: 100 parts by mass of the polymer (A-2) yielded in Synthesis Example 2 as a polymer (A) having a reactive silicon group; 120 parts by mass of surface-treated colloidal calcium carbonate (trade name: Hakuenka CCR, manufactured by Shiraishi Kogyo Kaisha, Ltd.) and 20 parts by mass of titanium oxide (trade name: TIPAQUE R-820, manufactured by Ishihara Sangyo Kaisha, Ltd.) as fillers; 55 parts by mass of a plasticizer (trade name: Actcol P23, manufactured by Mitsui Chemicals Polyurethanes Inc.); 2 parts by mass of a thixotropic agent (trade name: DISPARLON #6500, manufactured by Kusumoto Chemicals Ltd.); 1 part by mass of an antioxidant (trade name: Yunox KC, manufactured by YSK, Inc.); 1 part by mass of an ultraviolet absorbent (trade name: TINUVIN 327, manufactured by Ciba Specialty Chemicals Inc.); and 1 part by mass of a light stabilizer (trade name: Sanol LS770, manufactured by Sankyo Co., Ltd.). The components were each weighed. The weighed components were mixed with each other and sufficiently kneaded, and then a three-paint-roll machine was used to disperse the dispersible components. Furthermore, thereto were added 3 parts by mass of γ-(2-aminoethyl)aminopropyltrimethoxysilane (trade name: A-1120, manufactured by Dow Corning Toray Co., Ltd.) as an adhesive property supplier, and 2 parts by mass of vinyltrimethoxysilane (trade name: A-171, manufactured by Dow Corning Toray Co., Ltd.) as a compound having a reactive silicon group, and then the components were mixed and kneaded to prepare a main agent.

Next, in accordance with each formulation as shown in Table 16, the main agent and each catalyst composition were weighed and put into a metallic can at 23° C. and 50% RH, and then a spatula was used to knead the components sufficiently for 1 minute. The time when the kneading was finished was defined as the curing start time. The metallic can was allowed to stand still at 23° C. and 50% RH. The spatula was used to knead a portion of the composition to measure the period up to a time when the viscous liquid started to turn to a rubbery elastic body as the gelation period, and the curability was evaluated. The results are shown in Table 16.

TABLE 16

| Composition (parts by weight) | | Examples | | | | | | | | | | | | | | | |
|---|---|---|---|---|---|---|---|---|---|---|---|---|---|---|---|---|---|
| | | 61 | 62 | 63 | 64 | 65 | 66 | 67 | 68 | 69 | 70 | 71 | 72 | 73 | 74 | 75 | 76 |
| Polymer (A) having a reactive silicon group | Main agent | 303 | 303 | 303 | 303 | 303 | 303 | 303 | 303 | 303 | 303 | 303 | 303 | 303 | 303 | 303 | 303 |
| Catalyst composition | Catalyst composition 35 | 5.0 | 2.9 | | | | | | | | | | | | | | |
| | Catalyst composition 36 | | | 3.8 | | | | | | | | | | | | | |
| | Catalyst composition 37 | | | | 7.4 | | | | | | | | | | | | |
| | Catalyst composition 38 | | | | | 5.0 | | | | | | | | | | | |
| | Catalyst composition 39 | | | | | | 3.9 | | | | | | | | | | |
| | Catalyst composition 40 | | | | | | | 6.5 | 8.0 | 9.2 | | | | | | | |
| | Catalyst composition 41 | | | | | | | | | | 6.0 | 12 | | | | | |
| | Catalyst composition 42 | | | | | | | | | | | | 10 | | | | |
| | Catalyst composition 43 | | | | | | | | | | | | | 10 | | | |
| | Catalyst composition 44 | | | | | | | | | | | | | | 12 | | |
| | Catalyst composition 45 | | | | | | | | | | | | | | | 9.6 | |
| | Catalyst composition 46 | | | | | | | | | | | | | | | | 8.4 |
| Curability | Gelation period | <1 minute | 10 minutes | 5 minutes | <1 minute | 30 minutes | 35 minutes | 25 minutes | 13 minutes | 3 minutes | 30 minutes | 1 minute | 3 minutes | 9 minutes | 10 minutes | 11 minutes | 12 minutes |

As is understood from Table 16, even about the curable compositions wherein the filler (C), and additives, such as a plasticizer and a compound having a reactive silicon group, were added to the polymer (A) having a reactive silicon group, the gelation period was short, and an excellent curability was exhibited.

Example 77

At 23° C. and 50% RH, 100 parts by mass of the polymer (A-2) yielded in Synthesis Example 2 as a polymer (A) having a reactive silicon group, and 1.0 part by mass of a paste yielded by mixing hydrogenammonium fluoride used in Examples 34 to 47, having a maximum particle diameter of 150 µm or less, with methanol, the amount thereof being two times the weight of the fluoride, were weighed, and put into a metallic can. A spatula was used to mix and knead the components sufficiently for 1 minute. Immediately after the kneading, 0.7 part by mass of 1,8-diazabicyclo[5.4.0]-7-undecene as an amine compound (F) was weighed, and then added to the resultant kneaded product. Furthermore, the product was sufficiently kneaded for 1 minute. The time when the kneading was finished was defined as the curing start time. The metallic can was allowed to stand still at 23° C. and 50% RH. The spatula was used to knead a portion of the composition to measure the period up to a time when the viscous liquid started to turn to a rubbery elastic body as the gelation period, and the curability was evaluated. As a result, the gelation period was 15 minutes. In the curable composition of the present example, the ratio of the mole number of the amine compound (F) to that of hydrogenammonium fluoride was 1.0.

As is understood from Example 77, also about the curable composition containing, as constituting components, the polymer (A) having a reactive silicon group, hydrogenammonium fluoride and the amine compound (F) and prepared without using any catalyst composition prepared in advance, the gelation period was short, and an excellent curability was exhibited.

Examples 78 to 83, and Comparative Examples 17 to 19

In accordance with proportions by weight (in each example) shown in Table 17, the following were added: a tetrabutylammonium fluoride-THF solution (1-M solution) (available from Aldrich) as a fluoride salt compound (B); versatic acid (Japan Epoxy Resins Co., Ltd.) as a protonic acid (D); and a compound (E) having a sulfonyl group (manufactured by Fuji Amide Chemical Co., Ltd.). At 60° C., volatile components were removed therefrom under a reduced pressure of 0.1 atm. for 1 hour, so as to yield each mixture catalyst.

To 100 parts by weight of the organic polymer (A-2) yielded in Synthesis Example 2 were added the following: 120 parts by weight of surface-treated colloidal calcium carbonate (trade name: Hakuenka CCR, manufactured by Shiraishi Kogyo Kaisha, Ltd.), which is precipitated calcium carbonate surface-treated with an aliphatic acid, as a filler (C); 20 parts by weight of titanium oxide (trade name: TIPAQUE R820, manufactured by Ishihara Sangyo Kaisha, Ltd.); 55 parts by weight of a plasticizer (trade name: Actcol P23-K, manufactured by Mitsui Takeda Chemicals Inc.); 2 parts by weight of a thixotropic agent (trade name: DISPARLON #6500, manufactured by Kusumoto Chemicals Ltd.); 1 part by weight of an ultraviolet absorbent (trade name: TINUVIN 327, manufactured by Ciba Specialty Chemicals Inc.); 1 part by weight of a light stabilizer (trade name: Sanol LS770, manufactured by Sankyo Co., Ltd.); and 1 part by weight of an antioxidant (trade name: SP, manufactured by Ouchi Shinko Chemical Industrial Co., Ltd.). A three-paint-roll machine was used to mix and knead the components sufficiently to prepare a main agent. Under a constant temperature of 23° C. and a constant humidity of 50%, to the main agent were added 2 parts by weight of a dehydrating agent (trade name: A171, manufactured by Dow Corning Toray Co., Ltd.) and 3 parts by weight of an adhesive property supplier (trade name: A1120, manufactured by Dow Corning Toray Co., Ltd.), and then a spatula was used to mix the components sufficiently for 1 minute. While the mixture was stretched into a thin form with the spatula, bubbles were removed form the mixture. The resultant was filled into a lid of an ointment can, and the surface was adjusted into a flat form. This time was defined as the curing start time. The surface was touched with the spatula. A measurement was made wherein the time when the blend came not to adhere onto the spatula was specified as the skin formation time. The results are shown in Table 17.

TABLE 17

| Composition | | Examples | | | | | | Comparative Examples | | |
|---|---|---|---|---|---|---|---|---|---|---|
| | (parts by weight) | 78 | 79 | 80 | 81 | 82 | 83 | 17 | 18 | 19 |
| Organic polymer (A) having a reactive silicon group | Polymer (A-2) yielded in Synthesis Example 2 | 100 | 100 | 100 | 100 | 100 | 100 | 100 | 100 | 100 |
| Precipitated calcium carbonate (C) surface-treated with aliphatic acid | CCR[1] | 120 | 120 | 120 | 120 | 120 | 120 | 120 | 120 | 120 |
| Titanium oxide | TIPAQUE R820[2] | 20 | 20 | 20 | 20 | 20 | 20 | 20 | 20 | 20 |
| Plasticizer | Actcol P23-K[3] | 55 | 55 | 55 | 55 | 55 | 55 | 55 | 55 | 55 |
| Thixotropic agent | DISPARLON 6500[4] | 2 | 2 | 2 | 2 | 2 | 2 | 2 | 2 | 2 |
| Ultraviolet absorbent | TINUVIN 327[5] | 1 | 1 | 1 | 1 | 1 | 1 | 1 | 1 | 1 |
| Light stabilizer | Sanol LS770[6] | 1 | 1 | 1 | 1 | 1 | 1 | 1 | 1 | 1 |
| Antioxidant | SP[7] | 1 | 1 | 1 | 1 | 1 | 1 | 1 | 1 | 1 |
| Dehydrating agent | A171[8] | 2 | 2 | 2 | 2 | 2 | 2 | 2 | 2 | 2 |
| Adhesive property supplier | A1120[9] | 3 | 3 | 3 | 3 | 3 | 3 | 3 | 3 | 3 |
| Fluoride salt compound (B) | TBAF[10] | 12 | 12 | 12 | 26 | 12 | 12 | 8 | 10 | 12 |
| Protonic acid (D) | Versatic acid[11] | 1 | 2 | 3.5 | 0 | 3.5 | 3.5 | 0 | 0 | 0 |
| Protonic acid (D) | Dodecylbenzenesulfonic acid[12] | 0 | 0 | 0 | 5.5 | 0 | 0 | 0 | 0 | 0 |
| Compound (E) having a sulfonyl group | Topoizer No. 7[13] | 0 | 0 | 0 | 0 | 3.5 | 11.7 | 0 | 0 | 0 |
| Ratio[14] | (g/g) | 0.0021 | 0.0021 | 0.0021 | 0.0045 | 0.0021 | 0.0021 | 0.0014 | 0.0018 | 0.0021 |
| Ratio[15] | (mol/mol) | 0.13 | 0.25 | 0.44 | 0.59 | 0.44 | 0.44 | 0 | 0 | 0 |
| Ratio[16] | (mol/mol) | 0 | 0 | 0 | 0 | 0.36 | 1.20 | 0 | 0 | 0 |
| Workability | Mixture homogeneity | ○ | ○ | ○ | ○ | ○ | ○ | ○ | X | X |

TABLE 17-continued

| Composition | | Examples | | | | | | Comparative Examples | | |
|---|---|---|---|---|---|---|---|---|---|---|
| (parts by weight) | | 78 | 79 | 80 | 81 | 82 | 83 | 17 | 18 | 19 |
| Curability | Skin formation time | 140 minutes | 85 minutes | 70 minutes | 1 minutes | 40 minutes | 15 minutes | 6 hours or longer | 5 minutes | 1 minute or shorter |

[1] Colloidal calcium carbonate surface-treated by aliphatic acid (manufactured by Shiraishi Kogyo Kaisha, Ltd.)
[2] (manufactured by Ishihara Sangyo Kaisha, Ltd.)
[3] (manufactured by Mitsui Takeda Chemicals Inc.)
[4] Aliphatic acid amide wax (manufactured by Kusumoto Chemicals Ltd.)
[5] (manufactured by Ciba Specialty Chemicals Inc.)
[6] (manufactured by Sankyo Co., Ltd.)
[7] (manufactured by Ouchi Shinko Chemical Industrial Co., Ltd.)
[8] (manufactured by Dow Corning Toray Co., Ltd.)
[9] (manufactured by Dow Corning Toray Co., Ltd.)
[10] 1.0-M tetrabutylammonium fluoride solution in THF (manufactured by Sigma-Aldrich Japan K.K.)
[11] (manufactured by Japan Epoxy Resins Co., Ltd.)
[12] (manufactured by Tokyo Chemical Industry Co., Ltd.)
[13] (manufactured by Fuji Amide Chemical Co., Ltd.)
[14] weight of F (fluorine atoms) contained in fluoride salt compound (B)/weight of precipitated calcium carbonate (D) surface-treated with aliphatic acid
[15] mole number of suppliable $H^+$ ions contained in protonic acid (C)/mole number of fluorine atoms contained in fluoride salt compound (B)
[16] mole number of compound (E) having a sulfonyl group/mole number of fluorine atoms contained in fluoride salt compound (B)

As shown about Comparative Examples 17 to 19, in the case of using no protonic acid (D), good curability and workability could not be compatible with each other. However, as shown about Examples 78 to 83, in the case of using the protonic acid (D), curable compositions having both of good curability and workability were able to be produced. As shown about Examples 82 and 83, in the case of using the compound (E) having a sulfonyl group further, a better curability was expressed while the workability was kept.

Examples 84 to 96

Ammonium fluoride was pulverized in a mortar, and then the resultant was passed through a sieve having a mesh of 150 µm. In accordance with each formulation shown in Table 18, thereto were added a dispersing agent (H), an amine compound (F) and an acid compound (G). A spatula was then used to mix the components sufficiently with each other. The resultant pasty product was used, as it was, as a catalyst composition. Hereinafter, the catalyst compositions of Examples 84 to 96 will be referred to as catalyst compositions 84 to 96, respectively.

Comparative Examples 20 and 21

In accordance with each formulation shown in Table 19, an amine compound (F) and an acid compound (G) were mixed with each other. The resultant compositions were named comparative catalyst compositions 20 and 21, respectively.

TABLE 19

| | | Comparative Examples | |
|---|---|---|---|
| Composition (parts by weight) | | 20 | 21 |
| Amine compound (F) | DBU[1] | 411 | 822 |
| Acid compound (G) | Neodecanoic acid | 465 | |
| | Methylhexahydrophthalic anhydride | | 454 |
| Dispersing agent | Tetrahydrofuran | | 290 |

[1] 1,8-Diazabicyclo[5.4.0]-7-undecene

TABLE 18

| Composition (parts by weight) | | Examples | | | | | | | | | | | | |
|---|---|---|---|---|---|---|---|---|---|---|---|---|---|---|
| | | 84 | 85 | 86 | 87 | 88 | 89 | 90 | 91 | 92 | 93 | 94 | 95 | 96 |
| | Ammonium fluoride | 100 | 100 | 100 | 100 | 100 | 100 | 100 | 100 | 100 | 100 | 100 | 100 | 100 |
| Amine compound (F) | DBU[1] | 411 | | | | 411 | | | 822 | | | 82 | | 164 |
| | 3-Diethylaminopropylamine | | 351 | | | | | | | | | | 70 | |
| | Triethylamine | | | 273 | | | 273 | | | 546 | | | | |
| | Pyridine | | | | 214 | | | 214 | | | 427 | | | |
| Mole number of amine compound (F)/Mole number of ammonium fluoride | | 1.0 | 1.0 | 1.0 | 1.0 | 1.0 | 1.0 | 1.0 | 2.0 | 2.0 | 2.0 | 0.2 | 0.2 | 0.4 |
| Acid compound (G) | Neodacanoic acid | 465 | 465 | 465 | 465 | | | | | | | 93 | 93 | |
| | Methylhexahydrophthalic anhydride | | | | | 454 | 454 | 454 | 454 | 454 | 454 | | | 91 |
| Mole number of acid compound (G)/mole number of amine compound (F) | | 1.0 | 1.0 | 1.0 | 1.0 | 1.0 | 1.0 | 1.0 | 0.5 | 0.5 | 0.5 | 1.0 | 1.0 | 0.5 |
| Mole number of acid anhydride groups in acid compound (G)/mole number of amine compound (F) | | | | | | 1.0 | 1.0 | 1.0 | 0.5 | 0.5 | 0.5 | | | |
| Dispersing agent (H) | Methanol | 100 | 100 | 100 | 100 | | | | | | | | | |
| | Tetrahydrofuran | | | | | 270 | 270 | 270 | 270 | 270 | 270 | | | 50 |

[1] 1,8-Diazabicyclo[5.4.0]-7-undecene,

Examples 97 to 111

In accordance with each formulation as shown in Table 20, individual components were weighed and put into a metallic can at 23° C. and 50% RH, and then a spatula was used to knead the components sufficiently for 1 minute to prepare a curable composition. The time when the kneading was finished was defined as the curing start time. The metallic can was allowed to stand still at 23° C. and 50% RH. The spatula was used to knead a portion of the composition to measure the period up to a time when the viscous liquid started to turn to a rubbery elastic body as the gelation period, and the curability was evaluated. The results are shown in Table 20.

TABLE 20

| Composition (parts by weight) | | Examples | | | | | | | | | | | | | | |
|---|---|---|---|---|---|---|---|---|---|---|---|---|---|---|---|---|
| | | 97 | 98 | 99 | 100 | 101 | 102 | 103 | 104 | 105 | 106 | 107 | 108 | 109 | 110 | 111 |
| Polymer (A) having a reactive silicon group | Polymer (A-2) yielded in Synthesis Example 2 | 100 | 100 | 100 | 100 | 100 | 100 | 100 | 100 | 100 | 100 | 100 | 100 | 100 | 100 | 100 |
| Catalyst composition | Catalyst composition 84 | 10.7 | 5.5 | 2.3 | | | | | | | | | | | | |
| | Catalyst composition 85 | | | | 10.3 | | | | | | | | | | | |
| | Catalyst composition 86 | | | | | 9.1 | | | | | | | | | | |
| | Catalyst composition 87 | | | | | | 8.8 | | | | | | | | | |
| | Catalyst composition 88 | | | | | | | 12.5 | 6.4 | 2.5 | | | | | | |
| | Catalyst composition 91 | | | | | | | | | | 8.1 | 3.4 | 1.7 | | | |
| | Catalyst composition 94 | | | | | | | | | | | | | 3.0 | | |
| | Catalyst composition 95 | | | | | | | | | | | | | | 5.5 | |
| | Catalyst composition 96 | | | | | | | | | | | | | | | 3.5 |
| Curability | Gelation period | 1 minute | 3 minute | 17 minute | 12 minute | 60 minute | 70 minute | 1 minute | 2 minute | 9 minute | <1 minute | 1 minute | 3 minute | 8 minute | 30 minute | 3 minute |

As is understood from Table 20, the curable compositions prepared by use of the catalyst composition of the present invention exhibited an excellent curability.

Comparative Examples 22 and 23

In accordance with each formulation shown in Table 21, the curability was evaluated in the same way as in Examples 97 to 111. The results are shown in Table 21.

TABLE 21

| | | Comparative Examples | |
|---|---|---|---|
| Composition (parts by weight) | | 22 | 23 |
| Polymer (A) having a reactive silicon group | Polymer (A-2) in Synthesis Example 2 | 100 | 100 |
| Catalyst composition | Comparative catalyst composition 20 | 2.6 | |
| | Comparative catalyst composition 21 | | 9.5 |
| Curability | Gelation period | 3 hours | >3 hours |

As is understood from Table 21, the curable compositions prepared by use of the comparative catalyst compositions 20 and 21, respectively, did not exhibit an excellent curability.

Examples 112, and 113

The following were used: 100 parts by weight of the polymer (A-2) yielded in Synthesis Example 2 as a polymer (A) having a reactive silicon group; 120 parts by weight of surface-treated colloidal calcium carbonate (trade name: Hakuenka CCR, manufactured by Shiraishi Kogyo Kaisha, Ltd.) as a filler (C); 20 parts by weight of titanium oxide (trade name: TIPAQUE R-820, manufactured by Ishihara Sangyo Kaisha, Ltd.); 55 parts by weight of a plasticizer (trade name: Actcol P23, manufactured by Mitsui Chemicals Polyurethanes Inc.); 2 parts by weight of a thixotropic agent (trade name: DISPARLON #6500, manufactured by Kusumoto Chemicals Ltd.); 1 part by weight of an antioxidant (trade name: Yunox KC, manufactured by YSK, Inc.); 1 part by weight of an ultraviolet absorbent (trade name: TINUVIN 327, manufactured by Ciba Specialty Chemicals Inc.); and 1 part by weight of a light stabilizer (trade name: Sanol LS770, manufactured by Sankyo Co., Ltd.). The components were each weighed. The weighed components were mixed with each other and sufficiently kneaded, and then a three-paint-roll machine was used to disperse the dispersible components. Thereto were added 3 parts by weight of γ-(2-aminoethyl)aminopropyltrimethoxysilane (trade name: A-1120, manufactured by Dow Corning Toray Co., Ltd.) as an adhesive property supplier, and 2 parts by weight of vinyltrimethoxysilane (trade name: A-171, manufactured by Dow Corning Toray Co., Ltd.) as a compound having a reactive silicon group, and then the components were mixed and kneaded to prepare a main agent.

In accordance with each formulation as shown in Table 22, individual components were weighed and put into a metallic can at 23° C. and 50% RH, and then a spatula was used to knead the components sufficiently for 1 minute to prepare a curable composition. The time when the kneading was finished was defined as the curing start time. The metallic can was allowed to stand still at 23° C. and 50% RH. The spatula was used to knead a portion of the composition to measure the period up to a time when the viscous liquid started to turn to a rubbery elastic body as the gelation period, and the curability was evaluated. The results are shown in Table 22.

TABLE 22

| Composition (parts by weight) | | Examples | |
|---|---|---|---|
| | | 112 | 113 |
| Polymer (A) having a reactive silicon group | Main agent | 304 | 304 |
| Catalyst composition | Catalyst composition 91 | 12.6 | |
| | Catalyst composition 96 | | 17.4 |
| Curability | Gelation period | 13 minutes | 4 minutes |

As is understood from Table 22, also about the compositions wherein the fillers, the compound having a reactive silicon group, and so on were added to and blended with the polymer (A) having a reactive silicon group, the catalyst compositions of the present invention exhibited an excellent curability.

Example 114

At 23° C. and 50% RH, 100 parts by weight of the polymer (A-2) yielded in Synthesis Example 2 as a polymer (A) having a reactive silicon group, 1.0 part by weight of hydrogenammonium fluoride used in Examples 84 to 96, having a particle diameter of 150 μm or less, 3.7 parts by weight of 3-diethylaminopropylamine as an amine compound (F), and 4.6 parts by weight of neodecanoic acid as an acid compound (G) were weighed and put into a metallic can, and then a spatula was used to mix and knead the components sufficiently for 1 minute. (The ratio of the mole number of 3-diethylaminopropylamine to that of ammonium fluoride was 1.0, and the ratio of the mole number of the acid compound (G) to that of the amine compound (F) was 1.0.) The time when the kneading was finished was defined as the curing start time. The metallic can was allowed to stand still at 23° C. and 50% RH. The spatula was used to knead a portion of the composition to measure the period up to a time when the viscous liquid started to turn to a rubbery elastic body as the gelation period, and the curability was evaluated. As a result, the gelation period was 40 minutes.

As is understood from Example 114, the curable composition containing, as constituting components, the polymer (A) having a reactive silicon group, ammonium fluoride, the amine compound (F) and the acid compound (G) also exhibited an excellent curability. The embodiments and the examples disclosed herein are exemplified at all points, and should not be considered not to be restrictive. The scope of the present invention is specified not by the above-mentioned description but by the claims, and all modifications that have a meaning equivalent to the claims and are within a scope equivalent to the claims are intended to be included in the scope of the present invention.

The invention claimed is:

1. A curable composition, comprising a polymer (A) having a silicon-containing group which can be crosslinked by forming a siloxane bond, a fluoride salt compound (B), and a filler (C) which is at least one selected from the group consisting of precipitated calcium carbonate surface-treated with a substance other than any aliphatic acid and precipitated calcium carbonate surface-treated with an aliphatic acid, provided that the ratio by weight between fluorine atoms contained in the fluoride salt compound (B) and the precipitated calcium carbonate surface-treated with the aliphatic acid is 0.0015 or more.

2. The curable composition according to claim 1, wherein the fluoride salt compound (B) is an ammonium fluoride salt.

3. The curable composition according to claim 1, further comprising a protonic acid (D).

4. The curable composition according to claim 3, wherein the protonic acid (D) is an aliphatic acid.

5. The curable composition according to claim 3, wherein the protonic acid (D) is a sulfonic acid.

6. The curable composition according to claim 3, wherein a ratio between a mole number of H$^+$ ions that the protonic acid (D) can supply and a mole number of fluorine atoms in the fluoride salt compound (B) is 0.1 or more.

7. The curable composition according to claim 1, further comprising a compound (E) having a sulfonyl group other than any sulfonic acid.

8. The curable composition according to claim 7, wherein a ratio between a mole number of the compound (E) having a sulfonyl group and a mole number of fluorine atoms in the fluoride salt compound (B) is 0.5 or more.

9. The curable composition according to claim 1, wherein the fluoride salt compound (B) is comprised in an amount of 0.001 to 30 parts by weight for 100 parts by weight of the polymer (A).

10. The curable composition according to claim 1, wherein the filler (C) is comprised in an amount of 5 to 500 parts by weight for 100 parts by weight of the polymer (A).

11. The curable composition according to claim 2, further comprising an amine compound (F).

12. The curable composition according to claim 1, wherein a maximum particle diameter of the fluoride salt compound (B) is 150 μm or less.

13. The curable composition according to claim 1, wherein the polymer (A) is a polymer having one or more silicon-containing groups which can be crosslinked by forming a siloxane bond, the number of the silicon-containing group(s) being one or more, on average, per molecule.

14. The curable composition according to claim 1, wherein the silicon-containing group that the polymer (A) has, which can be crosslinked by forming a siloxane bond, is represented by the following general formula (3):

$$—SiR^1{}_{3-a}X_a \qquad (3)$$

wherein R$^1$(s), the number of which is (3-a), is/are each independently a hydrocarbon group having 1 to 20 carbon atom(s), or a siloxy group represented by $R^2{}_3SiO-$, wherein three $R^2$s are each independently a hydrocarbon group having 1 to 20 carbon atom(s), X(s), the number of which is a, is/are each independently a group selected from the group consisting of a hydroxyl group, alkoxy groups, alkenyloxy groups, acyloxy groups, and phenoxy groups, and a is 1, 2 or 3.

15. The curable composition according to claim 14, wherein "a" described in the general formula (3) is 2.

16. The curable composition according to claim 14, wherein X(s) described in the general formula (3) is/are an alkoxy group.

17. The curable composition according to claim 1, wherein the number-average molecular weight of the polymer (A) is from 3,000 to 100,000.

18. The curable composition according to claim 1, wherein the polymer (A) is a polymer having at least one main chain skeleton selected from the group consisting of a polyoxyalkylene polymer, a saturated hydrocarbon polymer, and a (meth) acrylate polymer.

19. A sealant wherein a curable composition as recited in claim 1 is used.

20. An adhesive wherein a curable composition as recited in claim 1 is used.

* * * * *